US006232937B1

(12) United States Patent
Jacobsen et al.

(10) Patent No.: US 6,232,937 B1
(45) Date of Patent: *May 15, 2001

(54) LOW POWER ACTIVE DISPLAY SYSTEM

(75) Inventors: Jeffrey Jacobsen, Hollister, CA (US); John C. C. Fan, Chestnut Hill, MA (US); Stephen A. Pombo, Campbell, CA (US); Matthew Zavracky, Plympton, MA (US); Rodney Bumgardner, Cupertino, CA (US); Alan Richard, Wrentham; Wen-Foo Chern, Wayland, both of MA (US)

(73) Assignee: Kopin Corporation, Taunton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,485

(22) Filed: Jun. 27, 1997

Related U.S. Application Data

(63) Continuation-in-part of application No. 08/853,630, filed on May 9, 1997, which is a continuation-in-part of application No. 08/838,420, filed on Apr. 7, 1997, which is a continuation-in-part of application No. 08/810,646, filed on Mar. 3, 1997, which is a continuation-in-part of application No. 08/766,607, filed on Dec. 13, 1996, which is a continuation-in-part of application No. 08/741,671, filed on Oct. 31, 1996.

(51) Int. Cl.[7] .................................................. G09G 3/36
(52) U.S. Cl. ............................... 345/87; 345/95; 345/96; 345/100
(58) Field of Search ......................... 345/95, 96, 100, 345/101, 102, 87, 8; 349/62, 141

(56) References Cited

U.S. PATENT DOCUMENTS

| | | |
|---|---|---|
| 4,010,322 | 3/1977 | Nathanson ........................ 358/233 |
| 4,258,387 | 3/1981 | Lemelson et al. ................... 358/85 |
| 4,336,524 | 6/1982 | Levine .............................. 340/311.1 |
| 4,573,766 | 3/1986 | Bournay, Jr. et al. ............... 350/345 |
| 4,630,895 | 12/1986 | Abdala, Jr. et al. ................. 350/345 |

(List continued on next page.)

FOREIGN PATENT DOCUMENTS

| | | |
|---|---|---|
| 2123461 | 11/1994 | (CA) . |
| 27 15 446 | 10/1978 | (DE) . |
| 28 20 096 | 11/1979 | (DE) . |
| 38 28 485 A1 | 3/1990 | (DE) . |
| 92 00 683 U | 6/1992 | (DE) . |

(List continued on next page.)

OTHER PUBLICATIONS

"Hand-held Videophone," *Popular Science* (Feb. 1992).
"VideoPhone price cut to $1,000," *USA Today* (Jan. 2, 1993).
"SA620 Integrated Front-End," *Philips Electronics North America Corp.* (1993).

(List continued on next page.)

*Primary Examiner*—William A. Cuchlinski, Jr.
*Assistant Examiner*—Marthe Y. Marc-Coleman
(74) *Attorney, Agent, or Firm*—Hamilton, Brook, Smith & Reynolds, P.C.

(57) ABSTRACT

The invention relates to a microdisplay system that utilizes a small high resolution active matrix liquid crystal display with an illumination system and a magnifying optical system to provide a hand held communication display device. The system has an alternating common voltage which allows reduced power consumption. In addition an internal heating system in the display allows the system to be used at low temperatures. The system can employ an LED illumination system and cellular communication or processor circuits within a compact housing to provide communication devices such as pagers, telephones, televisions, and hand held computer or card reader devices with a compact high resolution data and/or video display.

22 Claims, 51 Drawing Sheets

U.S. PATENT DOCUMENTS

| | | | |
|---|---|---|---|
| 4,634,225 | 1/1987 | Haim et al. | 350/331 |
| 4,636,866 | 1/1987 | Hattori | 358/236 |
| 4,695,129 | 9/1987 | Faessen | 350/96.25 |
| 4,704,740 | 11/1987 | McKee et al. | 455/348 |
| 4,814,876 | 3/1989 | Horio et al. | 358/160 |
| 4,837,817 | 6/1989 | Maemori | 358/224 |
| 4,856,045 | 8/1989 | Hoshina | 379/53 |
| 4,856,088 | 8/1989 | Oliwa et al. | 455/349 |
| 4,873,576 | 10/1989 | Hattori et al. | 358/224 |
| 4,916,441 | 4/1990 | Gombrich | 340/712 |
| 4,923,285 | 5/1990 | Ogino et al. | 350/331 |
| 4,928,300 | 5/1990 | Ogawa et al. | 379/53 |
| 4,934,773 | 6/1990 | Becker | 350/6.6 |
| 4,952,032 | 8/1990 | Inoue et al. | 350/350 S |
| 4,958,915 * | 9/1990 | Okada et al. | 350/345 |
| 4,959,642 | 9/1990 | Sharples | 340/716 |
| 4,977,456 | 12/1990 | Furuya | 358/213.13 |
| 5,003,300 | 3/1991 | Wells | 340/705 |
| 5,008,658 | 4/1991 | Russay et al. | 340/784 |
| 5,008,788 | 4/1991 | Palinkas | 362/231 |
| 5,023,931 | 6/1991 | Streck et al. | 455/21 |
| 5,042,918 | 8/1991 | Suzuki | 359/59 |
| 5,048,077 | 9/1991 | Wells et al. | 379/96 |
| 5,077,784 | 12/1991 | Fujita et al. | 379/53 |
| 5,079,627 | 1/1992 | Filo | 358/85 |
| 5,088,806 | 2/1992 | McCartney et al. | 359/84 |
| 5,106,179 | 4/1992 | Kamaya et al. | 351/158 |
| 5,111,498 | 5/1992 | Guichard et al. | 379/53 |
| 5,122,880 | 6/1992 | Nagano | 358/209 |
| 5,132,825 | 7/1992 | Miyadera | 359/85 |
| 5,138,312 | 8/1992 | Tsukamoto et al. | 340/825.44 |
| 5,162,828 | 11/1992 | Furness et al. | 353/122 |
| 5,164,833 | 11/1992 | Aoki | 358/224 |
| 5,164,980 | 11/1992 | Bush et al. | 379/53 |
| 5,185,712 | 2/1993 | Sato et al. | 358/224 |
| 5,189,632 | 2/1993 | Paajanen et al. | 364/705.05 |
| 5,204,660 * | 4/1993 | Kamagami et al. | 340/784 |
| 5,206,749 | 4/1993 | Zavracky et al. | 359/59 |
| 5,220,366 | 6/1993 | King | 354/76 |
| 5,224,198 | 6/1993 | Jachimowicz et al. | |
| 5,239,665 | 8/1993 | Tsuchiya | 395/800 |
| 5,256,562 | 10/1993 | Vu et al. | 437/86 |
| 5,258,325 | 11/1993 | Spitzer et al. | 437/86 |
| 5,260,625 | 11/1993 | Holden et al. | 313/486 |
| 5,280,372 * | 1/1994 | Horiuchi | 359/49 |
| 5,281,957 | 1/1994 | Schoolman | 345/8 |
| 5,300,788 | 4/1994 | Fan et al. | 257/13 |
| 5,300,976 | 4/1994 | Lim et al. | 354/219 |
| 5,305,244 | 4/1994 | Newman et al. | 364/708.1 |
| 5,311,206 | 5/1994 | Nelson | 345/89 |
| 5,317,236 | 5/1994 | Zavracky et al. | 315/169.3 |
| 5,321,416 | 6/1994 | Bassett et al. | 345/8 |
| 5,325,429 | 6/1994 | Kurgan | 379/429 |
| 5,331,333 | 7/1994 | Tagawa et al. | 345/7 |
| 5,335,276 | 8/1994 | Thompson et al. | 380/21 |
| 5,347,378 | 9/1994 | Handschy et al. | 359/53 |
| 5,347,400 | 9/1994 | Hunter | 359/815 |
| 5,362,671 | 11/1994 | Zavracky et al. | 437/81 |
| 5,371,493 | 12/1994 | Sharpe et al. | 340/825.34 |
| 5,376,979 | 12/1994 | Zavracky et al. | 353/122 |
| 5,381,179 | 1/1995 | Kashimura | 348/376 |
| 5,381,309 | 1/1995 | Borchardt | 362/31 |
| 5,398,043 * | 3/1995 | Takeda et al. | 345/94 |
| 5,402,143 | 3/1995 | Ge et al. | 345/102 |
| 5,404,580 | 4/1995 | Simpson et al. | 455/89 |
| 5,412,396 | 5/1995 | Nelson | 345/89 |
| 5,416,496 * | 5/1995 | Wood | 345/102 |
| 5,422,656 | 6/1995 | Allard et al. | 345/173 |
| 5,432,358 | 7/1995 | Nelson et al. | 257/81 |
| 5,440,197 | 8/1995 | Gleckman | 313/110 |
| 5,444,557 | 8/1995 | Spitzer et al. | 359/59 |
| 5,467,215 | 11/1995 | Lebby et al. | 359/247 |
| 5,469,278 | 11/1995 | Takahara et al. | 359/51 |
| 5,483,285 | 1/1996 | Lim et al. | 348/341 |
| 5,485,285 | 1/1996 | Lebby et al. | 359/811 |
| 5,485,504 | 1/1996 | Ohnsorge | 379/58 |
| 5,486,708 | 1/1996 | Takahashi et al. | 257/59 |
| 5,486,946 | 1/1996 | Jachicmowicz | 359/263 |
| 5,495,287 * | 2/1996 | Kasai et al. | 345/89 |
| 5,515,424 | 5/1996 | Kenney | 379/96 |
| 5,528,285 | 6/1996 | Morikawa et al. | 348/14 |
| 5,537,129 | 7/1996 | Okada et al. | 345/90 |
| 5,539,554 | 7/1996 | Lebby et al. | 359/83 |
| 5,541,640 | 7/1996 | Larson | 348/19 |
| 5,548,271 | 8/1996 | Tsuchiyama et al. | 340/311.1 |
| 5,549,747 | 8/1996 | Bozler et al. | 117/43 |
| 5,550,754 | 8/1996 | McNelley et al. | 364/514 |
| 5,561,538 | 10/1996 | Kato et al. | 359/40 |
| 5,584,070 | 12/1996 | Harris et al. | 455/346 |
| 5,585,948 | 12/1996 | Petera | 349/143 |
| 5,596,451 | 1/1997 | Handschy et al. | 359/633 |
| 5,608,553 | 3/1997 | Kim | 349/61 |
| 5,634,080 | 5/1997 | Kikinis et al. | 395/893 |
| 5,640,174 * | 6/1997 | Kamei et al. | 345/89 |
| 5,642,129 | 6/1997 | Zavracky et al. | 345/100 |
| 5,646,432 | 7/1997 | Iwaki et al. | 257/347 |
| 5,666,133 * | 9/1997 | Matsuo et al. | 345/100 |
| 5,673,059 * | 9/1997 | Zavracky | 345/8 |
| 5,682,214 | 10/1997 | Amako et al. | 349/74 |
| 5,684,354 | 11/1997 | Gleckman | 313/110 |
| 5,691,783 * | 11/1997 | Numao et al. | 349/48 |
| 5,694,147 * | 12/1997 | Gaalema et al. | 345/101 |
| 5,726,671 | 3/1998 | Ansley et al. | 345/8 |
| 5,734,875 | 3/1998 | Cheng | 395/516 |
| 5,748,237 | 5/1998 | Ueda et al. | 348/333 |
| 5,757,445 * | 5/1998 | Vu et al. | 349/45 |
| 5,761,485 | 6/1998 | Munyan | 395/500 |
| 5,767,828 | 6/1998 | McKnight | 345/89 |
| 5,777,594 * | 7/1998 | Miyawaki | 345/102 |
| 5,806,950 * | 9/1998 | Gale et al. | 353/78 |
| 5,812,101 | 9/1998 | Monarchie et al. | 345/8 |
| 5,815,126 * | 9/1998 | Fan et al. | 345/8 |
| 5,815,228 | 9/1998 | Flynn | 349/71 |
| 5,818,634 | 10/1998 | Richard et al. | 359/565 |
| 5,821,911 | 10/1998 | Jachimowicz | 345/7 |
| 5,867,795 | 2/1999 | Novis et al. | 455/566 |
| 5,889,567 * | 3/1999 | Swanson et al. | 349/62 |
| 5,892,325 | 4/1999 | Gleckman | 313/578 |
| 5,920,298 | 6/1999 | McKnight | 345/87 |
| 5,926,161 * | 7/1999 | Furuhashi et al. | 345/100 |
| 5,929,958 * | 7/1999 | Ohta et al. | 349/141 |
| 6,007,209 | 12/1999 | Pelka | 362/30 |

FOREIGN PATENT DOCUMENTS

| | | |
|---|---|---|
| 0 172 473 A2 | 2/1986 | (EP) . |
| 0 344 881 A2 | 12/1989 | (EP) . |
| 0 352 914 A2 | 1/1990 | (EP) . |
| 0 424 880 A2 | 5/1991 | (EP) . |
| 0 438 362 A1 | 7/1991 | (EP) . |
| 0 464 011 A1 | 1/1992 | (EP) . |
| 0 472 361 A2 | 2/1992 | (EP) . |
| 0 491 639 A1 | 6/1992 | (EP) . |
| 0 526 802 A2 | 2/1993 | (EP) . |
| 0 535 401 A1 | 4/1993 | (EP) . |
| 0 539 699 A2 | 5/1993 | (EP) . |
| 0 539 907 A3 | 5/1993 | (EP) . |
| 0 547 493 A1 | 6/1993 | (EP) . |
| 0 551 781 A1 | 7/1993 | (EP) . |
| 0 626 773 A1 | 11/1994 | (EP) . |
| 0 626 773 B1 | 11/1994 | (EP) . |

| | | |
|---|---|---|
| 0 631 2389 A3 | 12/1994 | (EP). |
| 0 631 289 A2 | 12/1994 | (EP). |
| 0 689 350 A2 | 12/1995 | (EP). |
| 0 704 788 A2 | 4/1996 | (EP). |
| 0 732 606 A2 | 9/1996 | (EP). |
| 0 817 393 A2 | 1/1998 | (EP). |
| 2612351 | 9/1988 | (FR). |
| 2 242 335 | 9/1991 | (GB). |
| 2 289 555 | 11/1995 | (GB). |
| 2 308 486 | 12/1995 | (GB). |
| 61-139177 | 6/1986 | (JP). |
| 62-91045 | 4/1987 | (JP). |
| 63-151283 | 6/1988 | (JP). |
| 1-160286 | 6/1989 | (JP). |
| 2-113656 | 4/1990 | (JP). |
| 2-196570 | 8/1990 | (JP). |
| 2-218251 | 8/1990 | (JP). |
| 3-53785 | 3/1991 | (JP). |
| 3-105383 | 5/1991 | (JP). |
| 3-136487 | 6/1991 | (JP). |
| 5-14550 | 1/1993 | (JP). |
| 5-252523 | 9/1993 | (JP). |
| 6-123852 | 5/1994 | (JP). |
| 7-177398 | 7/1995 | (JP). |
| 7-235892 | 9/1995 | (JP). |
| 8-76078 | 3/1996 | (JP). |
| 8-102877 | 4/1996 | (JP). |
| 8-95027 | 4/1996 | (JP). |
| 8-114783 | 5/1996 | (JP). |
| 8-129157 | 5/1996 | (JP). |
| 8-149346 | 6/1996 | (JP). |
| 8-149485 | 6/1996 | (JP). |
| 8-154190 | 6/1996 | (JP). |
| 8-248499 | 9/1996 | (JP). |
| 8-340546 | 12/1996 | (JP). |
| 9-26617 | 1/1997 | (JP). |
| 9-55872 | 2/1997 | (JP). |
| 92/12453 | 7/1992 | (WO). |
| 93/01583 | 1/1993 | (WO). |
| 93/16550 | 8/1993 | (WO). |
| 93/18428 | 9/1993 | (WO). |
| 93/23783 | 11/1993 | (WO). |
| 94/01958 | 1/1994 | (WO). |
| 94/09398 | 4/1994 | (WO). |
| 94/11775 | 5/1994 | (WO). |
| 94/14152 | 6/1994 | (WO). |
| 95/11473 | 4/1995 | (WO). |
| 95/25983 | 9/1995 | (WO). |
| 95/26110 | 9/1995 | (WO). |
| 96/19794 | 6/1996 | (WO). |
| 96/21173 | 7/1996 | (WO). |
| 96/21205 | 7/1996 | (WO). |
| 96/24197 | 8/1996 | (WO). |
| 96/35288 | 11/1996 | (WO). |
| 97/01240 | 1/1997 | (WO). |
| WO 98/27538 | 6/1998 | (WO). |
| WO 98/27539 | 6/1998 | (WO). |
| WO 98/27540 | 6/1998 | (WO). |
| WO 99/34246 | 7/1999 | (WO). |

OTHER PUBLICATIONS

Kummerow, T., Meurer, W., "Bildtelefon—ein Kommunikationsdienst im ISDN ab 1991," *Telenorma Nachrichten, Telenorma Bosch Gruppe* 1989 Heft 93, pp. 52, 53, index and cover page.

Linder, Ben, "A whole lot smarter," *Telephony*, pp. 22, 23, 26, 28 and cover (May 19, 1997).

* cited by examiner

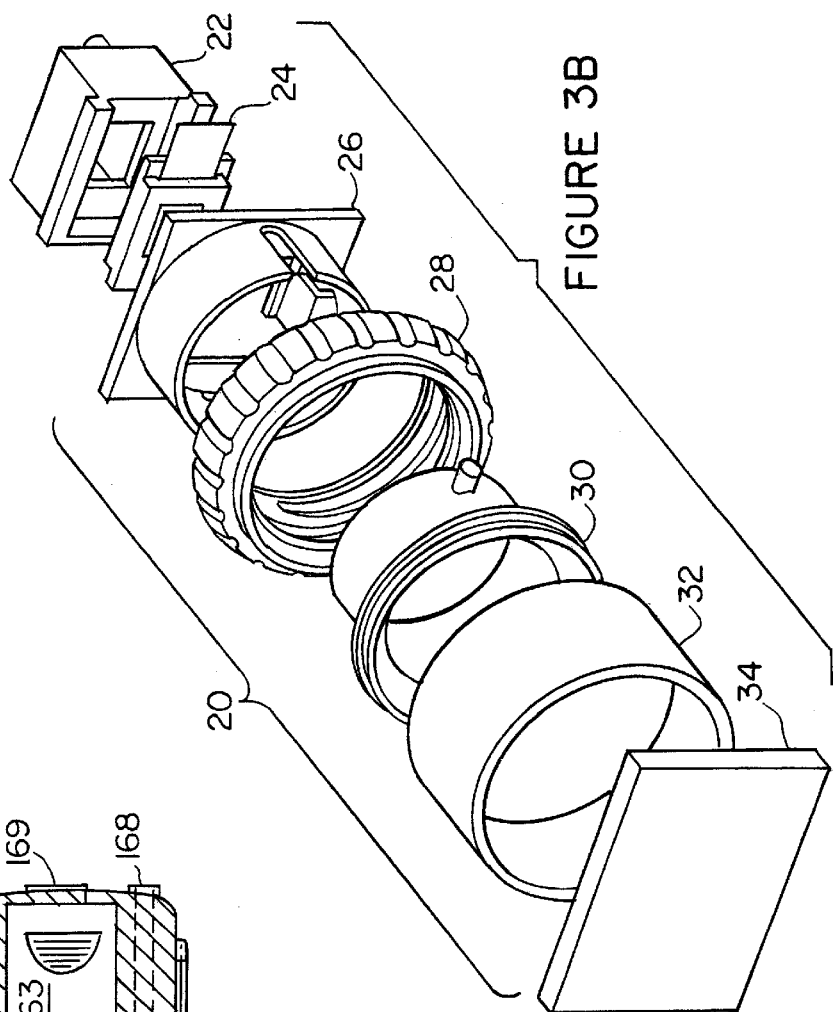
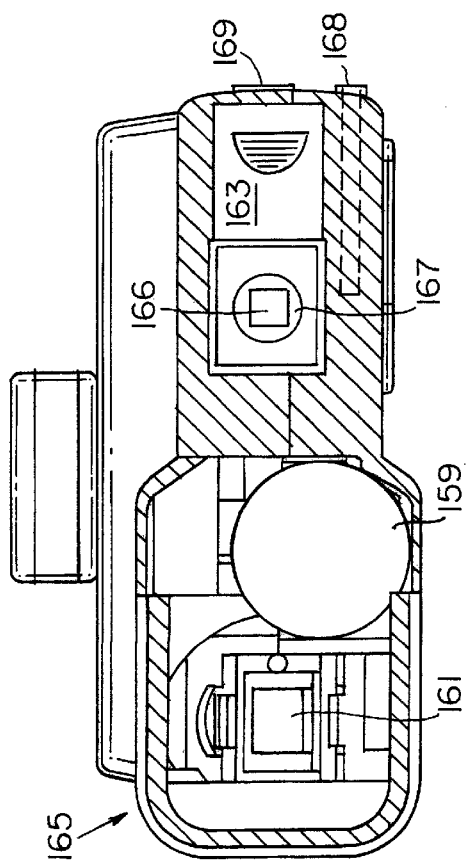
FIGURE 3B
FIGURE 4Ba

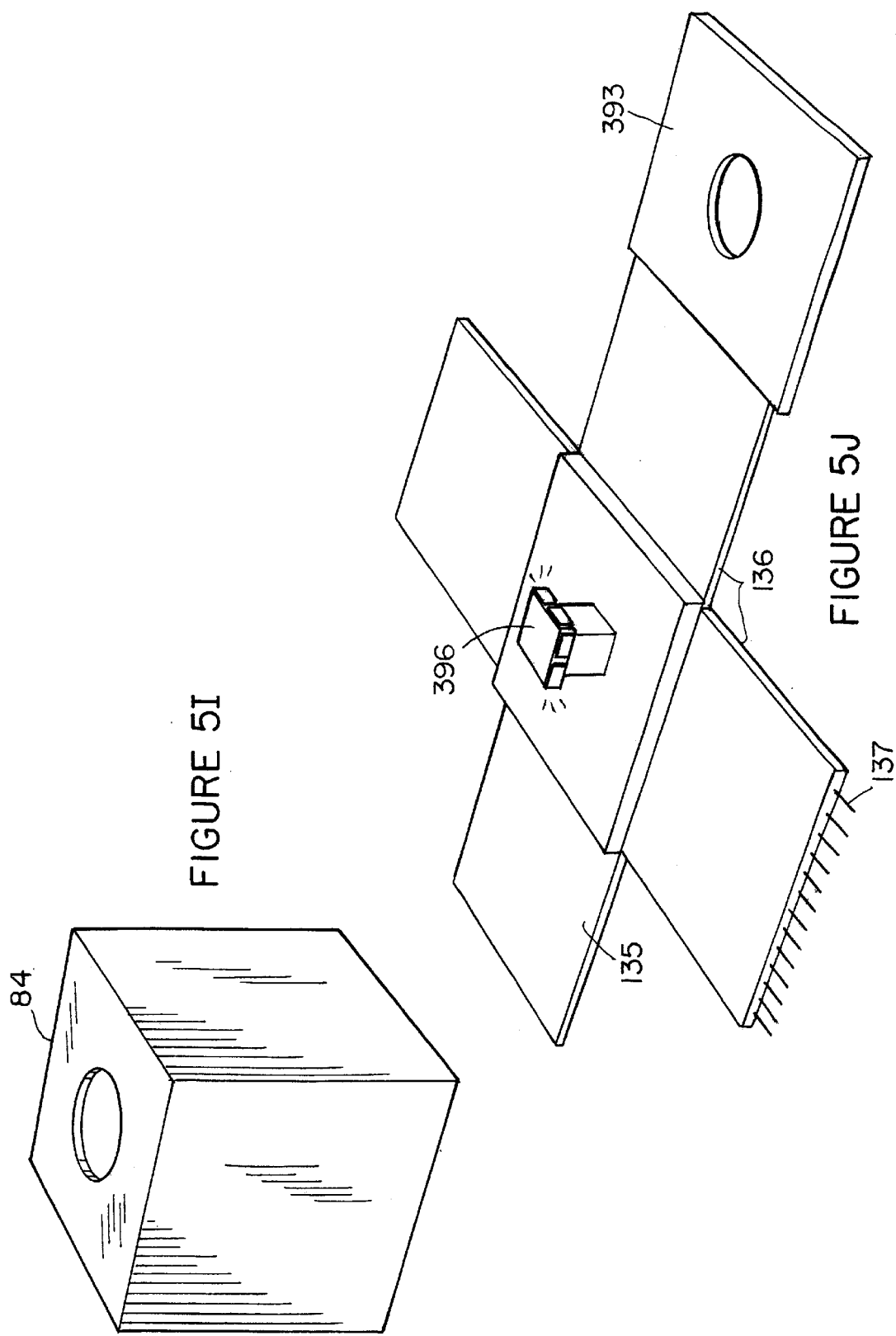

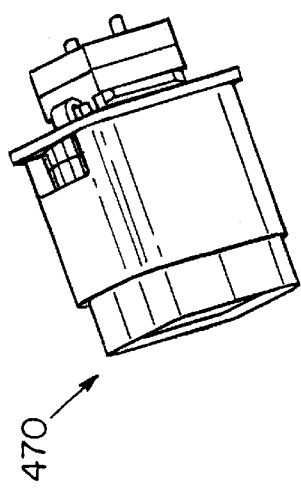
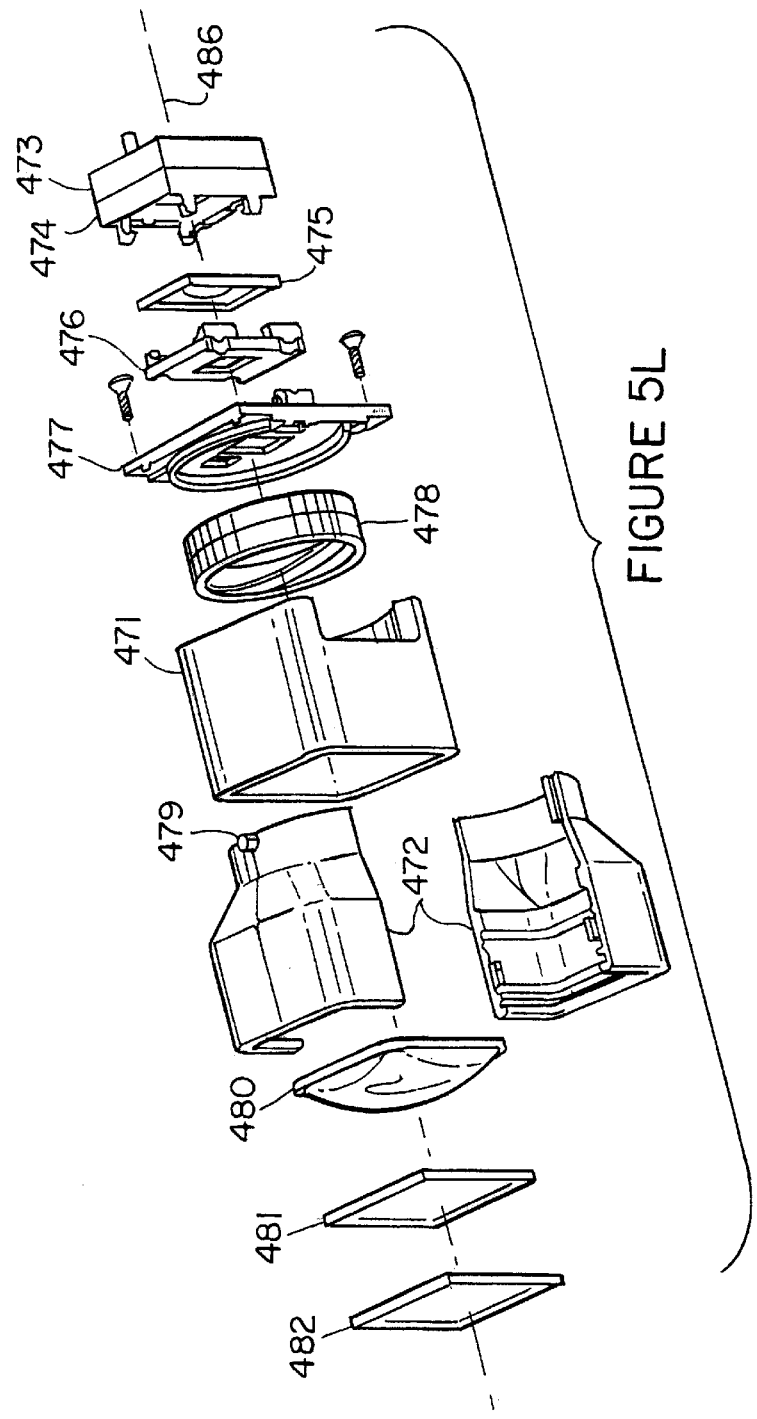

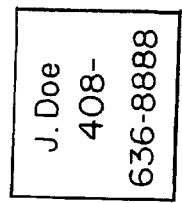
FIGURE 8D
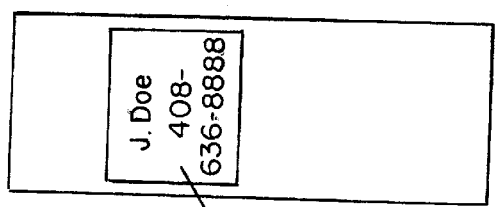
FIGURE 8E
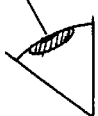
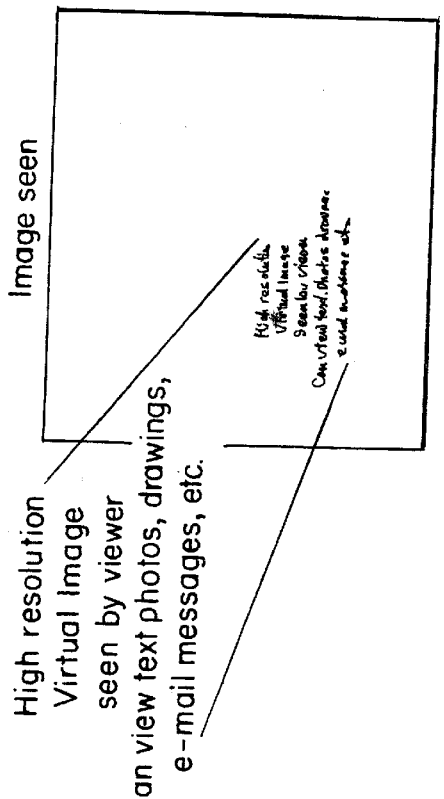
High resolution
Virtual Image
seen by viewer
Can view text photos, drawings,
e-mail messages, etc.
FIGURE 8F
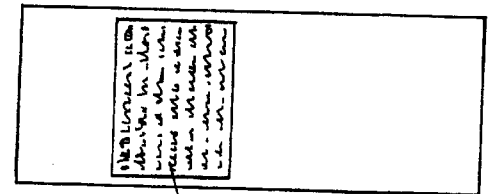
FIGURE 8G

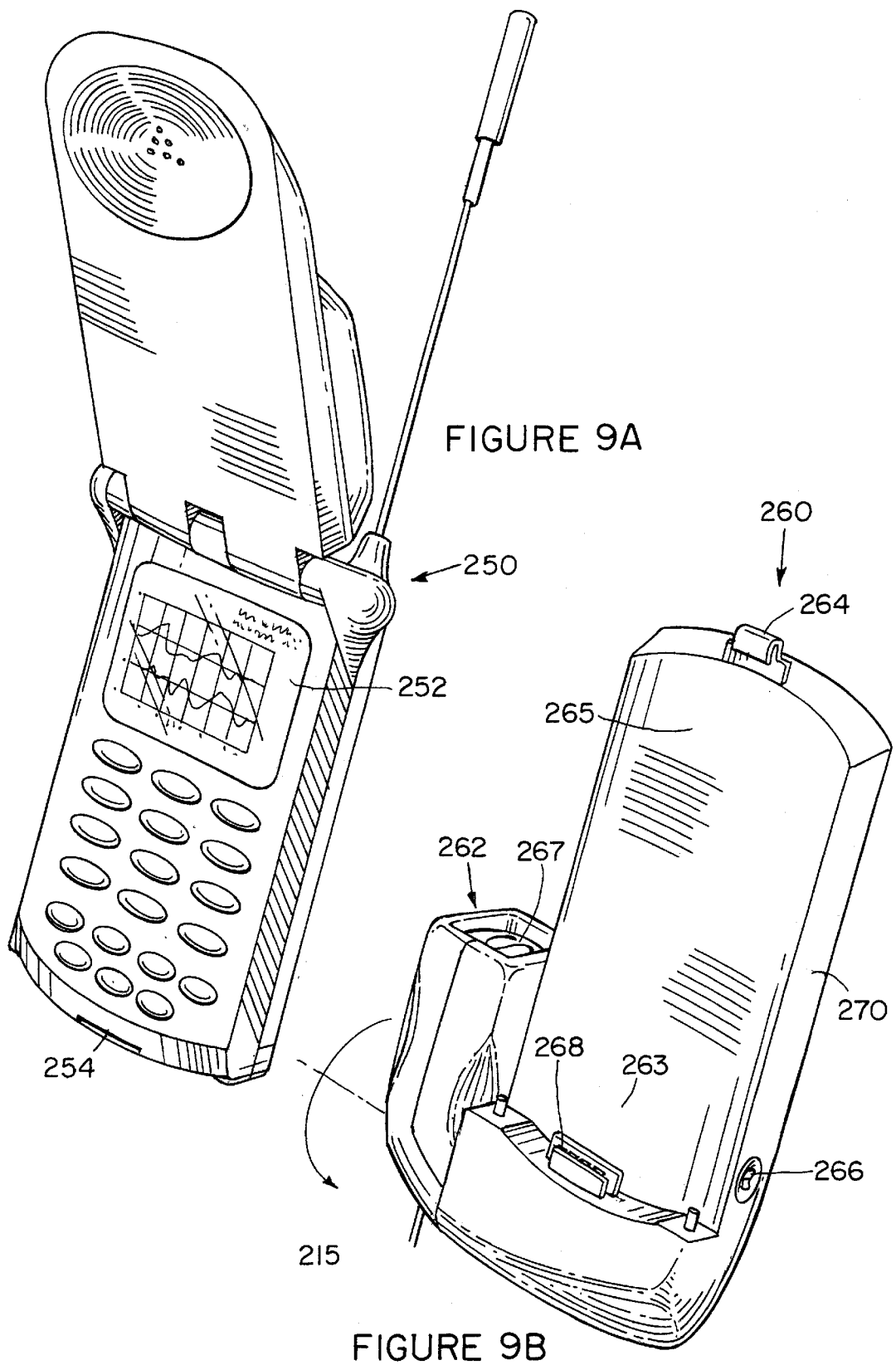

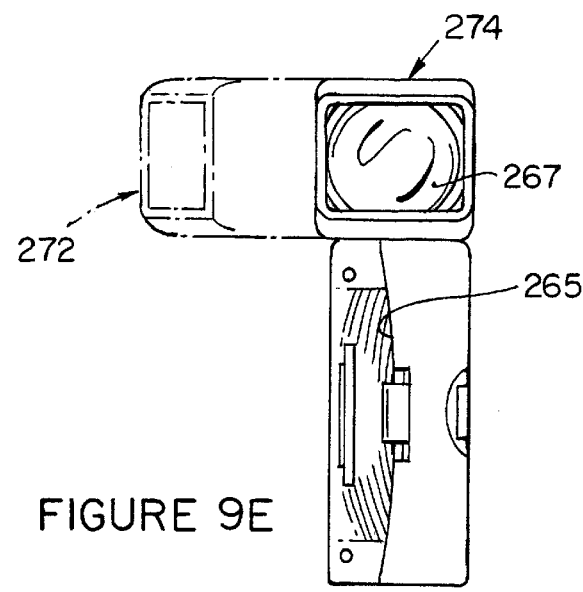
FIGURE 9E
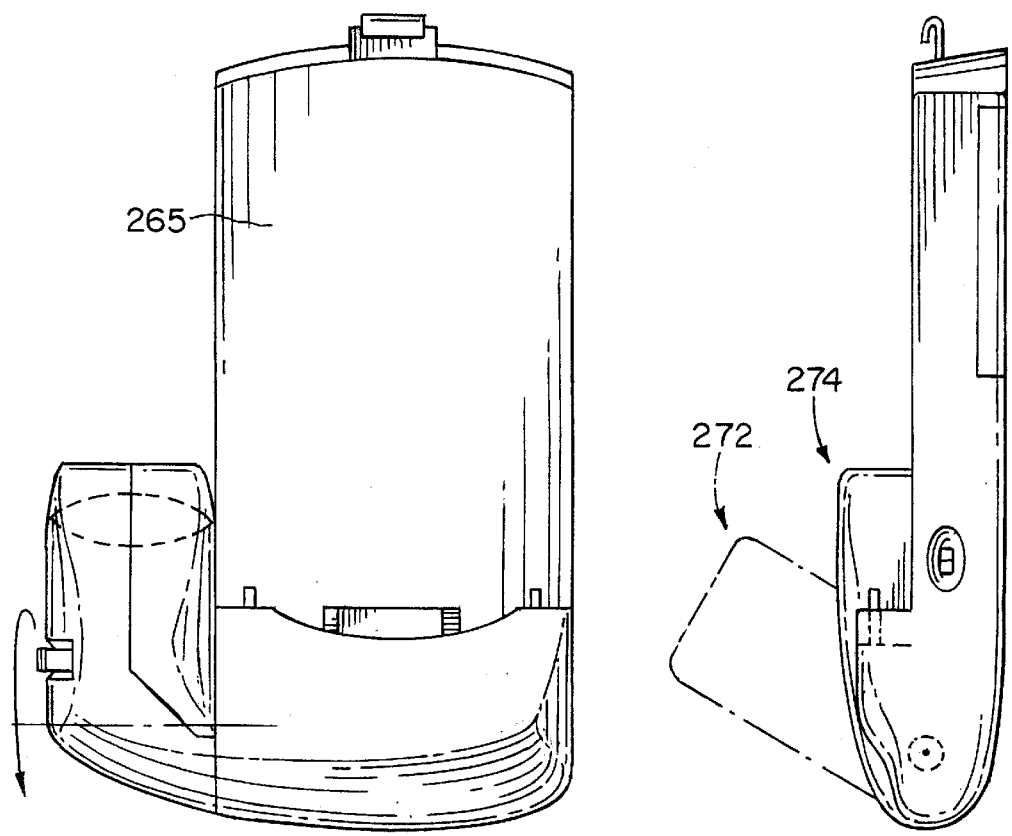
FIGURE 9F
FIGURE 9G

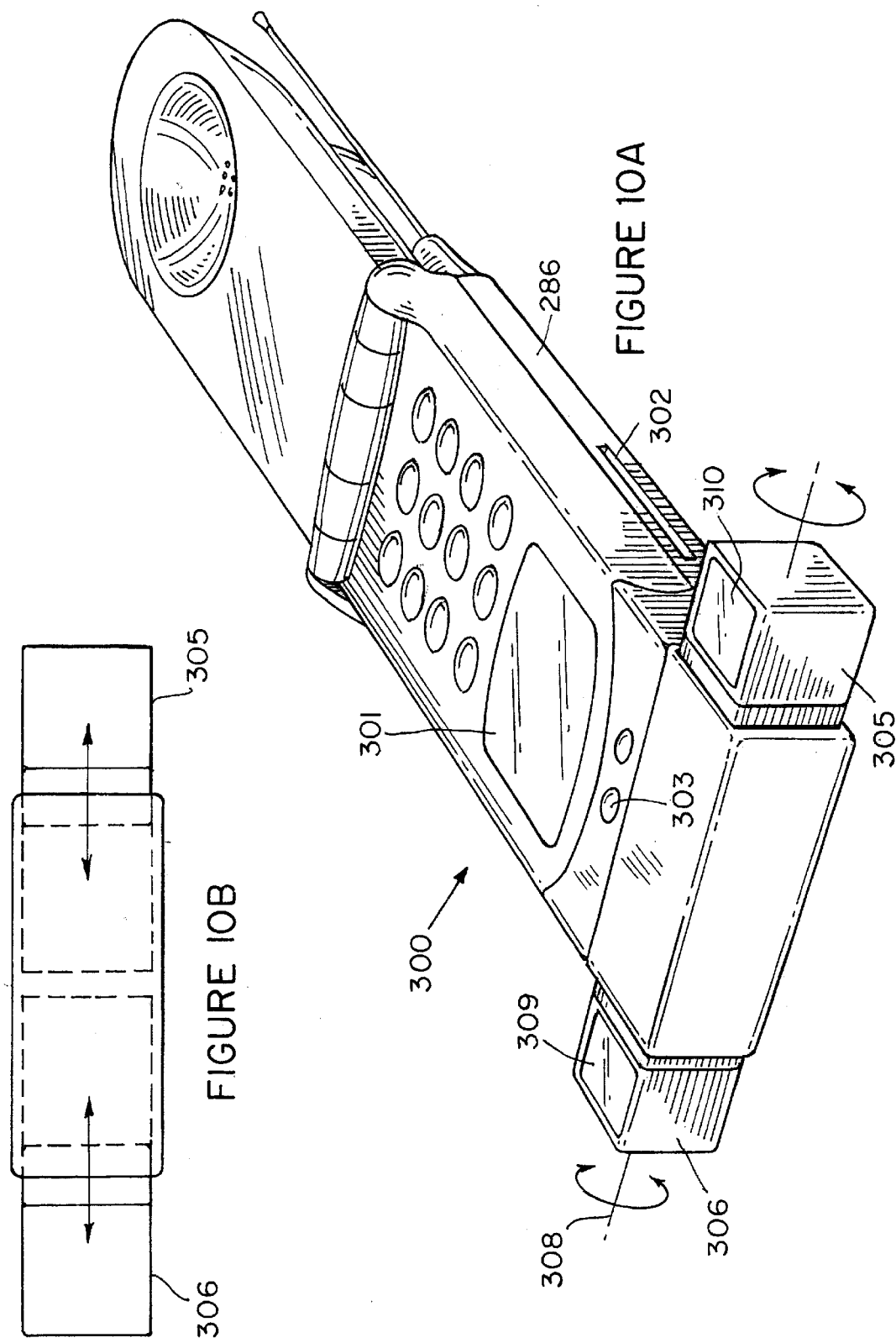

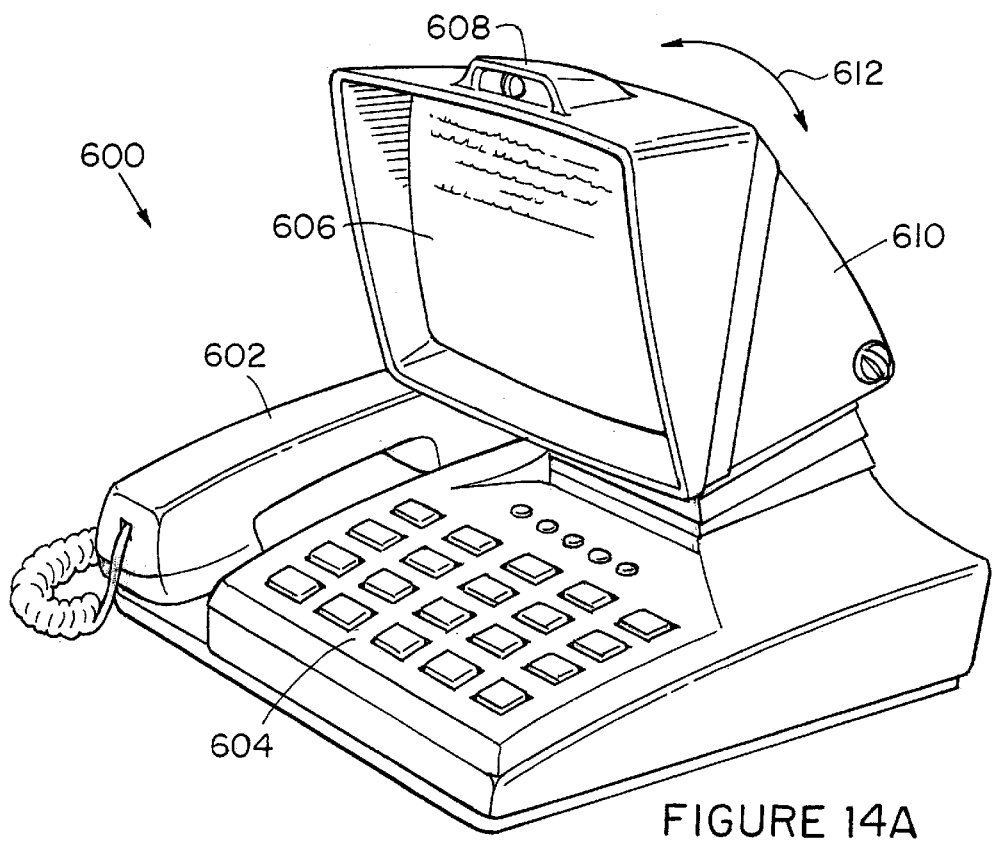
FIGURE 14A
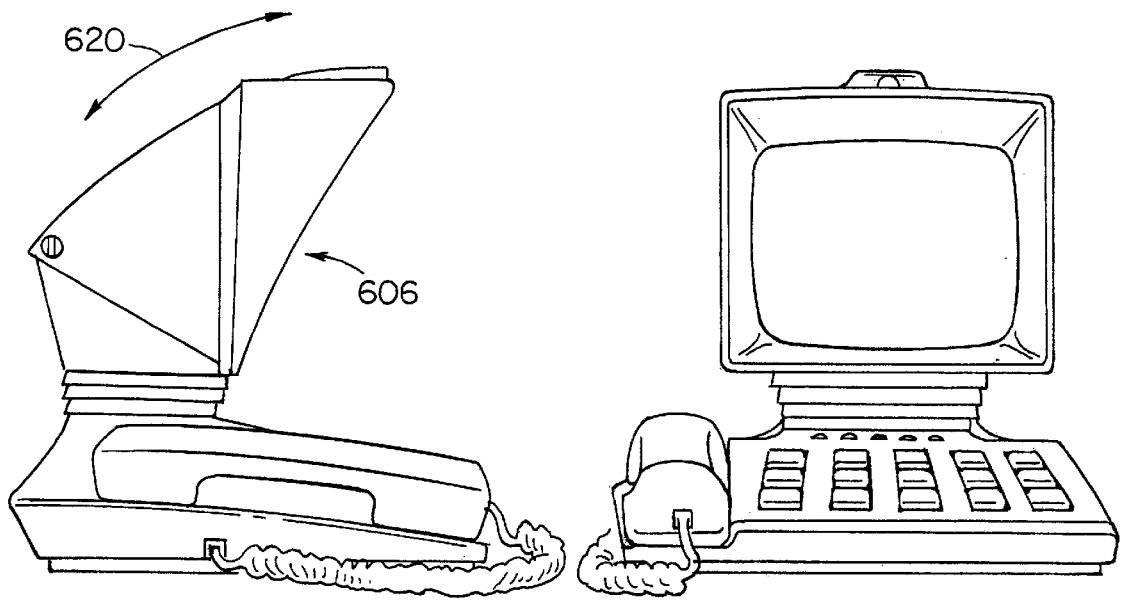
FIGURE 14B
FIGURE 14C

LOW POWER ACTIVE DISPLAY SYSTEM

RELATED APPLICATIONS

This is a continuation-in-part of U.S. application Ser. No. 08/853,630 filed on May 9, 1997 of Jacobsen, et. al. which is a continuation-in-part of U.S. application Ser. No. 08/838,420 filed on Apr. 7, 1997 of Jacobsen, et. al. which is a continuation-in-part of U.S. application Ser. No. 08/810,646 filed on Mar. 3, 1997, which is a Continuation-in-Part of U.S. application Ser. No. 08/766,607 filed on Dec. 13, 1996 which is a continuation-in-part of U.S. application Ser. No. 08/741,671 filed on Oct. 31, 1996, the entire contents of the above applications being incorporated herein by reference.

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Flat panel displays employing LCDs generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will allow transmission of light in the material when an electric field is applied across the material between the circuit panel and a ground affixed to the filter plate. Thus, when a particular pixel of the display is turned on by the TFTs, the liquid crystal material rotates polarized light being transmitted through the material so that the light will pass through the second polarizing filter.

The primary approach to TFT formation over the large areas required for flat panel displays has involved the use of amorphous silicon, which has previously been developed for large-area photovoltaic devices. Although the TFT approach has proven to be feasible, the use of amorphous silicon compromises certain aspects of the panel performance. For example, amorphous silicon TFTs lack the frequency response needed for high performance displays due to the low electron mobility inherent in amorphous material. Thus the use of amorphous silicon limits display speed, and is also unsuitable for the fast logic needed to drive the display.

As the display resolution increases, the required clock rate to drive the pixels also increases. In addition, the advent of colored displays places additional speed requirements on the display panel. To produce a sequential color display, the display panel is triple scanned, once for each primary color. For example, to produce color frames at 20 Hz, the active matrix must be driven at a frequency of 60 Hz. In order to reduce flicker it is desirable to drive the active matrix at 180 Hz to produce a 60 Hz color image. At over 60 Hz, visible flicker is reduced.

Owing to the limitations of amorphous silicon, other alternative materials include polycrystalline silicon, or laser recrystallized silicon. These materials are limited as they use silicon that is already on glass, which generally restricts further circuit processing to low temperatures.

Integrated circuits for displays, such as, the above referred color sequential display, are becoming more and more complex. For example, the color sequential display is designed for displaying High Definition Television (HDTV) formats requiring a 1280-by-1024 pixel array with a pixel pitch, or the distance between lines connecting adjacent columns or rows of pixel electrodes, being in the range of 15–55 microns, and fabricated on a single five-inch wafer.

SUMMARY OF THE INVENTION

In accordance with the invention, the cost and complexity of high resolution displays is significantly reduced by fabricating multiple integrated displays of reduced size on a single wafer and then dicing the wafer to produce a plurality of display devices.

The displays are then assembled with appropriate magnifying optics to form a portable display system of low cost and reduced size. Included in the optics is a magnification system which compensates for the small image size by magnifying and projecting the image at an appropriate distance for viewing.

In preferred embodiments, the microdisplay, because of its small size and weight, can be used as a hand-held communication system such as a pager, a wireless mobile telephone, or alternatively, as a head-mounted display or a card reader display system. The display can provide a visual display suitable for data, graphics or video and accommodate standard television or high definition television signals. The system can optionally include circuitry for cellular reception and transmission of facsimile communications, can be voice activated, can include a mouse operated function, provide Internet access, and can have a keyboard or touch pad for numeric or alphabetic entry. The system can have, such as in a card reader display system, a housing with a port or aperture to receive a card, and a card reader for reading information from the card and displaying the information on the microdisplay.

The telephone or hand-held unit can be equipped with a camera or solid state imaging sensor so that images can be generated and transmitted to a remote location and/or viewed on the display. Also the telephone user can call to access a particular computer at a remote location, present the computer screen on the microdisplay, access specific files in the computer memory and download data from the file into a memory within the telephone or a modular memory and display unit connected to the telephone. The telephone can be connected to a local computer or display and the data from the file can be loaded into the local memory.

In a preferred embodiment of the invention, a light emitting diode (LED) device is used to illuminate the display. For transmission displays the LED device operates as a back light and can include a diffuser. An LED device can also be used as a light source for a reflective display in another preferred embodiment of the invention. The displays are preferably liquid crystal displays using a twisted nematic liquid crystal material. Consequently, controlling the time domain is not necessary to obtain grey scale.

For the purposes of this application, a microdisplay is defined as a display having at least 75,000 pixel electrodes and an active area of less than 160 mm$^2$, where the active area of the display is the area of the active matrix circuit that generates an image, including all of the pixel electrodes but not including the driver electronics and the border area for bonding and sealing of the liquid crystal display. For example, the array can be at least 320×240, 640×480 or higher. A preferred embodiment of the microdisplay has an active area of 100 mm² or less, and is preferably in the range between 5 mm² and 80 mm². The pixel pitch for these displays is in the range of 5–30 microns and preferably in the range between 5 and 18 microns. By utilizing pixel pitches of less than 18 microns smaller high resolution displays are now possible. For an embodiment utilizing a high definition format such as 1280×1024, and utilizing a pixel pitch of 12 microns or less, the active area of the display is less than 200 mm².

For displays of this size and resolution to be read by a user at distances of less than 10 inches (25.4 cm) there are specific lighting and magnification requirements. For a 0.25 inch (6.35 mm) diagonal display, for example, the LED device preferably includes a plurality of LEDS coupled to a diffuser. The lens used to magnify the display image has a field of view in the range of 10–60 degrees, and preferably at least about 16 degrees–22 degrees, an ERD in the range of about 25 mm–100 mm and an object distance of between about 1.5 and 5 feet (152.4 cm). A color field sequentially operated LED back light system can use a plurality of LEDS with a two or four sided reflector assembly to concentrate the light through the liquid crystal display. A preferred embodiment can use at least two LEDs, or as many as six or more of each color, to provide the desired brightness level. Alternatively the LEDs can be arranged around the periphery of a transmissive display and directed down into a conical reflector that directs the backlighting through the display in concentrated form.

The backlight, the display and the viewing lens can be aligned along a single axis within a small housing volume that is less than 20 cm³, and preferably less than 12 cm³. The system weighs less than 10 grams, preferably in the range between 5 and 8 grams. The system can be incorporated into battery operated personal communication devices without substantial alteration of their form factor and weight requirements.

The display can be operated using a color sequential system as described in U.S. patent application Ser. No. 08/216,817, "Color Sequential Display Panels" filed on Mar. 23, 1994, the entire contents of which is incorporated herein by reference, discloses an active matrix display in which the control electronics is integrated with the active matrix circuitry using single crystal silicon technology. The control electronics provides compressed video information to produce a color image for data, a still image or a video image such as a television image on the display.

The microdisplays described herein can be used in head mounted displays and portable communications systems, including color sequential systems as described in greater detail in U.S. application Ser. No. 08/410,124 filed on Mar. 23, 1995, the entire contents of which is incorporated herein by reference. Further details regarding the drive electronics suitable for a microdisplay can be found in U.S. Ser. No. 08/106,416 filed on Aug. 13, 1993, the entire contents of which is incorporated herein by reference. A preferred embodiment of the display control circuit utilizes an "under scanning" feature in which selected pixels are rapidly turned on and off to enhance edge definition and emulate a higher resolution display. The display control circuit can also utilize a panning capability so that a small portion of a displayed image can be selected, by mouse operation for example, and presented using the entire microdisplay image area thereby allowing the user to perceive smaller displayed features. This can also be used to view selected portions of a high resolution image, such as a portion of a 640×480 image on a 320×240 microdisplay.

As is readily apparent from the various embodiments described, one of the benefits of the microdisplay is the portability of the device using the microdisplay. An inherent concern with portability is providing enough power to operate the device for extended periods. One of the features of a preferred embodiment is the alternating of the voltage on the counterelectrode, therein allowing the microdisplay to operate at a lower voltage and therefore at a reduced power level. Another feature of a preferred embodiment is stopping the clock to the display when the display is not being written to, therein reducing power consumption.

When the display is used to display text, wherein the image display is not constantly changing, a feature of the preferred embodiment is to reduce the frame rate, or refresh rate. The reduction in frame rate results in a decrease in power consumption.

An additional problem with portability is the increased likelihood that the device will be used in non-ideal conditions. One such variable is the temperature in which the device will operate as temperature affects the performance of liquid crystal material. One of the features of a preferred embodiment is the monitoring of the temperature of the liquid crystal and the integral heating of the device.

BRIEF DESCRIPTION OF THE DRAWINGS

The above and other objects and features of the invention will be better understood and appreciated by those skilled in the art in view of the description of the preferred embodiments given below in conjunction with the accompanying drawings, in which:

FIGS. 3A and 3B are exploded views of a video display device and pager in accordance with a preferred embodiment of the invention.

FIG. 4B*a* is a partial cross section rear view of a preferred embodiment of a pager with integrated camera in accordance with the invention.

FIGS. 5E–5P illustrate additional preferred embodiments of a backlighting system in accordance with the invention.

FIGS. 8D–8G illustrate the changing of the resolution of the display from high resolutions to low resolutions.

FIGS. 9A–9J are illustrations of further preferred embodiments of a telephone microdisplay system in accordance with the invention.

FIGS. 10A and 10B illustrate another preferred embodiment of a telephone microdisplay system.

FIGS. 14A–14C illustrates the use of a microdisplay rear projection system for a telephone video conferencing station.

DETAILED DESCRIPTION OF THE INVENTION

High Resolution Active Matrix Microdisplay

Figure 1:
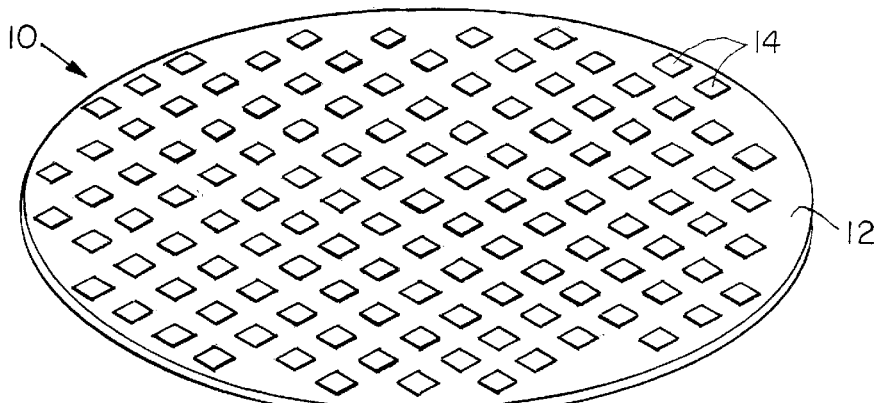
FIG. 1 is a perspective view of a single wafer having a plurality of display devices formed thereon in accordance with the invention.

A preferred embodiment of the invention utilizes a process of making a plurality of flat panel displays 10 in which a large number of active matrix arrays 14 are fabricated on a single wafer 12 as illustrated in connection with FIG. 1. The number of displays fabricated on a single wafer depends upon the size of the wafer and the size of each display. A preferred embodiment of the invention, for example, uses a high resolution display having an imaging area of the display with a diagonal of 0.5 inches (12.7 mm) or less. For a four inch wafer, forty separate displays can be fabricated on a single four inch wafer. Where each display has a diagonal of about 0.25 inches (6.35 mm), 80 displays can be fabricated on a single wafer, over 120 displays can be fabricated on a five inch wafer, and 400 displays can be fabricated on an 8 inch wafer.

By fabricating a large number of small high resolution displays on a single wafer the manufacturing yield can be substantially increased and the cost per display can be substantially reduced.

To obtain monochrome resolutions of at least 75,000 pixels (e.g. a 320×240 array) suitable for displaying an NTSC television signal on a 0.25 inch diagonal display the pixel electrodes are preferably on the order of about 15 microns in width or less. To obtain a monochrome resolution of at least 300,000 pixels (e.g. 640×480 array) on a 0.25 inch diagonal display the pixel electrodes preferably have a width of about 8–10 microns.

These small high resolution displays require magnification such that when held in a user's hand within the range of 0.5 inches to 10 inches of the user's eye, a clear image is provided.

Referring now to FIG. 2, an integrated circuit active matrix display die is shown schematically which has been diced from a single wafer along with selected number of replicated circuits. Incorporated into the circuit 100 are scanner circuits 42a, 42b, 42c, 42d, along with pixel driven circuits 44a, 44b, 44c, 44d, select scanner circuits 46a, 46b and a display matrix circuit 90.

Further details regarding the fabrication of each die on a wafer can use the methods described in U.S. Pat. No. 5,256,562, the contents of which incorporated herein its entirety by reference.

By fabricating a selected number of circuits 100 on a single wafer, the circuit yield from a single wafer is greatly enhanced at the expense of reduced display area. However, this area disadvantage is overcome by magnifying and projecting the display image as will be described herein.

A video signal bus 35-1 through 35-16 carries analog video signals from digital to analog amplifiers (not shown) to column drivers 44*a–d*. Because signal interference and signal loss can occur as the analog video signal cross each signal line in the signal bus 35, the channels of video signals are arranged to reduce interference. As illustrated, there are four column drivers 44*a*–44*d*, two column drivers 44*a*,44*b* at the top of the active matrix circuit 90 and two column drivers 44*c*,44*d* at the bottom of the active matrix circuit region 90. Each channel is allocated to one of the column drivers 44 such that each column driver 44 receives video from four channels. The top column drivers 44*a*,44*b* receive video from the channels that drive the odd-numbered pixel columns and the bottom column drivers 44*c*,44*d* receive video from the channels that drive the even-numbered columns. As shown, no video signal has to cross the path of more than one other video signal.

The illustrated arrangement of column drivers is particularly suited for edge-to-center and center-to-edge video writing, although the data can also be written from left-to-right or right-to-left. It should be understood that more or less than four column drivers 44 can be employed in preferred embodiments of the invention. For applications having resolutions of 320×240 or 640×480 it is desirable to use single column and row drivers to drive the display. For high speed, high definition displays more can be used to improve performance.

The data scanners 42 *a–d* are responsive to a pixel data signal 142 and a pixel clock signal 143 from a control signal generator (not shown). The data scanners 42*a–d* can use a shift register array to store data for each scan. An odd shift register array can be used to store data to odd column pixels and an even shift register array can be used to store data to even column pixels. As illustrated, there are left and right odd data scanners 42*a*,42*b* and left and right even data scanners 42*c*,42*d*.

The column drivers 44 selected by the data scanner 42 transmit video data to a selected column of C pixels in the active matrix circuit 90. The select scanner 46 controlled by a control signal generator determines by control lines which pixels accept this column data.

To reduce signal loss across the active matrix region 90, the select lines are driven from both sides by select scanners 46*a* and *b*. As viewed in FIG. 2A, a left select scanner 46*a* and right select scanner 46*b* are connected to the select data line 146 and the select clock line 147. A third enabling line 148 can also be used for specific applications. The left select scanner 46*a* provides a select line signal at the end of the select line nearest the lowest-valued pixel column ($C_1$) and right select scanner 46*b* provides a select line signal at the end of the select line nearest the highest-valued pixel column ($C_N$). Thus, an identical select line signal is supplied at both ends of the select line.

Although static shift registers can be used, the shift registers of the data scanner 42 and the select scanners 46 are preferably implemented as dynamic shift registers. The dynamic shift registers rely on capacitor storage without leakage. However, dynamic shift registers are susceptible to leakage, especially when they are exposed to light. Hence, light shields are needed to protect the scanners 42*a*–42*d*,46 from exposure to light. Similarly, light shields are also used to protect the transmission gates 44 and pixel columns $C_1$–$C_N$.

For further information regarding the input signals to the circuit 100, reference is made to the above-cited U.S. patents and applications.

Figure 2A:
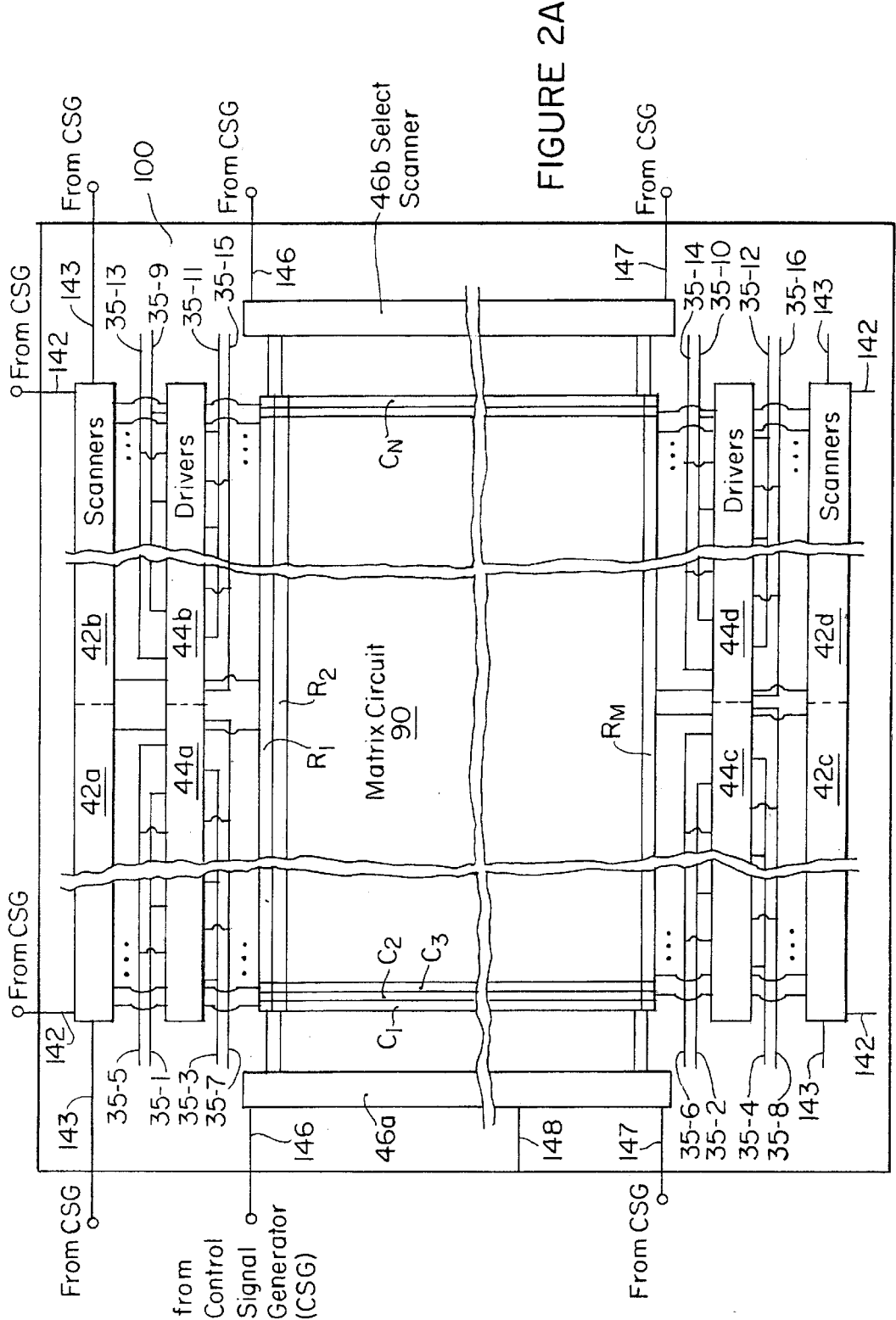
FIG. 2A is a schematic illustration of a die for an integrated active matrix panel display which includes optional control signal circuitry therein.

In a preferred embodiment of the invention, the panel drive circuitry of FIG. 2A is fabricated as an integrated circuit along with the active matrix circuit 90. The integrated circuitry is preferably fabricated in single crystal silicon having a silicon-on-insulator (SOI) structure using the fabrication and transfer procedures described previously in the aforementioned U.S. Pat. No. 5,256,562. By fabricating the row and column drive circuitry 42*a*–42*d*, 44*a*–44*d*, 46*a*, 46*b* as well as the scanners in single crystal material along with the active matrix circuit 90, the size of the display panel is not constrained by the connecting pins for the various discrete components. The integrated fabrication also increases the operating speed of the display relative to displays constructed from discrete components. Furthermore, the drive circuitry can be optimized to increase display performance. For example, it is easier to construct a small 1280 H×1024 V display panel with dual select scanners through integrated fabrication than it is using discrete components.

The pixel electrodes in a preferred embodiment are between 60 and 250 microns square. Consequently, a 1280 H×1024 V active matrix with the control system can be fabricated such that there are at least 40 such integrated circuits on a five inch wafer, for example.

Figure 2B:
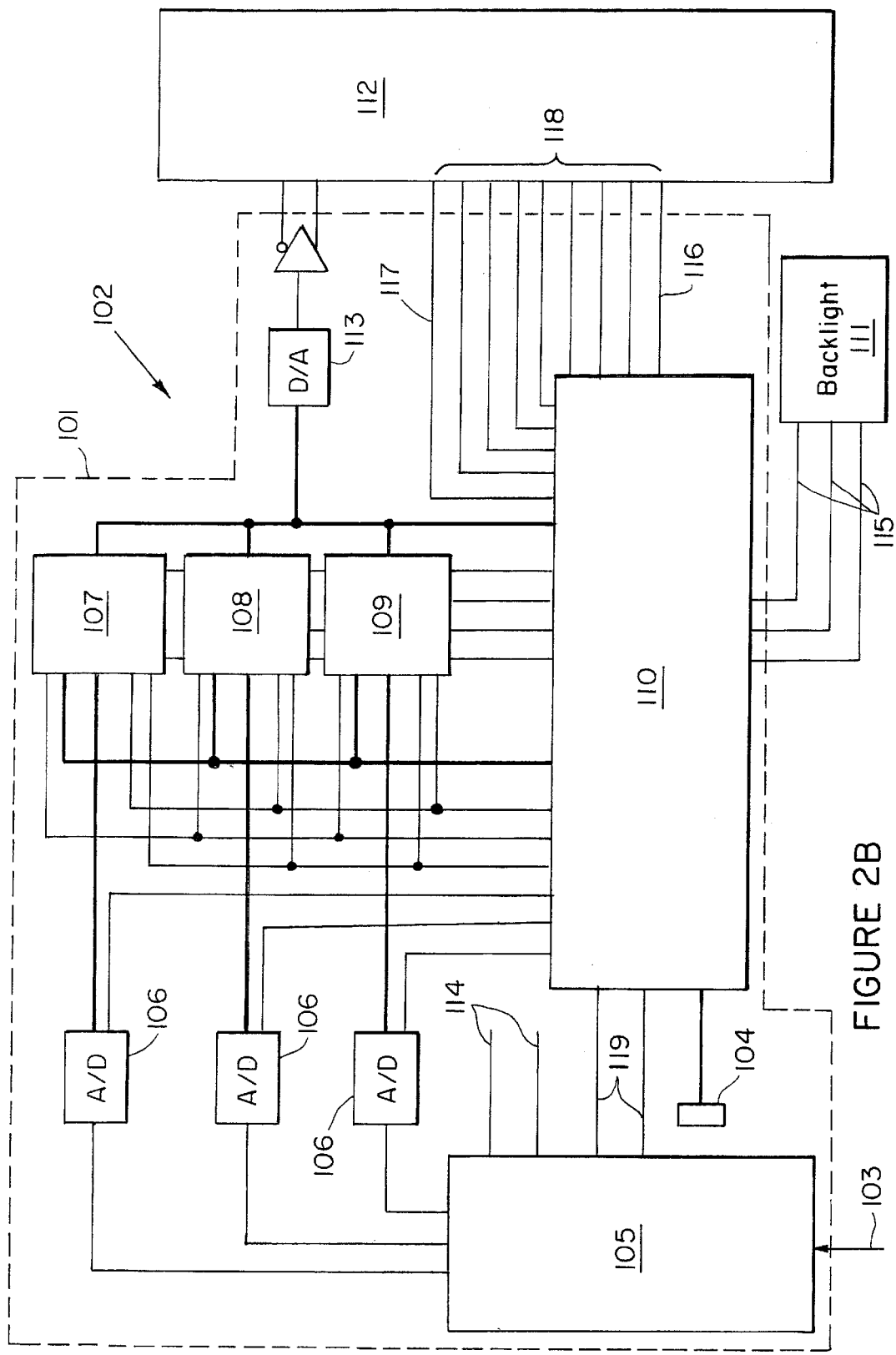
FIG. 2B and 2C illustrate preferred embodiments of display control circuits in accordance with the invention.

A preferred embodiment of a display control circuit for a color sequential microdisplay is illustrated in connection with FIG. 2B. The display control circuit 102 receives an analog composite signal 103 such as a television or VCR video signal at converter 105. Converter 105 can be a commercially available chip, such as the Sony CXA1585, which separates the signal 103 into red, green and blue components. The three analog color components are converted into digital signals by three respective analog to digital (A/D) converters 106. The three color digital signals are stored in red 107, green 108, and blue 109 memory circuits. Circuits 107, 108 and 109 can be RAM, such as DRAM, frame buffers that are connected to the timing circuit 110. Timing circuit 110 can be connected to the converter 105 by an interface bus and receives horizontal and vertical synchronization signals along lines 119 from converter 105. Circuit 110 controls the sequential flow of each color frame onto the display by sending video data from each memory 107, 108, 109 onto the display and coordinating actuation of the back light 111 along lines 115 for each primary color. Lines 114 provide control of hue and contrast of the resulting image. Lines 116, 117 and 118 are used to control the row and column driver circuits within display circuit 112. Lines 116 and 117 control horizontal shift and vertical shift of the data as it is read onto the display.

Lines 116 and 117 can be used to allow the user to invert (i.e. reverse left to right or right to left) the image on the display. This can be useful for the telephone user who may select one hand to hold the telephone during use and simply press a button on the housing so that the image is inverted for presentation to the eye of the user when electing to hold the telephone speaker in the other hand adjacent to the user's ear. The inverting of the image can be accomplished by several different techniques including by software and hardware methods. One such method is to use a bi-directional shift register and shift the direction of the register to invert the image. Another technique is to change the method by which the data is pulled out of memory using the software.

Lines 118 control vertical and horizontal pulse, vertical and horizontal clock, even and odd row enable signals and the horizontal multiplying pulse signal. Digital to analog converters 113, memories 107, 108, 109, converter 105 and control circuit 110 can be mounted on a common circuit board with display 112, or they can be split onto separate circuit boards or integrated circuits within the telephone housing, the pager housing, the docking element housing, or other housing described in greater detail below depending on the geometry and operational requirements of the specific embodiment. In addition to placing the digital to analog converters, memories, converter and control circuit 110 on a common circuit board, they can be all located on a single monolithic integrated circuit (IC), represented by a dash line 101. The placing of a components on a single IC reduces the internal capacitance and therefore the power consumption of the circuit.

Figure 2C:
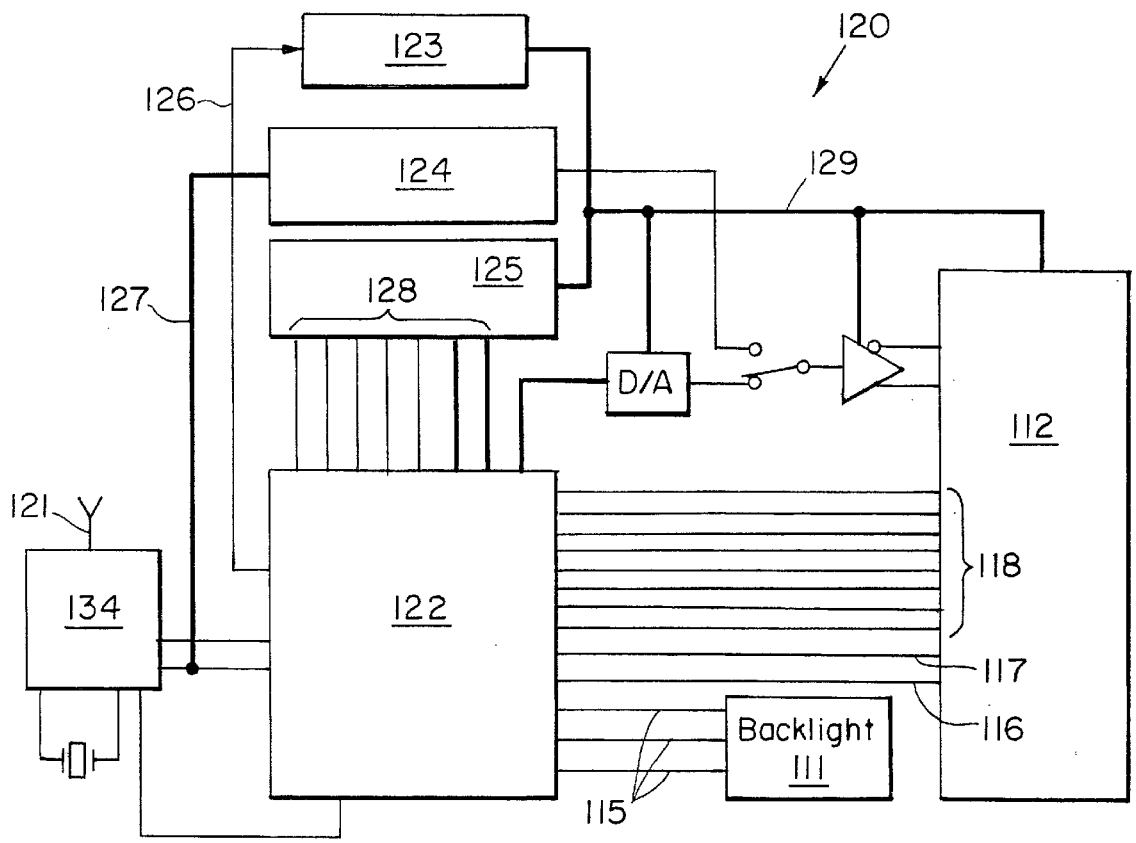

Another preferred embodiment of a display control circuit is illustrated in connection with FIG. 2C. In this embodiment, a digital circuit 120 is used to control color sequential display operation. The processor 134 receives serial digital image data at 121 and sends display data to memory 124. An optional additional non-volatile, such as flash memory or SRAM circuit 125 can also be included to store graphics data where that is in addition to text stored at 124. Timing control circuit 122 receives clock and digital control signals from processor 134 and transmits control signals to the back light 111 and display 112 along lines 115, 116, 117, and 118, respectively. Lines 128 direct ready, reset, write enable, output enable, color enable, address and data signals to memory to control deliver of image frames to the display 112.

Power management circuit 123 receives control signals along line 126 from circuit 122 to lower power consumption of the circuit 120. Circuit 123 is used to control power during display operation, and is connected to flash memory circuit 125, the digital to analog converter, the buffer/inverter and the display 112 by a line 129. This capability arises from the use of a transferred thin film active matrix circuit described previously which has an ability to store charge between vertical synchronization pulses. This storage capacity enables lower power consumption of the display and back light at less than 0.2 Watts. Thus, after a frame of data is written on the display, power is lowered until the next frame is written. This lengthens battery cycle time of portable communication devices as described herein. The power can be lowered by periodically stopping the clock to the display as described below.

Figure 2D:
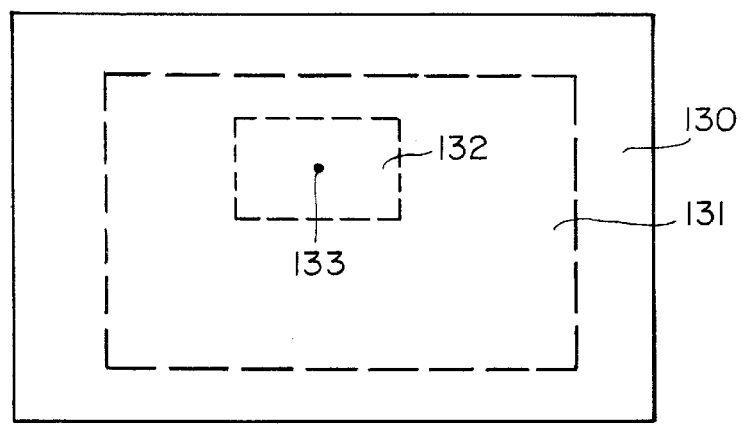
FIG. 2D illustrates a method for selectively displaying an image on a display in accordance with the invention.

FIG. 2D illustrates a method of displaying information on the display in which large amounts of information are contained in each image. For such high information images it may be desirable to enlarge a selectable portion of that image on the display. For example, the full image 130 has a region 131 in which a cursor 133 can be positioned. The user can position the cursor using a mouse or button control element anywhere within region 131 and identify a subregion 132. The user selects the image of subregion for display on the full display area.

If the data provided by the processor 134 is greater 30 than that displayed on the display 112, the image can be written to the display by underscanning; e.g. only every fourth bit of display is written. In order to display the image of a subregion as the entire image, every bit of display is written, but only for that specific region. If the subregion 132 is to be displayed on the full display area, the data for the rows above subregion 132 are not forwarded to the display 112 by the timing control circuit 122, and only the columns that are included in subregion 132 are forwarded.

Figure 2E:
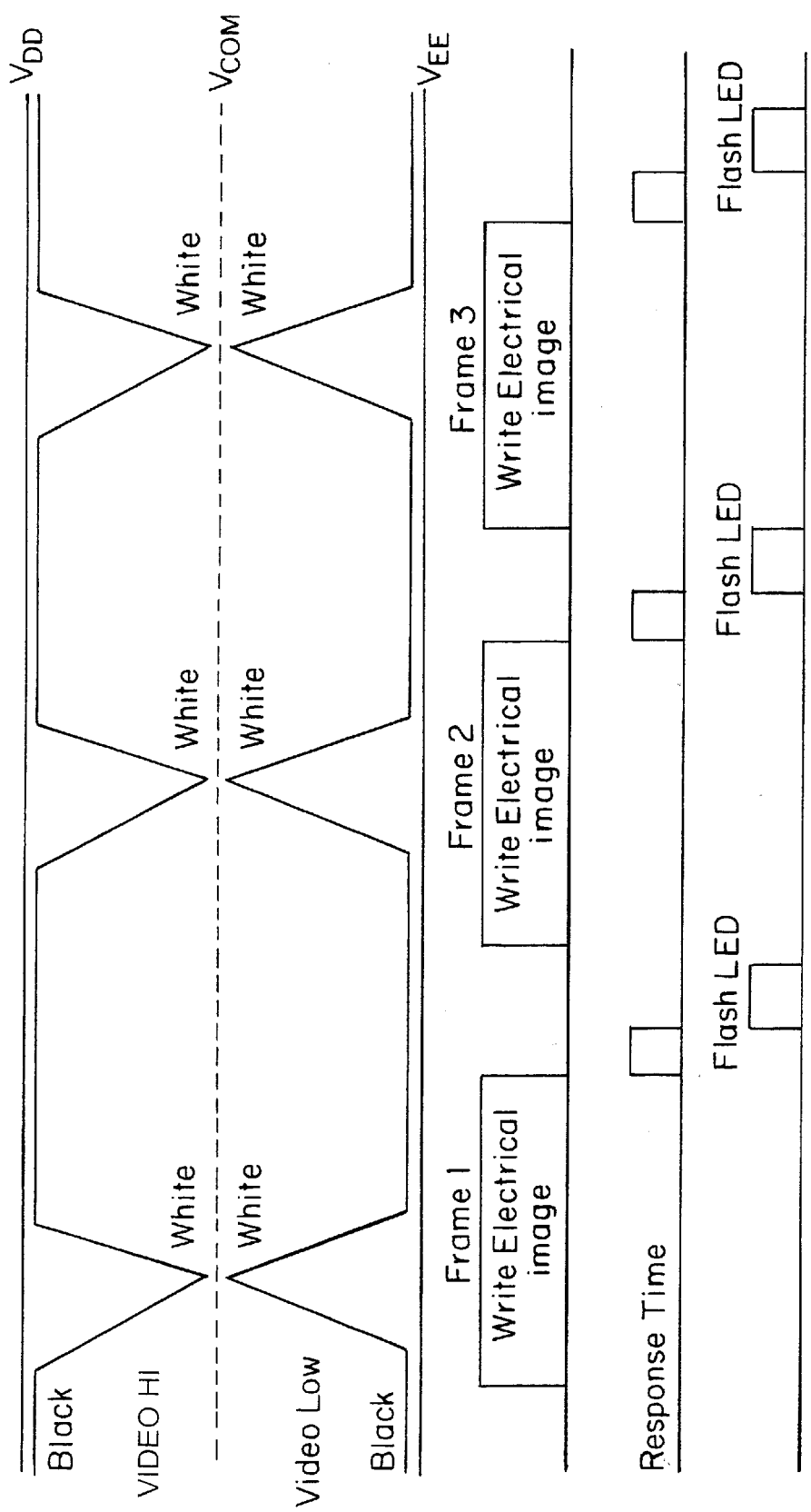
FIG. 2E illustrates a timing diagram for the display control circuit illustrated in FIG. 2D.

FIG. 2E illustrates a timing diagram that illustrates a preferred method of operating a microdisplay in accordance with the invention. The video signal is sent to the display 112 both as actual video and inverted video. The odd-numbered pixel columns receive video from the top column driver and the even-numbered columns receive video from the bottom column driver as described above with Reference to FIG. 2A. Referring to the embodiment of FIG. 2E, the odd-numbered pixels, which receive actual video, are driven between the common voltage ($V_{COM}$), the voltage applied to the counterelectrode, and the supply voltage source ($V_{DD}$). The even-numbered pixels, which receive the inverted video, are driven between $V_{COM}$ and the supply voltage sink ($V_{EE}$). After the entire frame is scanned into the display and there is a delay to allow the liquid crystal to twist, the backlight is flashed to present the image. In a preferred embodiment, $V_{DD}$ is 9volts, $V_{EE}$ is 2 volts and $V_{COM}$ is 5.5 volts. The technique of alternating the video on each column is called column inversion and helps prevent a DC voltage from building up on the liquid crystal material and additionally prevents cross talk.

Another preferred embodiment of a display control circuit is illustrated in connection with FIG. 2F. In this embodiment, a digital circuit 1120 is used to control color sequential display operation as described in relation to FIG. 2C. Additionally, the circuit has the features of a modulating common voltage and a heater, as described below. The processor 1104 receives image data at 1121 and sends display data to memory 1124 and flash memory 1125 via the timing control circuit 1122. The image data can be in a variety of forms including serial or parallel digital data, analog RGB data, composite data or s-video. The processor 1104 is configured for the type of image data received, as is well known in the art. The timing control circuit 1122 receives clock and digital control signals from the processor 1104 and transmits control signals to the backlight 1111 along lines 1115. The timing control circuit 1122 transmits control signals, such as vertical start pulse, vertical clock, horizontal start pulse, and horizontal clock, to the display 1112 along lines 1116, 1117, and 1118. Lines 1128 direct ready, reset, write enable, output enable, color enable, address and data signals to memory to control delivery of image frames to the display 1112.

Still referring to FIG. 2F, the image data travels from the timing control circuit 1122 to the display 1112 through a digital to analog converter 1130 and through an inverter 1131 on an alternate frame dependent on a switch 1132 as described below. In addition and in contrast to previous embodiments, the common voltage ($V_{COM}$) enters the display 1112 at alternating values controlled by a switch 1133. The switches 1133 and 1132 for alternating the $V_{COM}$ and the video to the display are controlled by a frame control line 1134 from the timing control circuit 1122.

Figure 2F:
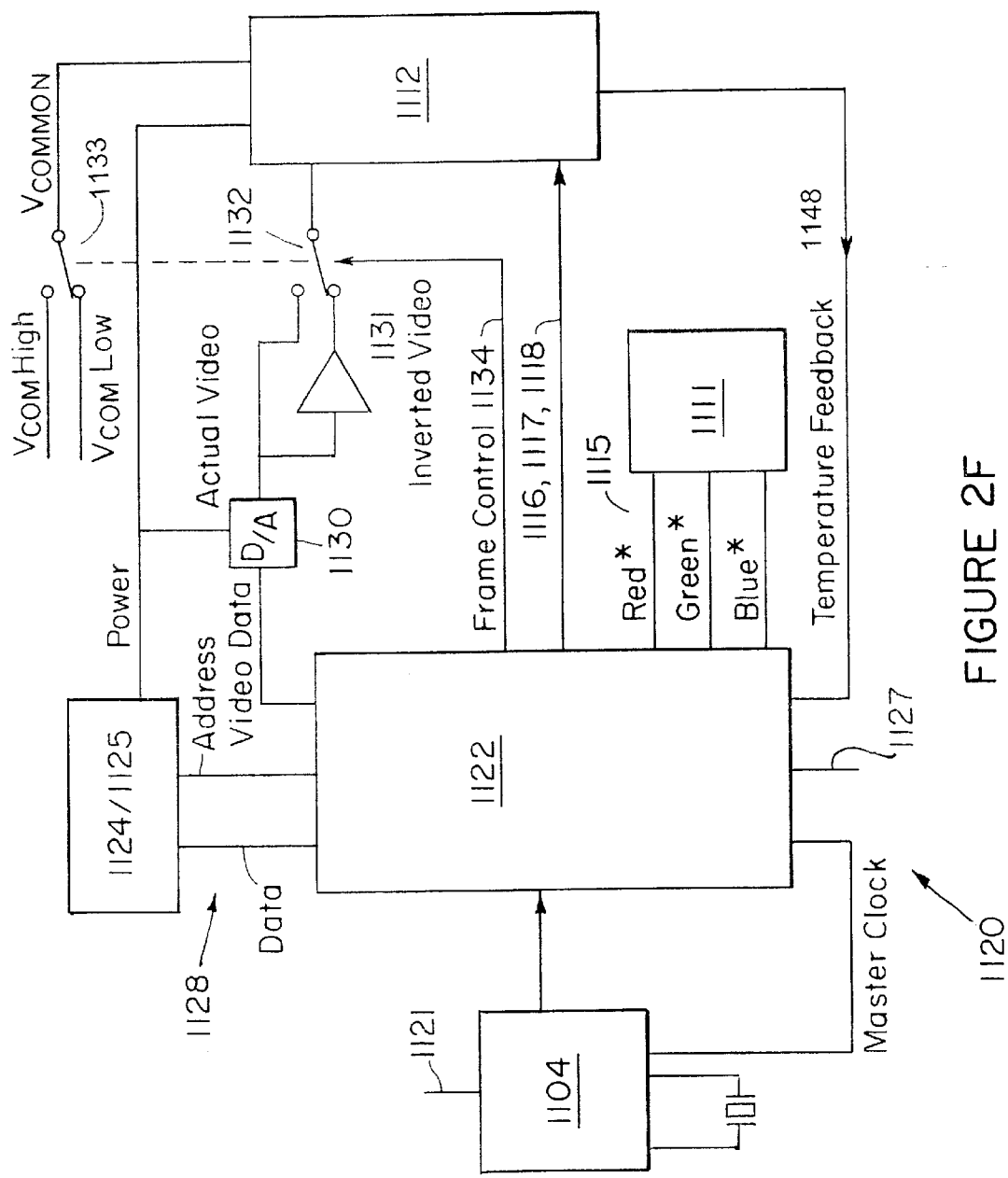
FIG. 2F illustrates an alternative preferred embodiment of the display control circuit in accordance with the invention.
Figure 2G:
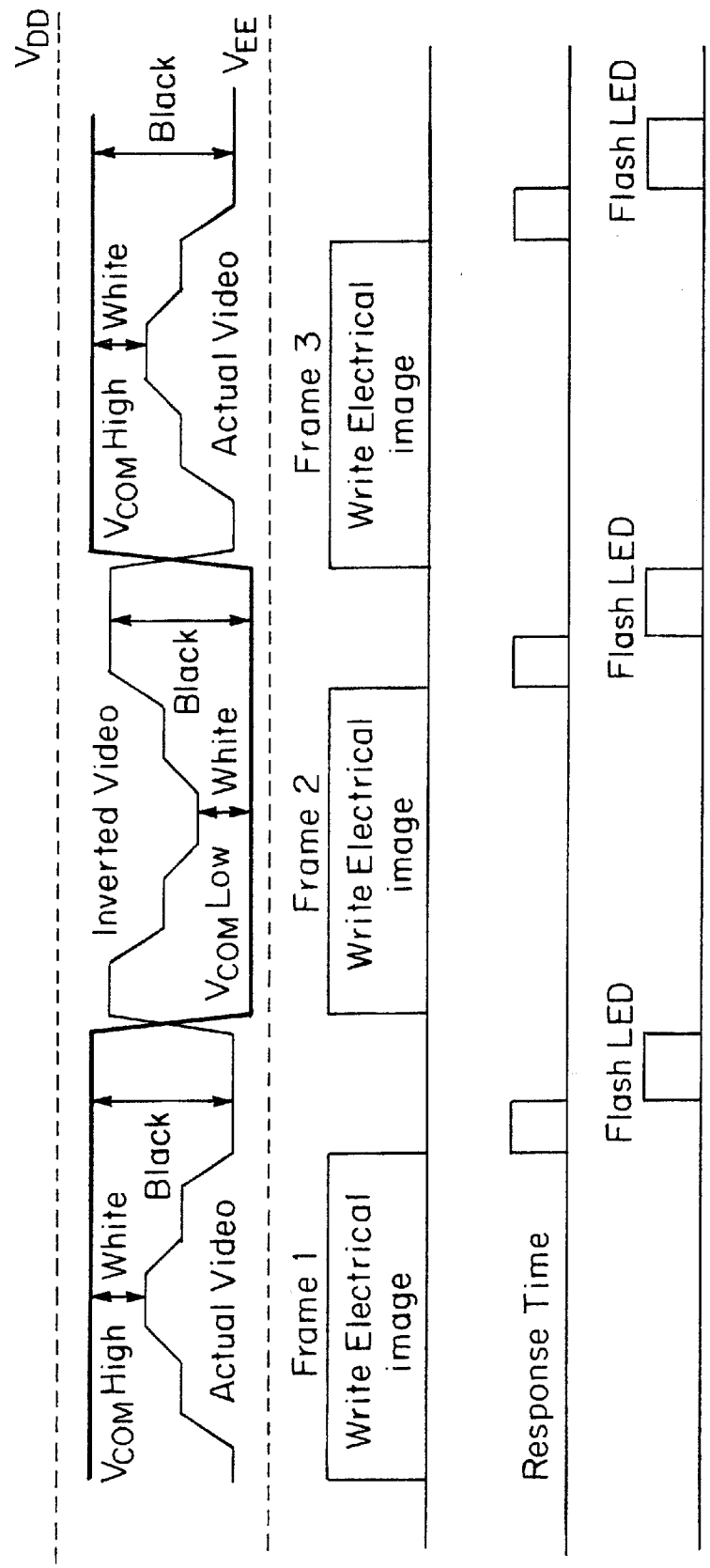
FIG. 2G illustrates a timing diagram for the display control circuit illustrated in FIG. 2F

Referring to FIGS. 2G and 2F, with the common voltage ($V_{COM}$)high, approximately 3–5 volts in a preferred embodiment, the actual video signal is scanned into the matrix circuit. After a delay to allow for the liquid crystal to twist to maximum position, the LED backlight 1111 is flashed to present the image. Prior to the next frame, frame 2 in FIG. 2G, $V_{COM}$ goes low, approximately zero (0) volts in a preferred embodiment. Driving $V_{COM}$ low erases the image that has just been scanned. However, since there is no backlight on, the loss of the image is not seen. With $V_{COM}$ low, the inverted video signal is scanned into the matrix circuit. Similarly, after a delay to allow the liquid crystal to twist, the LED backlight 1111 is flashed to present the refreshed or new image. Prior to the next frame, frame 3 in the Figure, $V_{COM}$ goes high. Driving $V_{COM}$ high results in the image that has just been scanned to be erased. With $V_{COM}$ high, an actual video signal is scanned into the matrix circuit. A delay occurs and then the LED backlight 1111 is flashed. The common voltage ($V_{COM}$) and the video keep on alternating. If the display is a color display, the LED backlight 1111 sequentially flashes the distinct colors. In addition, three screen scans, one for each color LED, comprises a frame and the $V_{COM}$ alternates each screen.

In a preferred embodiment, $V_{COM}$ fluctuates every 15–20 milliseconds. It takes 3–5 milliseconds to write/scan the image. The LED flashes for a time period of about 3 milliseconds. It is recognized that it may be desirable to vary the delay time before flashing the LED or varying the length of the LED flash dependent on the color LED to be flashed. For example, it may be desirable to have a longer delay time, response time, before flashing the LED when the LED to be flashed has a longer wavelength, such as red, which has a wavelength of between 630 and 700 nm.

With the video amplitude, the difference between $V_{DD}$ and $V_{EE}$, on the pixel's TFT reduced, a smaller storage capacitor is required. Less time is need to write with a smaller storage capacitor and therefore a smaller pixel TFT can be used. If the liquid crystal has a fast enough response, the storage capacitor can be eliminated and the capacitance of the liquid crystal becomes the storage capacitor. In addition, with no storage capacitor a larger aperture is possible. With larger aperture and increased aperture ratio, the image will be brighter for the same cycling of the backlight or the total power used can be reduced with the same image brightness.

Figure 2H:
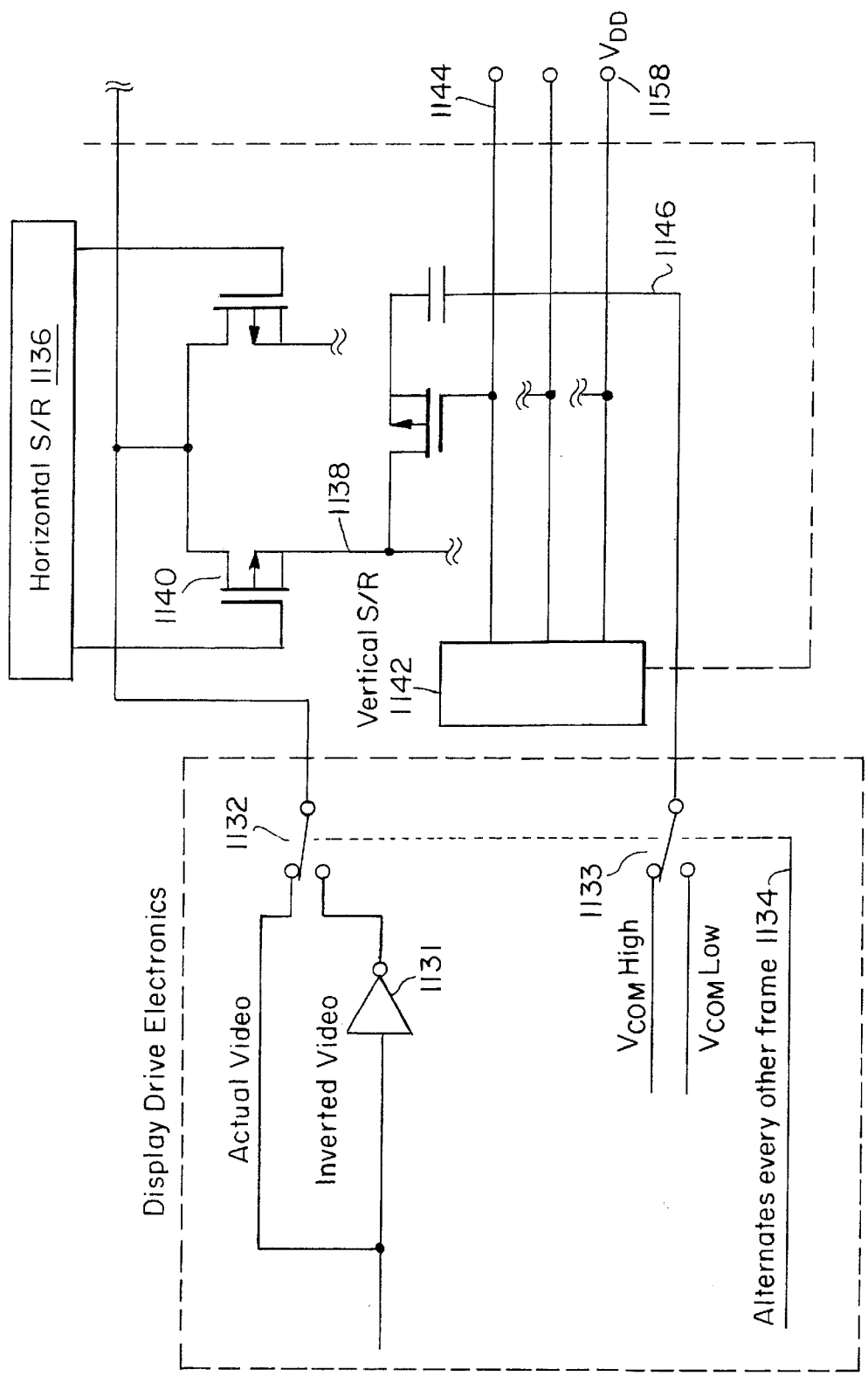
FIG. 2H illustrates a portion of the display control circuit shown in FIG. 2F.

Referring to FIG. 2H, an enlarged schematic view of one pixel, the pixel is charged by the horizontal shift register 1136 selecting a column 1138 by turning a transmission gate 1140 and the vertical shift register 1142 selecting a row 1144. The video is written to the pixel and the liquid crystal begins to twist and become optically transmissive. After the entire display has been written and there has been a delay before the LED flashes, the $V_{COM}$ 1146, i.e., the voltage to the counterelectrode, is switched from high to low or vice versa by the frame control line. At the same time, the video signal is switched from actual video to inverted video or vice versa, so that the video will be switched for the next frame.

Referring back to FIG. 2F, the display circuit has an additional line, a temperature sensor line 1148, which runs from the display 1112 to the timing control circuit 1122. The active matrix comprises a plurality of pixels arranged in columns and rows. Heat is preferably absorbed substantially uniformly throughout the liquid crystal material. However, there may be local temperature variations due to the nature of the image being displayed as well as display and heater geometry and environmental conditions. Temperature sensors can be distributed throughout the active matrix region including around the perimeter of the active matrix including the corners and also disposed near the center of the active matrix. The use of a temperature sensor is described in U.S. patent application Ser. No. 08/364,070 filed Dec. 27, 1994 and is incorporated herein by reference.

The characteristics of the liquid crystal material is effected by the temperature of the liquid crystal. One such example is the twist time of twisted-nematic liquid crystal material, which is shorter when the liquid crystal material is warm. By knowing the temperature of the liquid crystal, the timing control circuit 1122 can set the duration and timing of the flash of the backlight 1111, therein achieving desired brightness and minimizing power consumption.

Another preferred embodiment of the display 1112 has an internal heater. Referring back to FIG. 2H, during normal operations, the vertical shift register 1142 has only one row on, so that as the horizontal shift register 1136 moves from column to column only one pixel is affected. After the last pixel on a row is addressed, the vertical shift register 1142 switches the active row. The display 1112 can be placed in a heat mode where each row 1144 is turned on and has a voltage drop across the row to create heat. In the embodiment shown in FIG. 2H, an end 1158 of each row line is connected to $V_{DD}$ and the end near the shift register is driven low thereby creating a voltage differential across each line. The heat is generated since $P=V^2/R$, where R is the resistance of the row lines. In normal operation, only the selected line which contains pixels to be driven low generate heat, not the entire display.

Figure 2I:
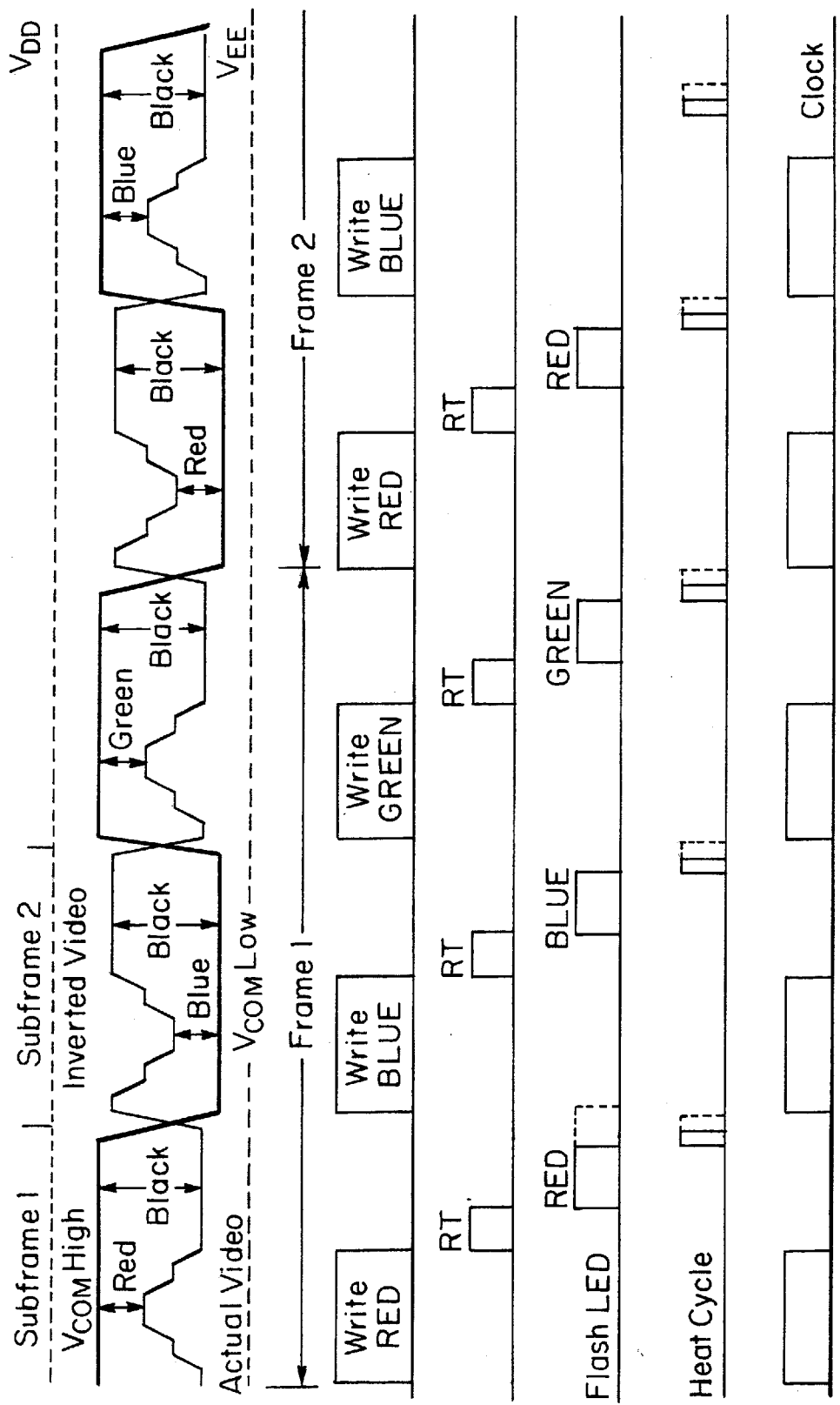
FIG. 2I illustrates an alternative timing diagram for the display control circuit illustrated in 2F.

Referring to FIG. 2I, with the common voltage ($V_{COM}$) high, the actual video signal is scanned into the matrix circuit. After a delay to allow for the liquid crystal to twist into position, the LED backlight 1111 is flashed to present the image. Prior to the next screen or subframe, a heat cycle occurs where all the row lines are driven such that there is a voltage differential across the row. The heating can occur while $V_{COM}$ and the video are being alternated and inverted, respectively, by the frame control line 1131. FIG. 2I shows a heating cycle after each subframe, but the number and time period of heat cycles can be dependent on the temperature of the liquid crystal as determined by the temperature sensor 1132. In cold environments, the digital circuit 1120 can have a warm-up cycle where the heater is turned on prior to the first painting of the screen.

Still referring to FIG. 2I, driving $V_{COM}$ low erases the image that has just been scanned. However, since there is no backlight on, the erasure of the image is not seen. With $V_{COM}$ low, the inverted video signal is scanned into the matrix circuit. Similarly after a delay to allow the liquid crystal to twist, the LED backlight 1111 is flashed to present the refreshed or new image. Prior to the next screen, frame 1, subframe 3 in the Figure, $V_{COM}$ goes high. The driving $V_{COM}$ high results in the image that has just been scanned to be destroyed. With $V_{COM}$ high, an actual video signal is scanned into the matrix circuit. A delay occurs and then the LED backlight 1111 is flashed. The common voltage ($V_{COM}$) and the video keep on alternating.

The delay time before beginning the flash and the flash time are shown as identical in FIG. 2I. However, both the delay time (the delay for response time of the liquid crystal) and the flash time can be dependent on the specific color to be flashed. The delay time is dependent on when the liquid crystal associated with the last pixel to be written has sufficient time to twist to allow that specific color to be seen. The duration of the flash, or the point that the flash must be terminated, is dependent on when the liquid crystal associated with the first pixel to be written of the next frame has twisted sufficiently that light from the backlight is visible to the viewer. For example referring to FIG. 2I, it is not desirable for the red flash to be on, when the writing for the blue subframe has progressed to the point that the first pixel written for the blue subframe has resulted in the liquid crystal being optically transmissive for red wavelengths. The ending of the flash does not have to occur until sometime after the beginning of the writing of the next subframe because of response time of the liquid crystal.

The timing control circuit 1122, as seen in FIG. 2F, can vary the flash duration and the delay or response time dependent on the color that is to be flashed. In addition, the current to the backlights 111 can be varied to adjust the intensity of the color. If desired, a color control line 1127 can be added to the timing control circuit 1122 to allow the user to vary the color.

It is recognized that the method of generating heat is different on different displays. For example, referring to FIG. 2A in which a select scanner 46a and 46b is located on both sides of the display and is connected to each end of the row, in typical operations either both ends are high or both ends are low depending on whether the row is being addressed. In order to heat the display, one of the select scanners, for example 46a, can be driven high for all the rows, and the other select scanner, for example 46b, is driven low for all rows therein creating a voltage difference across the row lines.

The clock timing sent to the display 1112 is shown in FIG. 2I. The clock timing is needed by the display 1112 only when writing to the pixels. The capacitance of the storage capacitor holds the liquid crystal in the proper position during the time the backlight 1111 is flashing. By periodically sending clock signals to the display 1112 for typically as much as fifty percent (50%) of the time results in a power reduction.

Figure 2J:
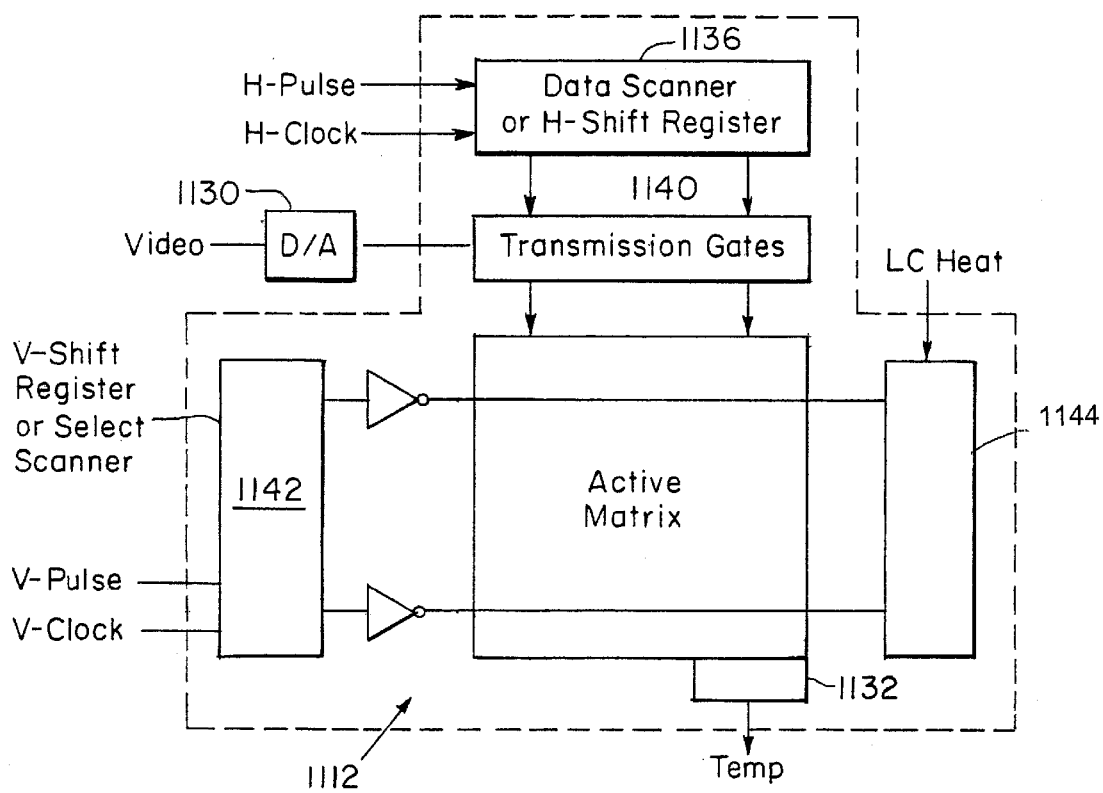
FIG. 2J illustrates an alternative preferred embodiment of the display with a heat gate.

Referring to FIG. 2J, a schematic of the display 1112 and the digital to analog converter 1130 are shown. The display has a horizontal shift register 1136, a vertical shift register 1142, and switches 1140 similar to what is illustrated in FIG. 2H. In addition, and in contrast to FIG. 2H, FIG. 2J illustrates a heating gate 1144.

Figure 2K:
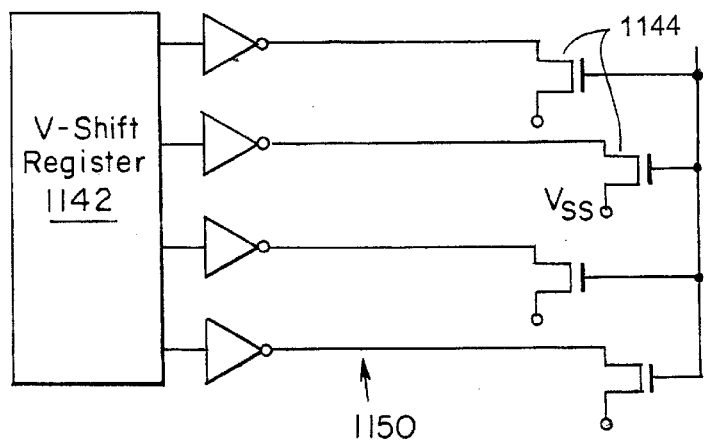
FIG. 2K illustrates a portion of the display shown in FIG. 2J.

Referring to FIG. 2K, for pixels which have p-channel TFTs, the heating gate 1144 has a series of n-channel TFTs. Typically when writing to the display only the row being written to is on (V=0). When not writing to the display, all the rows are $V_{DD}$. When the n-channel TFTs turned on, by applying $V_{DD}$ to a heat line 1150 results in current flowing from the inverter associated with the vertical shift register 1142 through the row to the n-channel TFT and heat is dissipated along the entire row. The drain is connected to $V_{EE}$, which is zero. It is also recognize that the display 1112 can have several extra rows outside the typical array to assist in uniform heating.

Figure 2L:
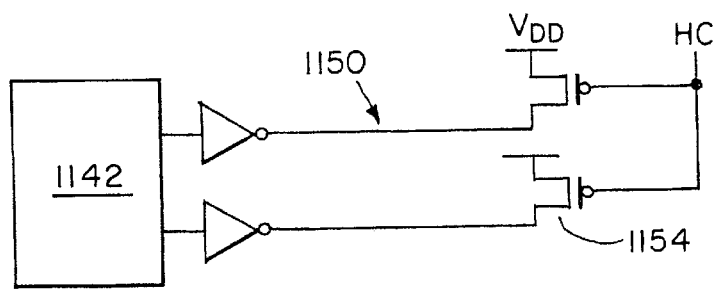
FIG. 2L illustrates an alternative embodiment of a portion of the display shown in FIG. 2J.

Likewise for pixels which have n-channel TFTs, referring to FIG. 2L the heating gate 1144 has a series of p-channel TFTs. Typically when writing to the display only the row being written to is on (V=$V_{DD}$). When not writing to the display, all the rows are approximately zero (0) volts. When the p-channel TFTs are turned, by setting the gate to zero (0), there is a voltage drop across the row of $V_{DD}$.

It is recognized that $V_{COM}$ addressing and the heating of the display can used independently. Heating can be incorporated into the embodiments described with respect to FIGS. 2A–2D. While an internal heater is preferred, it is recognized that a separate heater can be used with the temperature sensor.

Figure 2M:
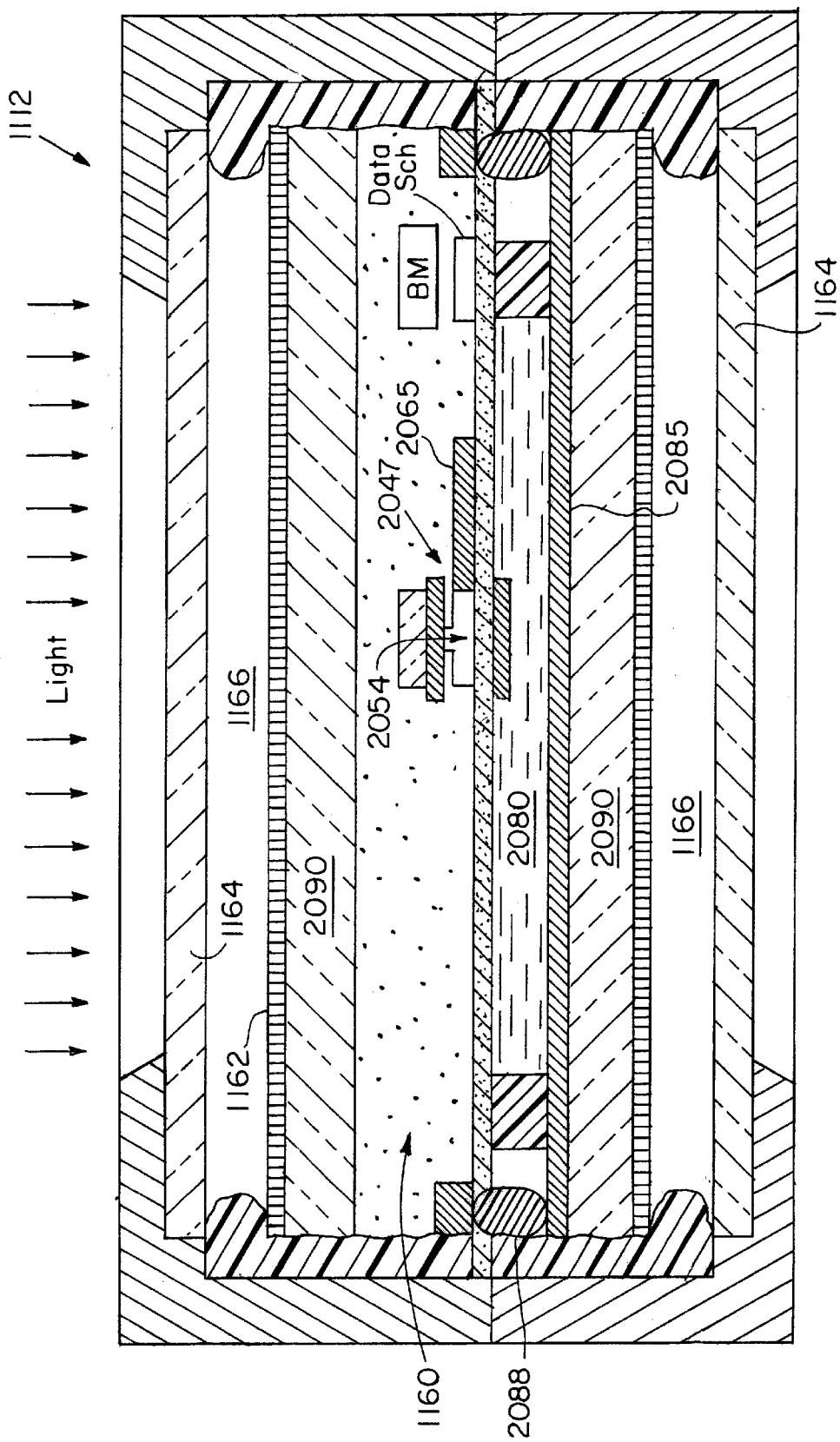
FIG. 2M is an enlarged sectional view of the display in its housing.

Referring to FIG. 2M, a sectional view of the display 1112 is shown. The display 1112 has an active matrix portion 1160 including a pixel element 2047 spaced from a counterelectrode 2085 by an interposed liquid crystal material 2080. Each pixel element 2047 has a transistor 2054 and a pixel electrode 2065. The active matrix portion 1160 can have aluminum light shields 2086 to protect the transistor (TFT) 2054 if the active matrix is used for projection requiring high luminance light. The counterelectrode 2085 is connected to the rest of the circuit by solder bumps 2088. The matrix 1160 is bounded by a pair of glass substrates 2090 in this embodiment and a pair of polarizers 1162. An additional pair of glass plates 1164 are located outboard of the active matrix portion 1160. The glass plates 1164 are spaced from the polarizer 1162. The space defines an insulation layer 1166. The display 1112 includes a two-piece case 1168 which contains the active matrix portion 1160, the glass plates 1162 and the polarizers 1164. A room temperature vulcanization (RTV) rubber 1170 helps in maintaining the elements in proper position in the case.

A preferred embodiment in the form of a stand-alone video display device 20 featuring a liquid crystal display incorporating the actual matrix display circuit 100 will now be described in connection with the exploded views of FIGS. 3A and 3B.

Figure 3A:
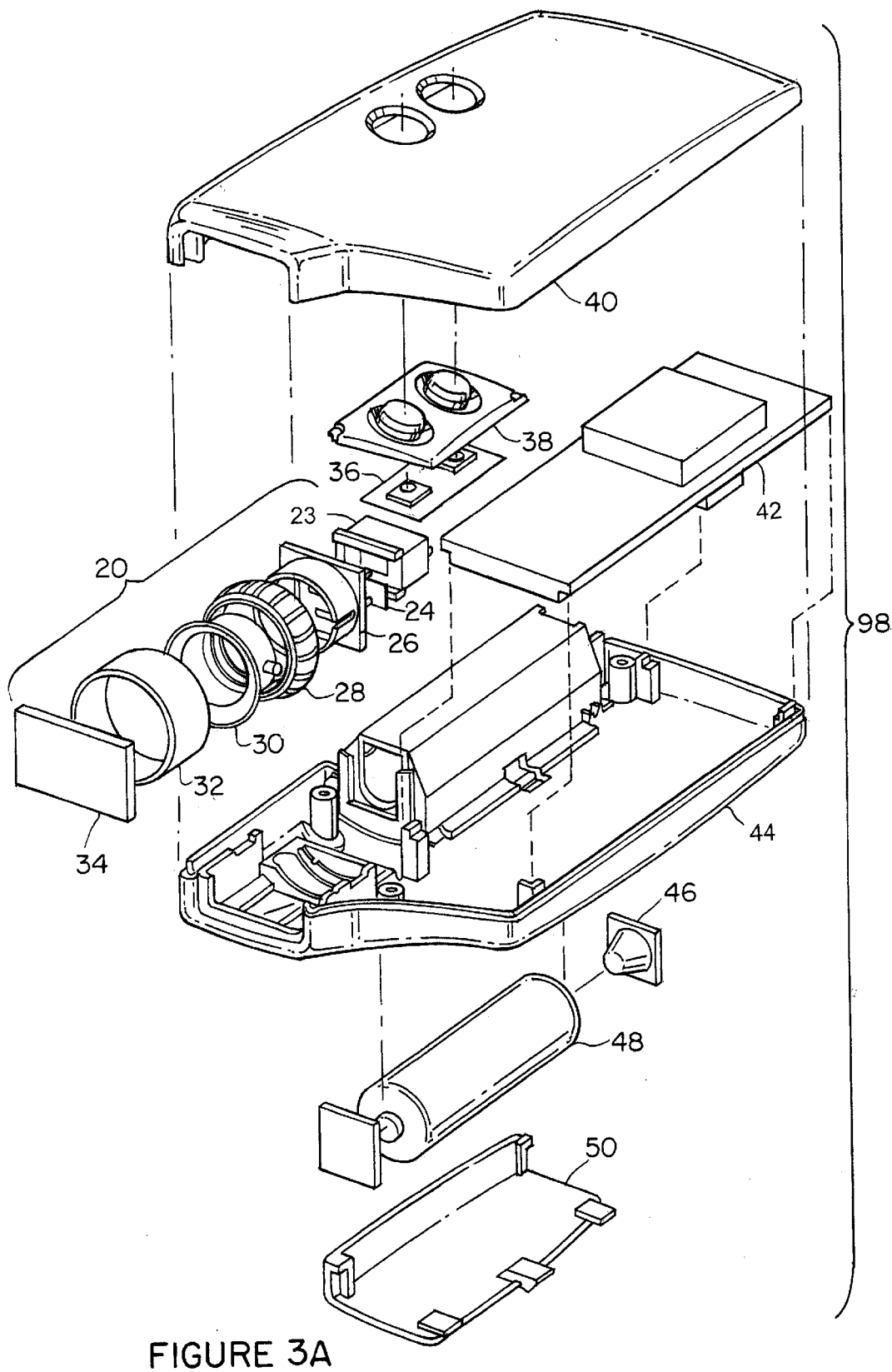

In FIG. 3A, a portable imaging device such as a pager is illustrated having a housing including a top 40 and a bottom 44 with a door 50 for access to a battery 48. The battery 48 provides power to the circuit board 42, the display 24 and the back light 22. The pager can be operated by controls 38 or push buttons accessible through one of the housing surfaces that actuate display functions. An optical system 20 is positioned within the housing and includes a back light 22, preferably an LED back light, a transmission liquid crystal display 24, a focusing mechanism including a knob 28 that the user rotates to move the tunnel 30 relative to the optic slide 26, a lens assembly 32, and a cover glass 34.

Preferred embodiment of hand held display devices are illustrated in connection with FIGS. 4A–4K. FIG. 4A is a perspective view of a preferred embodiment of a pager system 150 having two display viewing areas 152 and 154 within a housing 155. Viewing area 152 has a lens through which the user views a microdisplay as described previously. A second flat panel display without magnification is viewed by the user at 154. The second display is a simple low resolution numeric and/or alphabetic display to read telephone numbers or scrolled numbers or messages. The microdisplay magnification can be adjusted at switch 158. The displays are operated by switches 156, 157. As seen in the rear view of FIG. 4B, the rear surface 162 of housing 155 is thicker in that portion containing the microdisplay and the battery. In the alternative embodiment illustrated in FIG. 4Ba, the rear panel 162 is removed to expose the cavity 159 for the battery and the rear of the display assembly 161. Also shown in this embodiment is a cover 163 which slides to cover or expose a camera including an image sensor 166 and lens 167. The digital imaging sensor 166 can take images electronically stored within a memory within th pager that can be sent by wireless transmitter to a personal computer, a telephone as described herein, or web browser. The images can also be loaded by wire through port 169 onto a personal computer, or alternatively, can be loaded onto a smart card or flash memory card that can be inserted into one or more card slots 168. The port 169 can also be connected directly to a keyboard or touchpad as described herein. The sideview of the housing 155 shown in FIG. 4C illustrates a clip 160 that is used to fasten the device to the clothing of the user. The clip 160 is attached to the bottom surface 164 of the housing 155 as shown in FIG. 4D.

Figure 4E:
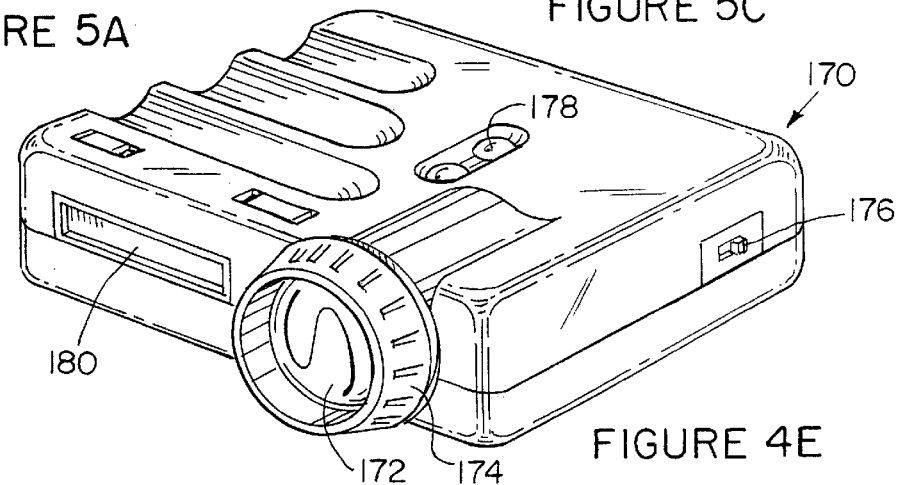
FIGS. 4A–4K are exterior views of hand-held imaging devices in accordance with the invention.
Figure 4A:
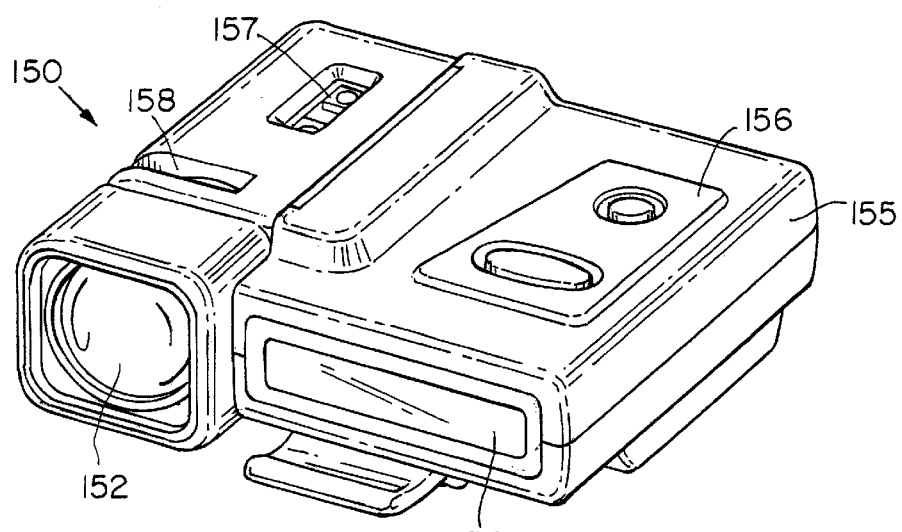
Figure 4C:
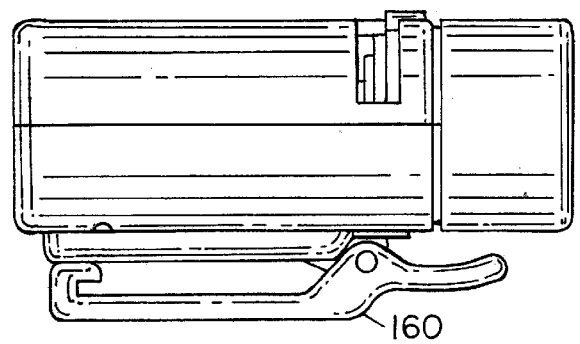
Figure 4B:
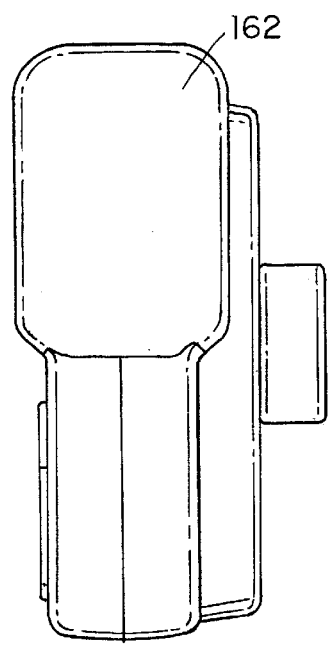
Figure 4D:
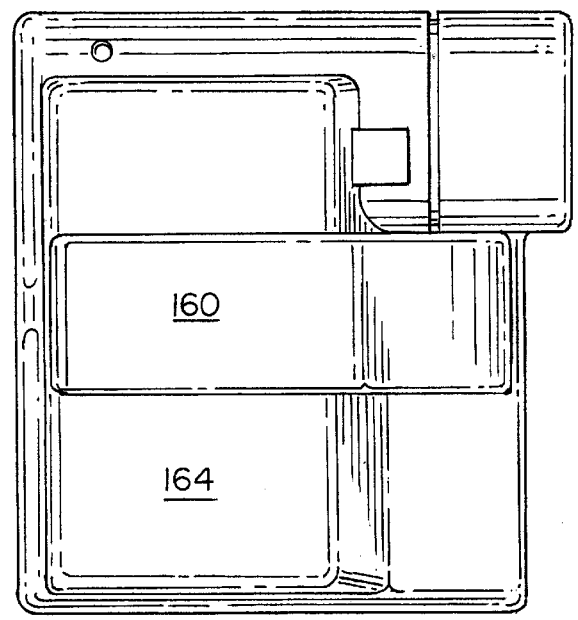
Figures 4F, 4G:
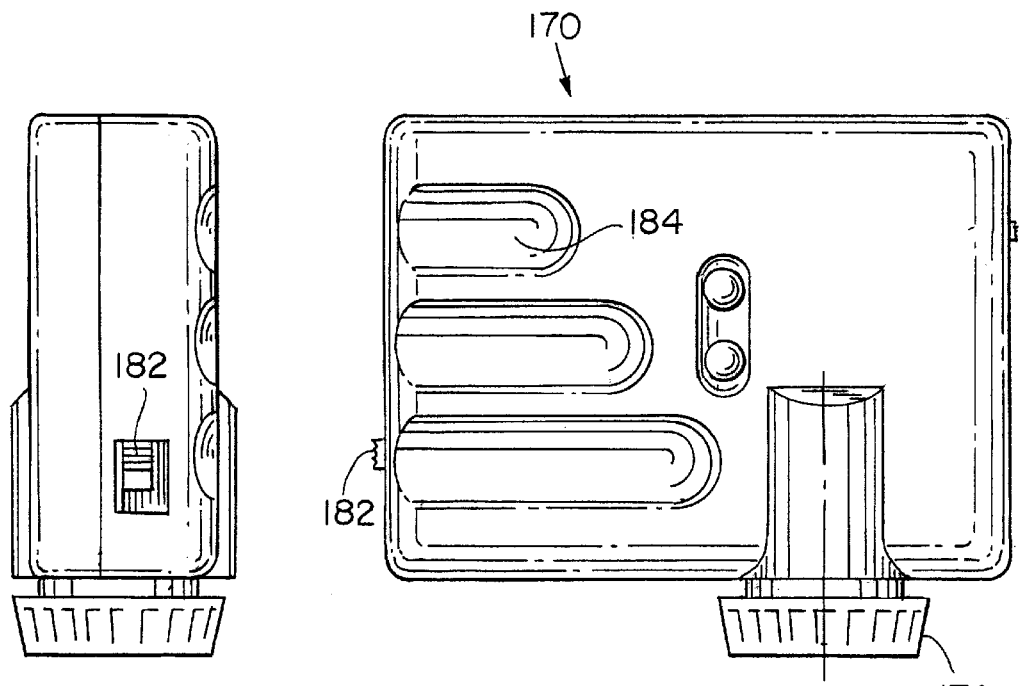

Another preferred embodiment of a hand-held viewing device 170 is illustrated in the perspective view of FIG. 4E. A first display is seen through lens 172 with magnification being adjusted by knob 174. A second display 180 as described above is positioned on the same side of the device 170 as the lens 172 for ease of viewing. The displays are operated by switch 176 and buttons or control elements 178. A top view is illustrated in FIG. 4F showing ridges 184 that accommodate the fingers of the user and the second display switch 182, which is shown more clearly in the side view of FIG. 46.

Figures 4H, 4I:
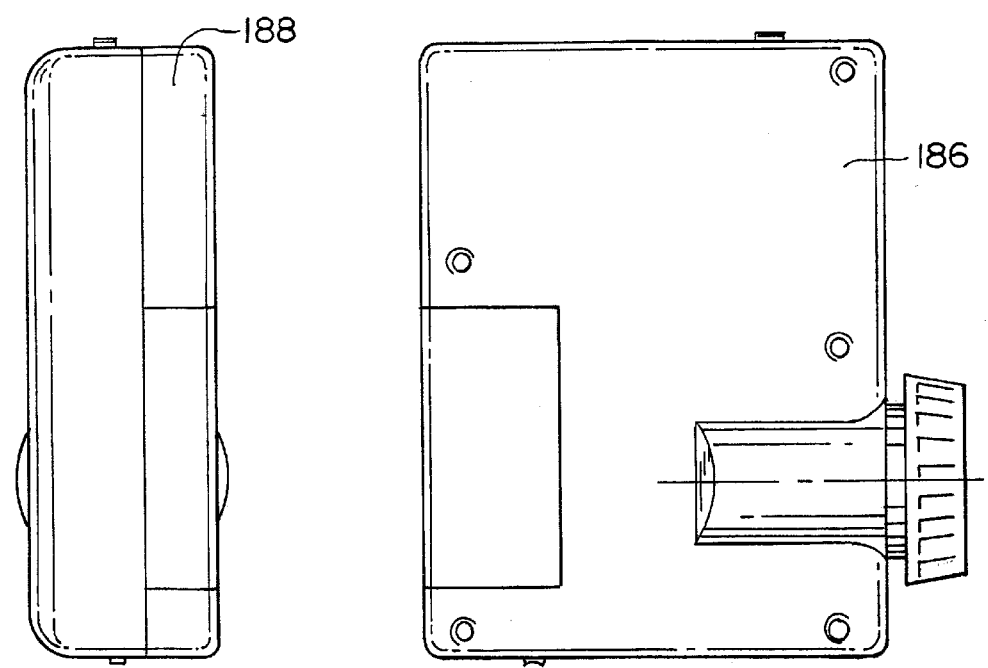
Figure 4J:
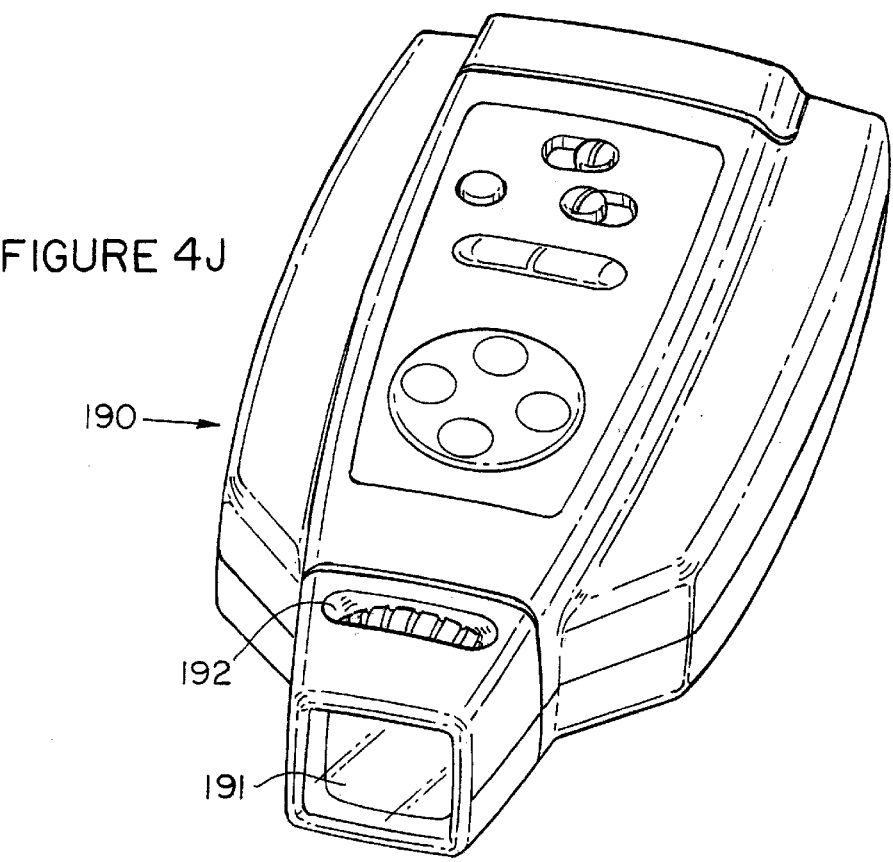
Figure 4K:
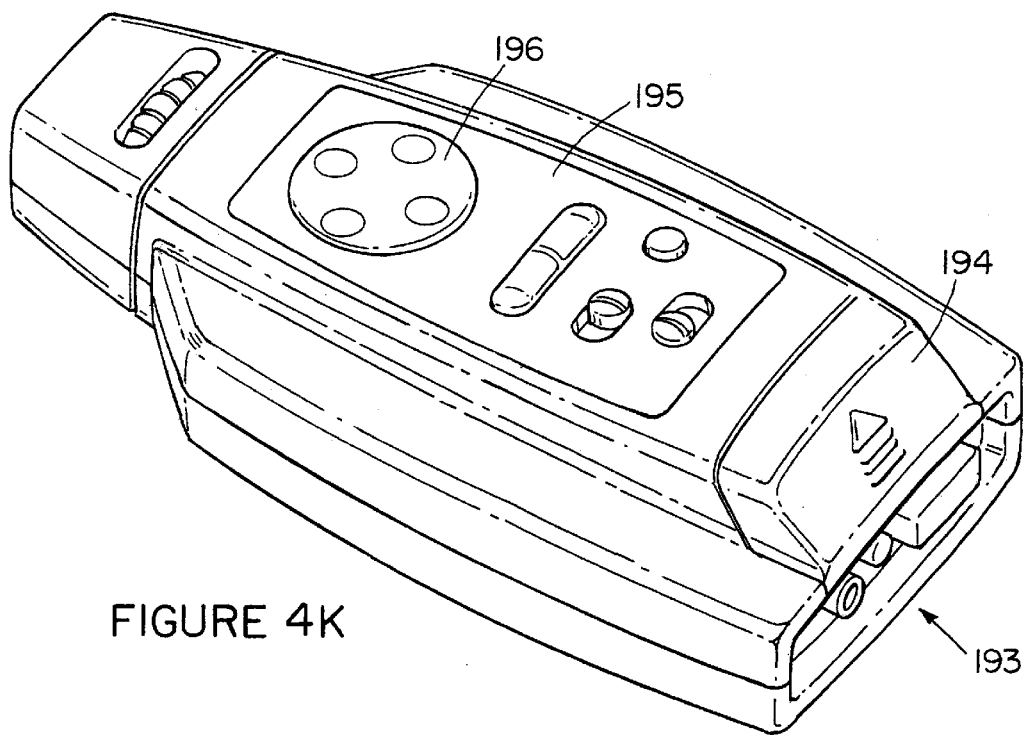

Rear and bottom views of device 170 show rear 188 and bottom 186 sides in FIGS. 4H and 4I, respectively.

Figure 5A:
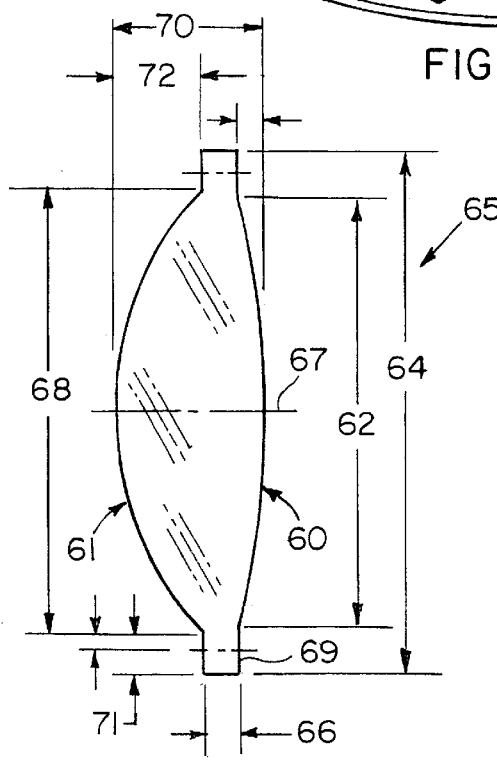
FIG. 5A is a side view of a lens suitable for magnifying a microdisplay in accordance with the invention.

A lens 65 suitable for magnifying the image of a microdisplay for viewing by a user is illustrated in the example of FIG. 5A.

For a 0.25 inch diagonal microdisplay, the outer diameter 64 of the lens can be about 30.4 mm, the thickness 70 of the lens at the optical axis 67 can be about 8 mm, the inner surface 60 that receives light from the display has a curved diameter of about 21.6 mm, and the viewing surface 61 has a diameter of 68 of about 22.4. The peripheral edge 69 used to hold the lens in the assembly can have a thickness 66 of about 2 mm and a radius 71 of about 4 mm. The lens 65 can be made of glass or a plastic material such as acrylic. This particular example of such a lens has a 16 degree field of view and an ERD of 25. The lens assembly can include an automatic focusing system, or a lens system that collapses in size when not in use.

Another preferred embodiment for providing a color display can use a diffraction optical system such as those described in U.S. application Ser. No. 08/565,058 filed on Nov. 30, 1995, the entire contents of which is incorporated herein by reference.

Figure 5B:
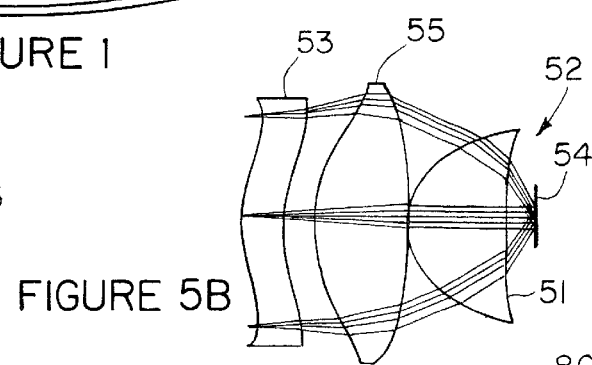
FIG. 5B is a side view of a multi element lens providing an increased field of view.

Another preferred embodiment of a 1.25 inch diameter lens system 52 with a larger field of view is illustrated in FIG. 5B. Three lens elements 51, 53 and 55 enlarge the image on the display 54.

Figure 5C:
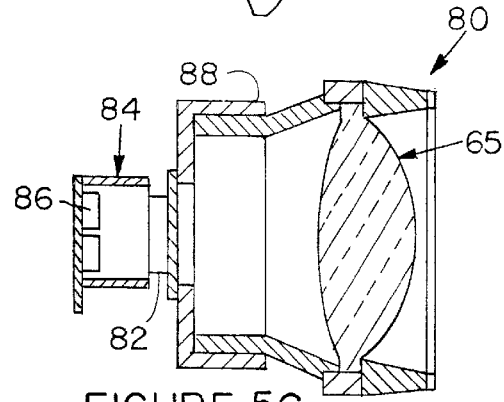
FIG. 5C is a cross-sectional view of a display assembly with a fixed lens.

The lens 65 of FIG. 5A can be used in the alternative display assembly of 80 of FIG. 5C. In this embodiment, the display 82 is positioned between the back light housing 84, containing LED 86, and the lens housing 88 that holds the lens 65 in a fixed position relative to the display 82.

Figure 5D:
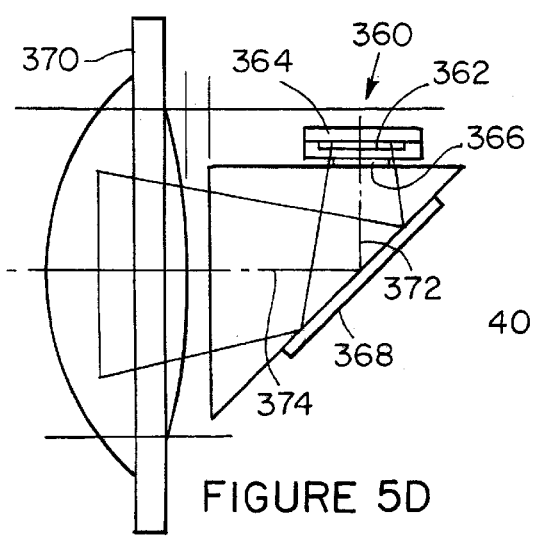
FIG. 5D is a schematic view of an LED backlighting system for a liquid crystal display in accordance with the invention.

A microdisplay system 360 utilizing a folded optical path is illustrated in connection with FIG. 5D. In this embodiment, an LED array 362, or other light source, illuminates the display within housing 364. The display 366 directs an image along a first optical path 372 that is reflected by mirror 368 along a second other path 374 through the lens 370 as described previously.

Figure 5F:
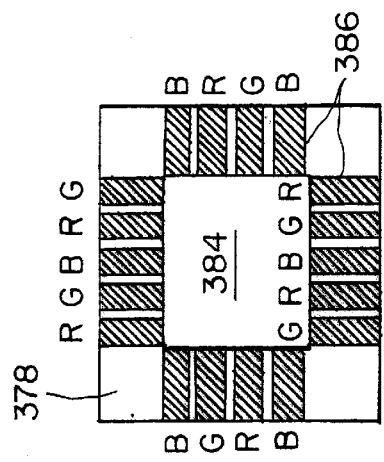
Figure 5G:
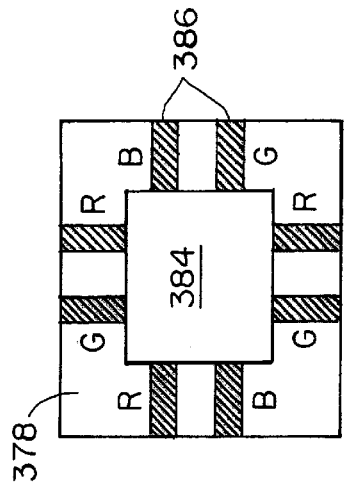
Figure 5E:
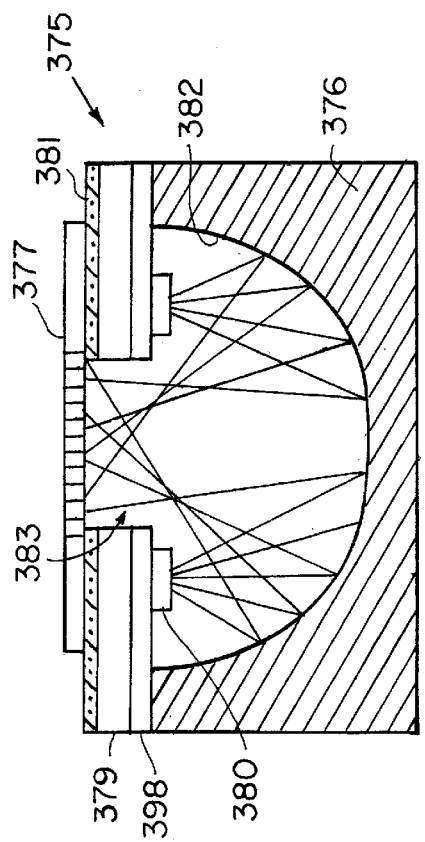

Another preferred embodiment of the back light system is illustrated in FIGS. 5E–5G. The back light 375 includes a reflective bowl 376 with an inner concave surface 382 that reflects light emitted by the LEDs 380 onto the active matrix region of display 377. The LEDs 380 are mounted on a circuit board 378 that is electrically connected to the timing circuit described previously. The system 375 can also include a heat sink 379 for applications requiring thermal isolation of the display circuit from the back light circuit. The element 379 can be a silicon carbide, silicon, or aluminum nickel plate or wafer. The element 379 can be insulated from the display 377 with layer 381 such as an adhesive. The circuit board 378, element 379 and optional layer 381 have openings that are aligned to provide an aperture 383.

A preferred embodiment of printed circuit board 378 on which the LEDs are mounted is shown in FIG. 5F. In this embodiment 18 blue, green and red LEDs 386 are positioned around opening 384. Another preferred embodiment utilizing 8 LEDs 386 is illustrated in FIG. 5G. Fewer LEDs allow the circuit to operate at lower power. Additionally, for color sequential operation, where frame rates are relatively high, the LEDs are driven at higher rates to increase brightness.

Figure 5H:
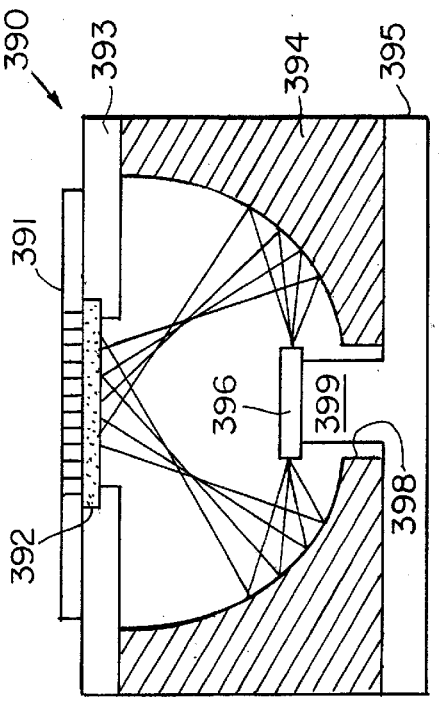

Another preferred embodiment of a back light is illustrated by the system 390 of FIG. 5H. In the embodiment the circuit board 395 on which the LEDs 396 are mounted is positioned underneath the reflective bowl 394 with the LEDs 396 mounted on a post 399 extending through opening 398. Light is diffusely reflected by bowl through diffuser 392 onto display 391.

FIG. 5I illustrates a back light housing 84 with an aperture on one side through which light exits the housing and is directed through the display. The housing has a base and sides 135 in the folded opened view of FIG. 5J. The display is mounted onto plate 393. The display 391 can be connected to external connectors 137 by flexible circuit boards 136 which wrap around the sides of the bowl. The back light housing preferably has a volume of less than 0.5 cubic inches. The display module has a volume of less than 2 cubic inches and preferably less than 20 cm$^3$.

A system having a volume less than 15 cm$^3$ is illustrated in connection with FIGS. 5K–5O. FIG. 5K is a perspective view of an assembled display module 470. The exploded view of FIG. 5L shows the elements of system 470 in detail. The back light reflector is positioned in back light housing 473 which can be adhered directly onto the display 475 with an epoxy adhesive or with an optional clip 474. The display is held by a display holder 476 which can also serve to define the visual border for the active area of the display as seen by the user through transparent window 482. The holder 476 is attached to holding panel 477 which retains ring 478 within the proximal end of housing element 471. The ring can be manually or electrically actuated to rotate and thereby translate optics holder 472 along the optical axis 486. A pin 479 can be used to couple the holder 472 to internal helical thread of ring 478. The lens 480, an optional second lens within the distal end of holder 472, a color correction element 481 and window 482 can all be held within holder 472 which moves relative to the display to focus the image thereon.

Figure 13A:
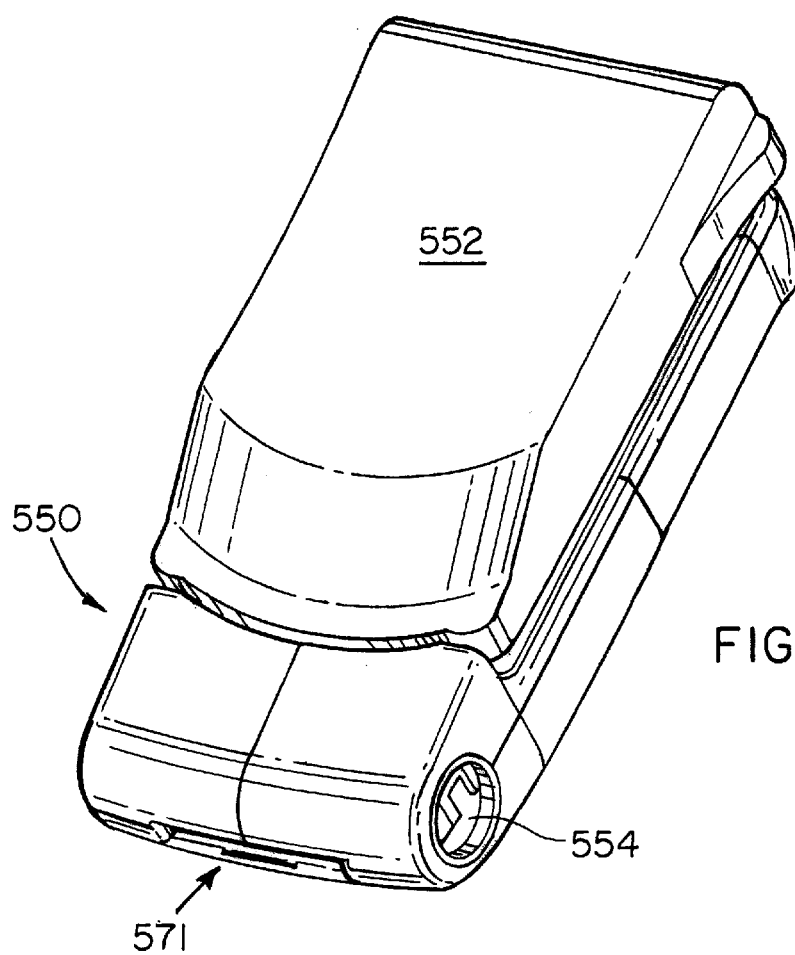
FIGS. 13A–13K illustrate other preferred embodiments of the invention including a display docking system for a cellular telephone.
Figure 13B:
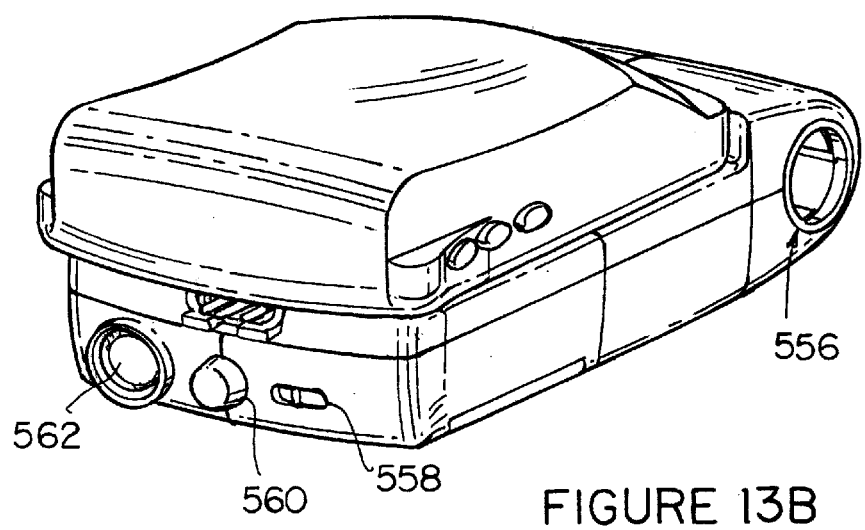
Figure 13C:
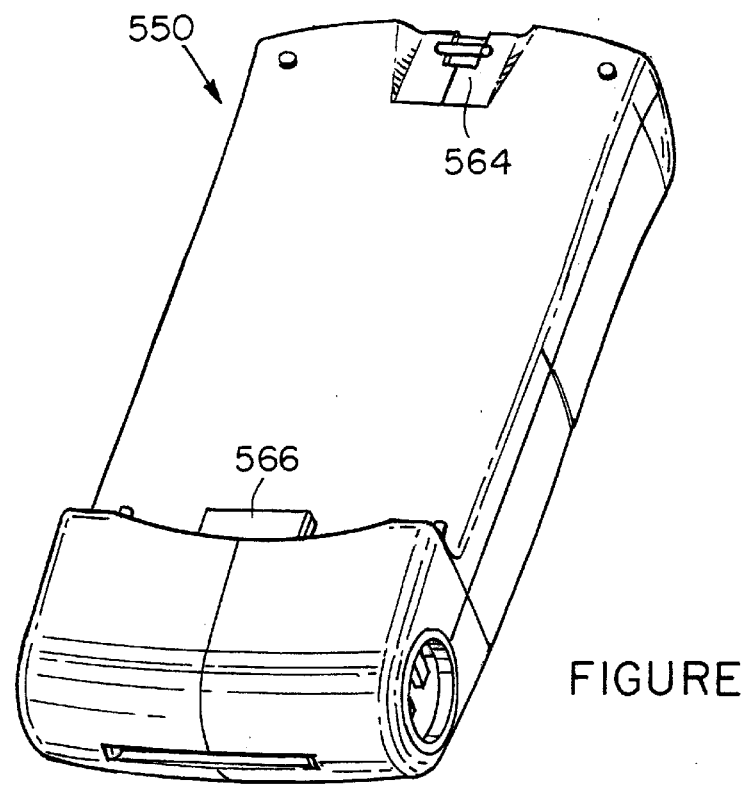
Figure 13D:
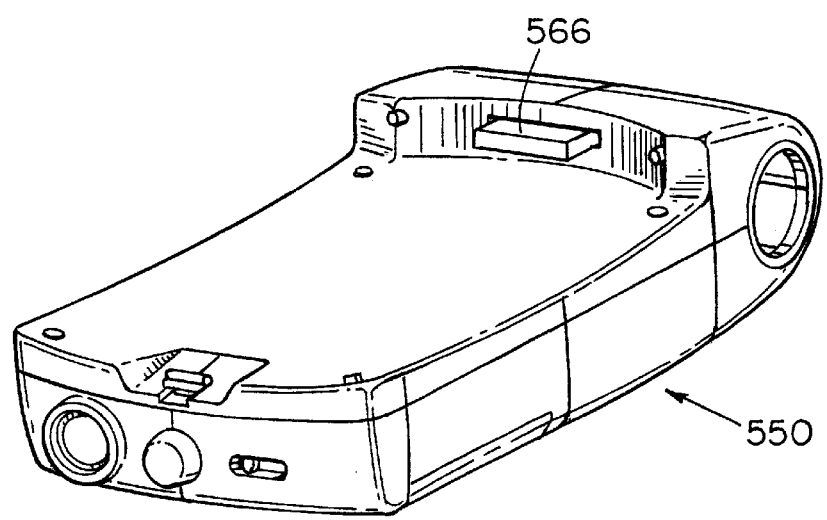
Figure 13E:
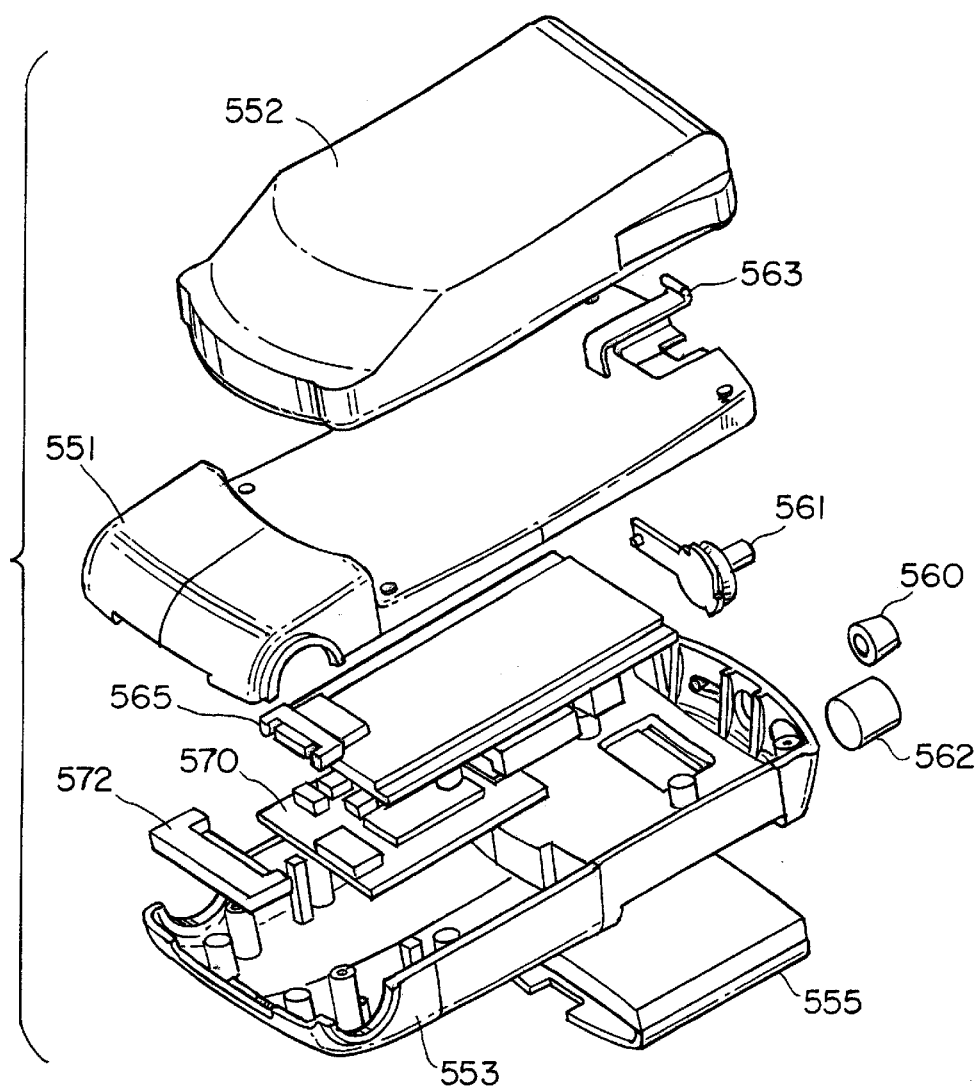
Figure 13F:
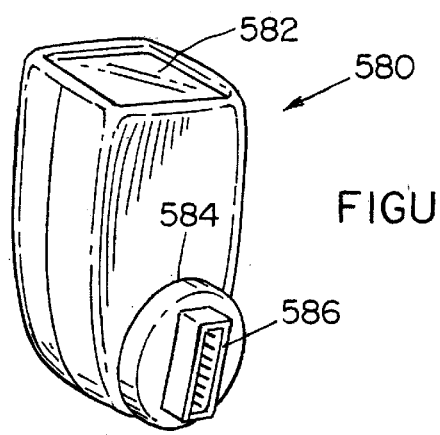

Element 470 fits snugly within an external housing such as that shown in FIG. 13F, or within the other device housings as described herein.

Figure 5M:
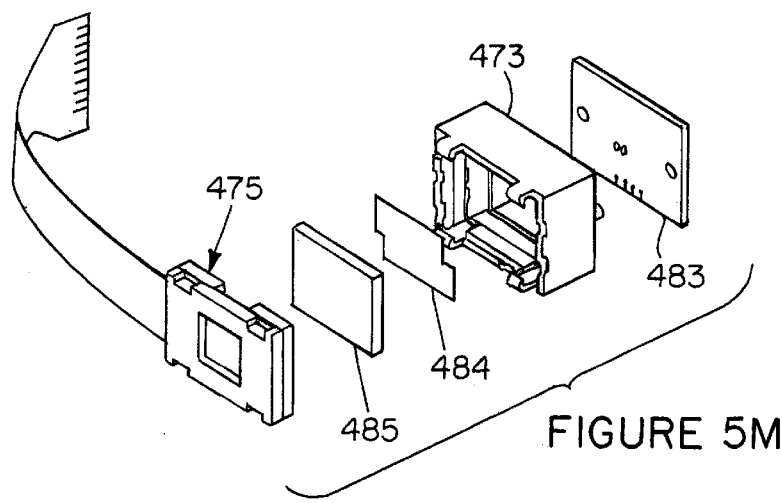
Figure 5N:
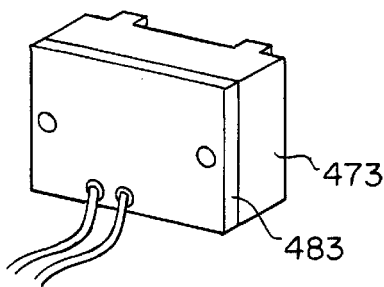
Figure 5O:
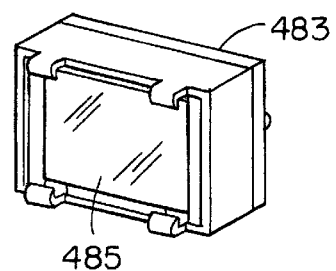

An exploded view of a preferred embodiment of the back light relative to the display 475 is shown in FIG. 5M. The display circuit and LED back light are mounted on circuit board 483. Preferably, two or three LEDs are used to provide two or three colors, respectively. Between the back light housing 473 and the display 475, a brightness enhancement film 484, such as the "BEF" film available from 3M Corporation can optionally be used along with a diffuser 485. As seen in FIGS. 5N and 5O, the circuit board 483 mounted on a first side of housing 473 and the back light active area is defined by the diffuser 485 on a second side of the housing 473.

Figure 5P:
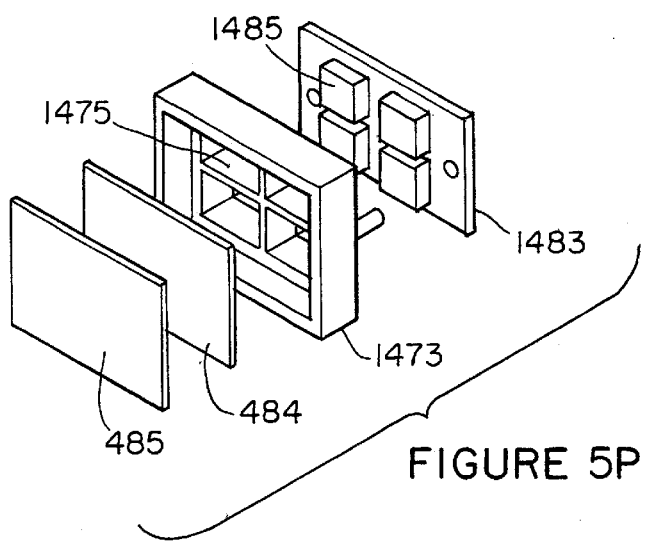

An exploded view of an alternative embodiment of the backlight is shown in FIG. 5P. A backlight housing 1473 has a plurality of compartments 1475, four being shown in the Figure by way of example. The LED backlights are mounted on a circuit board 1483 in groups 1485 which compliment the compartments 1475 of the housing 1473. Preferably, two or three LEDs are used per group to provide two or three colors, respectively. A brightness enhancement film 484, such as the "BEF" film available from 3M Corporation can optionally be used along with a diffuser 485 between the backlight housing 1473 and the display.

Lighting System for Reflective Liquid Crystal Display

Figure 6:
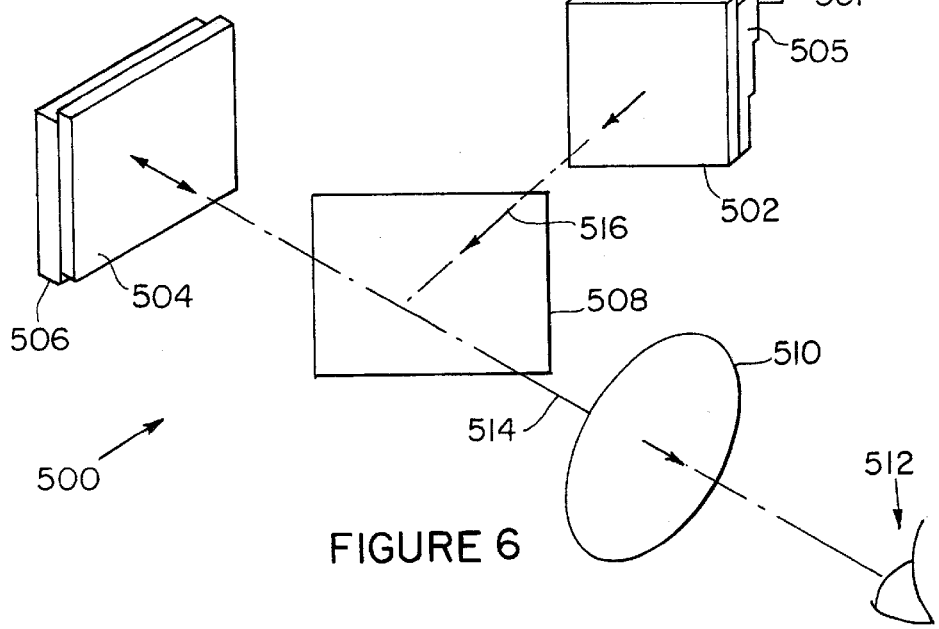
FIG. 6 is an optical diagram of a lighting system for a reflective liquid crystal display.

The details of a lighting system 102 for a reflective micro, display of the invention will now be described in connection with FIG. 6. Illumination for a reflective LCD system 500 based upon the active matrix circuit described heretofore in connection with FIG. 2 is provided by an array of Light Emitting Diodes (LED(s)) 501 disposed adjacent light-diffuser 505 which uniformly transmits the source LED light to a linear polarizer 502.

The linear polarized light 516 from polarizer 502 is passed to a polarizing beamsplitter or prism 508 which is reflected by beam beamsplitter 508 and is incident on specularly reflective LCD 506 to provide the requisite illumination. The light incident on LCD 506 is selectively reflected to generate an image that is rotated by 1/4 wave plate 504 so that it is transmitted through splitter 508 and through lens 510 to the observer 512.

Figure 7A:
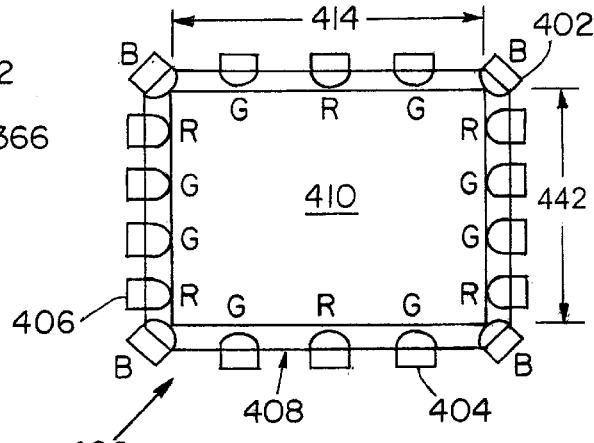
FIGS. 7A–7G illustrate preferred LED backlighting systems for a transmission type display.
Figure 7B:
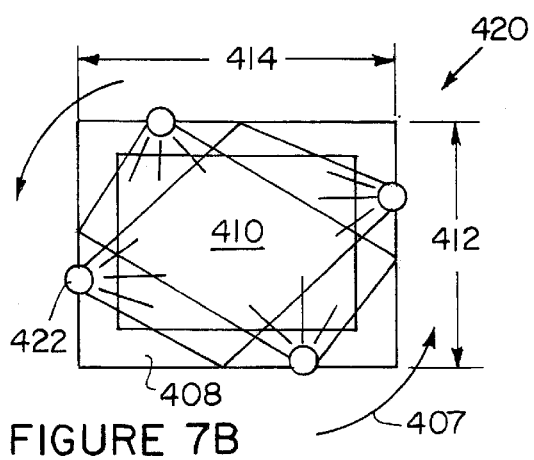
Figure 7C:
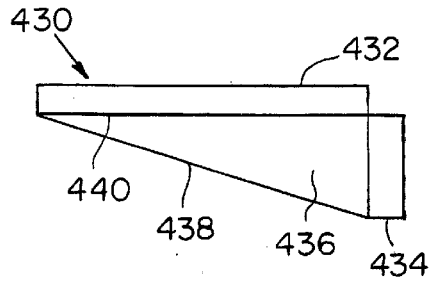

Shown in FIGS. 7A–7C are preferred embodiments of an LED backlighting system utilizing a diffuser for a transmission display in accordance with the invention. In a first embodiment of an LED illumination system 400 shown in FIG. 7A, blue (B)402, green (G)404, and red (R)406 LEDs are optically coupled to a flat diffuser element 408 around the periphery of an illumination area of 410 that is positioned adjacent the display active or viewing area. For a display having a diagonal of 6.35 mm, the side of 412 of the viewing area 410 can be about 3.81 mm in size, and the length 414 of the viewing area can be about 5.08 mm. The diffuser 408 can be a plastic material such as acrylic and the back of the diffuser can be coated with a reflective material to improve light output of the device.

In another embodiment of an LED display illumination system 420 as shown in FIG. 7B, the LED's 422 are coupled in pattern to the edge of the diffuser 408. The LEDs 422 are actuated in sequence 407 to provide color sequential operation with fewer LEDs.

In the system 430 of FIG. 7C, the display 432 is coupled to an angled diffuser 436 at interface 440. The linear array of LEDs 434 are coupled at one end of the diffuser and a reflective back surface 438 is designed to evenly distribute light as it is directed through the interface.

Figure 7D:
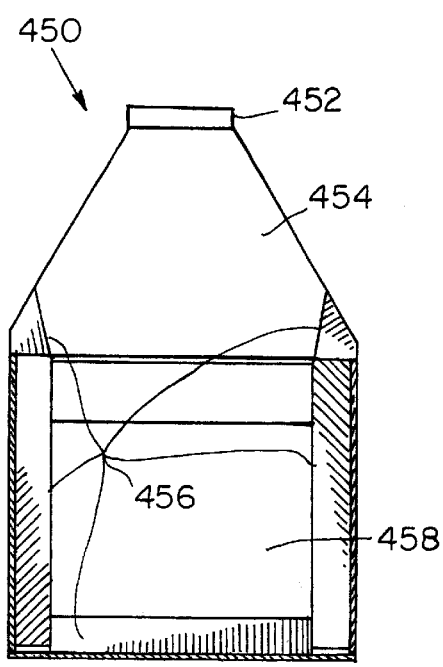
Figure 7E:
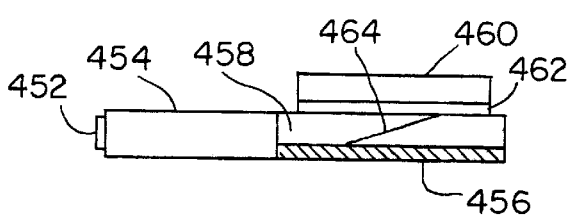

An enlarged top view of a diffuser and light pipe system 450 for back light illumination of a display is illustrated in FIG. 7D. The light source 452 such as three light emitting diodes is coupled to an expanding light pipe 454. The light pipe 454 directs the light into the side of a reflecting element or diffuser 458, as illustrated in FIG. 7E. A BEF film referenced above can be used between the light pipe 454 and element and reflective element 458. The sides and bottoms of the elements can be beveled at 456 to further reduce the volume occupied by this portion of the optical system. A reflective surface or mirror 464 serves to reflect light towards diffuser 462 and through the display 460.

Figure 7G:
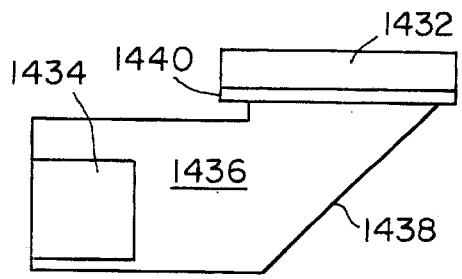
Figure 7F:
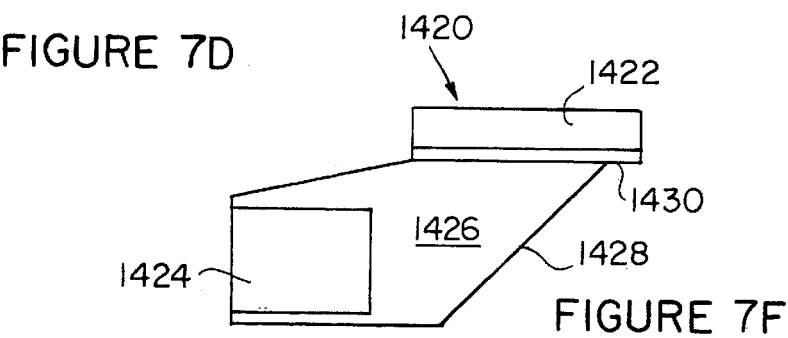

In another embodiment of an LED display illumination system 1420 as shown in FIG. 7F, the display 1422 is coupled to an angled diffuser 1426 at interface 1430. The linear array of LEDs are inserted into slot 1424 to couple light into one end of the diffuser and a reflective back surface 1428 is designed to evenly distribute light as it is directed through the interface. The increase thickness and shortness of the body of the angled diffuser 1426 increases the coupling efficiency of the element 1426 to display and thus increases the foot-lamberts (fL) of light produced per amount of power.

In another embodiment of an LED display illumination system as shown in FIG. 7G, the display 1432 is coupled to an angled diffuser 1436 at interface 1440. The linear array of LEDs are inserted at slot 1434 at one end of the diffuser and a reflective back surface 1438 is designed to evenly distribute light as it is directed through the interface. Similarly to the previous embodiment, the increased thickness and shortness of the body of the angled diffuser 1436 increases the coupling efficiency of the backlight system.

Figure 8A:
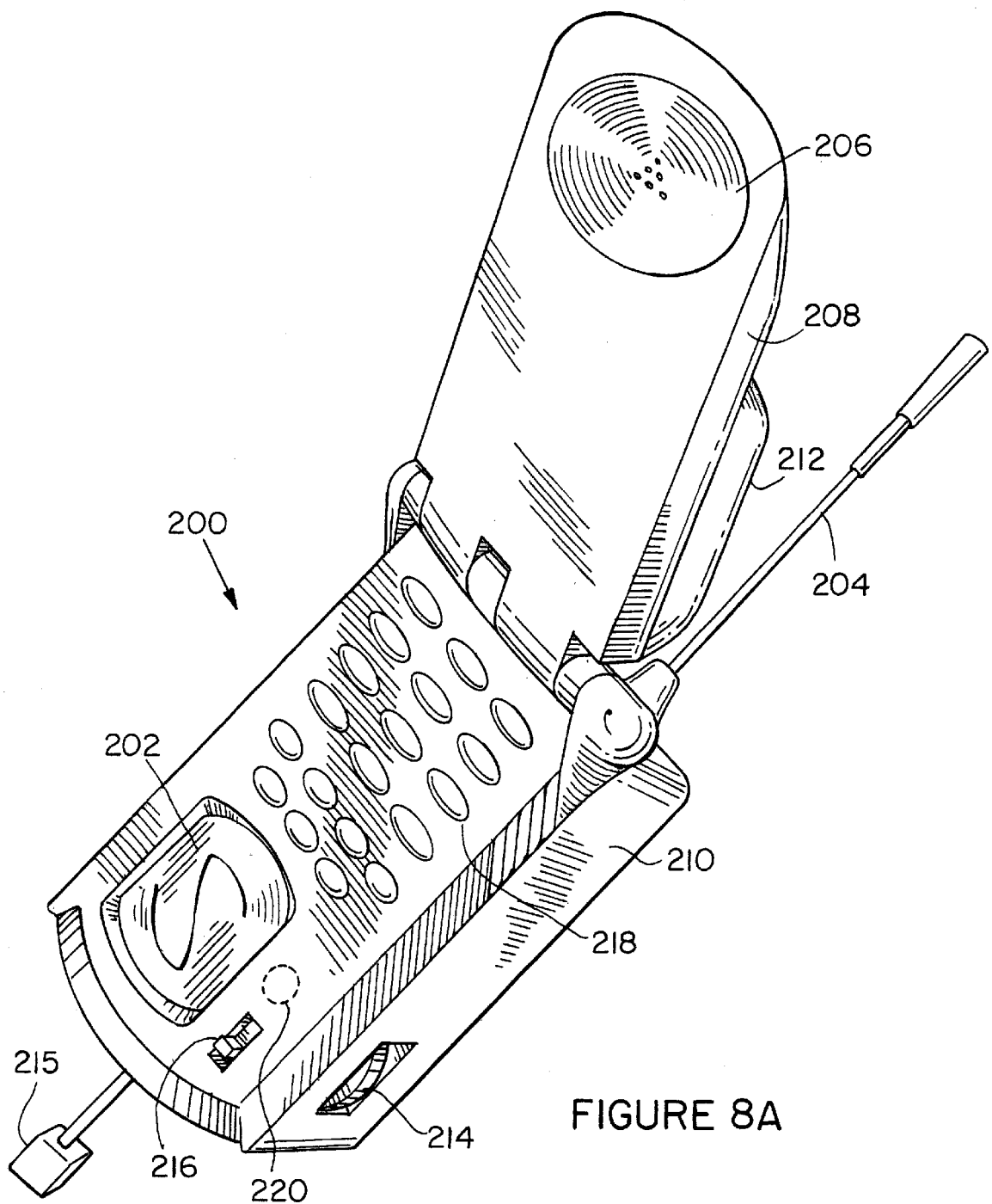
FIG. 8A is a perspective view of a preferred embodiment mobile telephone having a display device in accordance with the invention.

Illustrated in connection with FIG. 8A is a cellular telephone 200 having a magnified microdisplay in accordance with the invention. The display can be included in a base portion 210 of a "flip-phone" along with keypad 218 and microphone 220. The speaker 206, or the display or a second display as well as additional circuitry can be included in second portion 208 that rotates relative to the base 210. An antenna 204 can telescope out of the base for improved wireless reception. A battery is housed at 212. A lens 202 can be viewed by the user while holding the speaker to his or her ear thus enabling both viewing and voice transmission at the same time. The display can be turned on or off at switch 216 to save battery life when the display is not in use. The magnification can be adjusted at knob 214.

Additionally, a small camera 215 such as a charge coupled device (CCD), CMOS imaging sensor or other solid state imaging sensor can be mounted on a telescoping element to provide an imaging or video-conferencing capability. The camera can be pivoted so that the user can point and hold the camera in any selected direction. The image generated can be seen on the display and/or transmitted to a remote location, selected buttons or touch pad keys 218 can be used as a mouse control for the display.

Figure 8C:
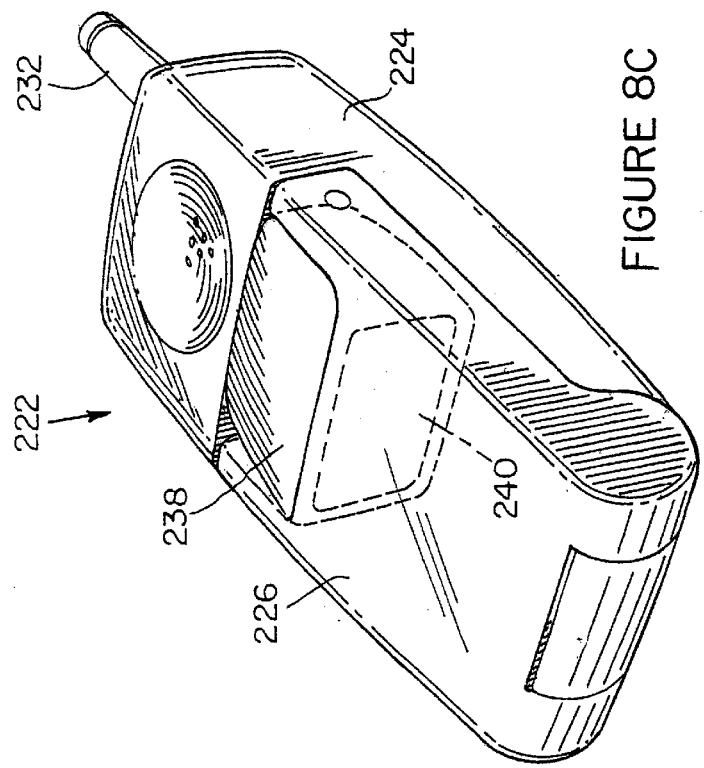
FIGS. 8B–8C illustrate an alternative embodiment of a mobile telephone having a display device in accordance with the invention.
Figure 8B:
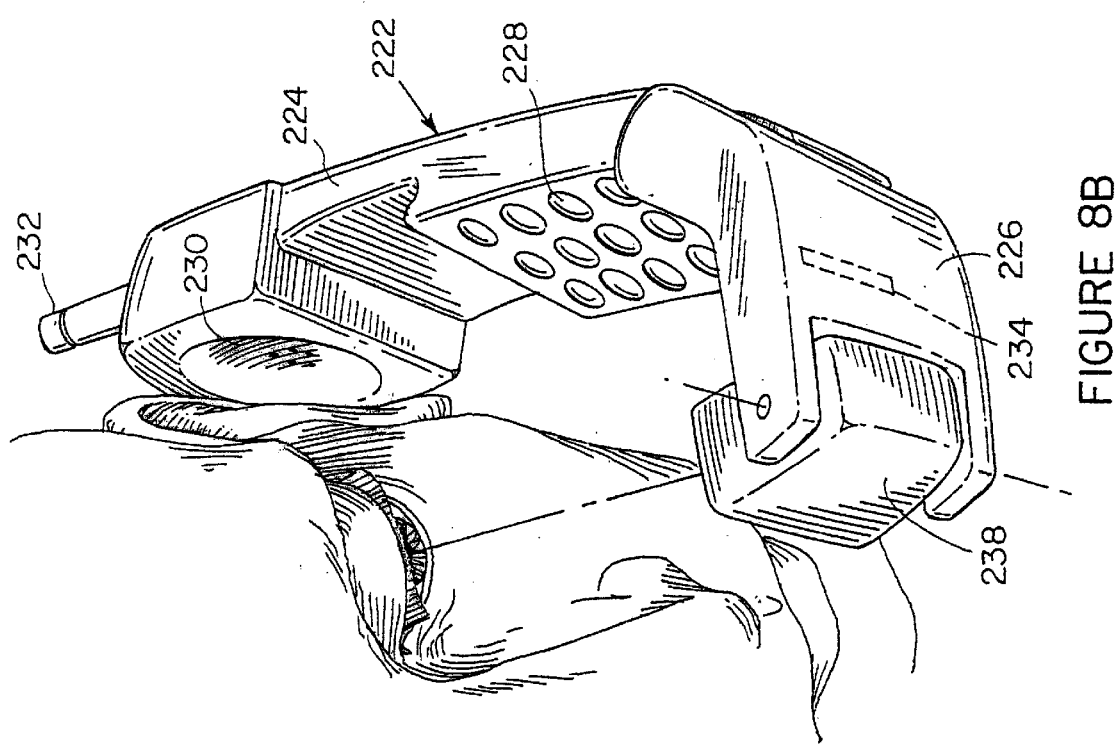

Referring to FIGS. 8B and 8C, an alternative embodiment of a cellular telephone 222 having a magnified microdisplay in accordance with the invention is shown in open and closed perspective views respectively. The cellular "flip-phone" 222 has a base portion 224 and a flip portion 226. The base portion 224 has a keypad 228 a speaker 230, and an antenna 232. The base portion 224 may include an alphanumeric display for seeing the telephone number as it is being entered. The flip portion 226 pivots from the base portion 224 and includes a microphone 234, shown in hidden line in FIG. 8B. The microdisplay is located in a module 238 which rotates relative to the flip portion 226. The module or pod 238 is flush with the flip portion 226 when in a stored position, such that the viewing port 240 is protected by the flip portion 226, as seen in FIG. 8C. When the "flip-phone" 222 is in use, the pod 238 is rotated generally 90 degrees from the stored closed position, such that a viewing port 240 is exposed and in the user's line of sight. The flip portion 226 spaces the microdisplay the proper distance from the base portion 224 to facility viewing.

Alternatively to the base portion 224 having an alphanumeric display, the telephone 222 can have software which can vary the image size on the microdisplay. The software can create low resolution image with large characters, such as illustrated in FIG. 8D. This resolution is primarily used when the microdisplay is viewed from 6 to 18 inches. When the user is inputting the telephone number on the keypad 228, the user's eye is typically that distance from the microdisplay as represented in FIG. 8E. The software can create high resolution small characters, and typically does, such as represented in FIG. 8F. This resolution is primarily implemented when the user's eye is 1 to 6 inches from the microdisplay, as represented in FIG. 8G, such as when the user is speaking on the phone. The software can automatically switch after the telephone number is dialed or a button can be pushed.

Figures 8H, 8I:
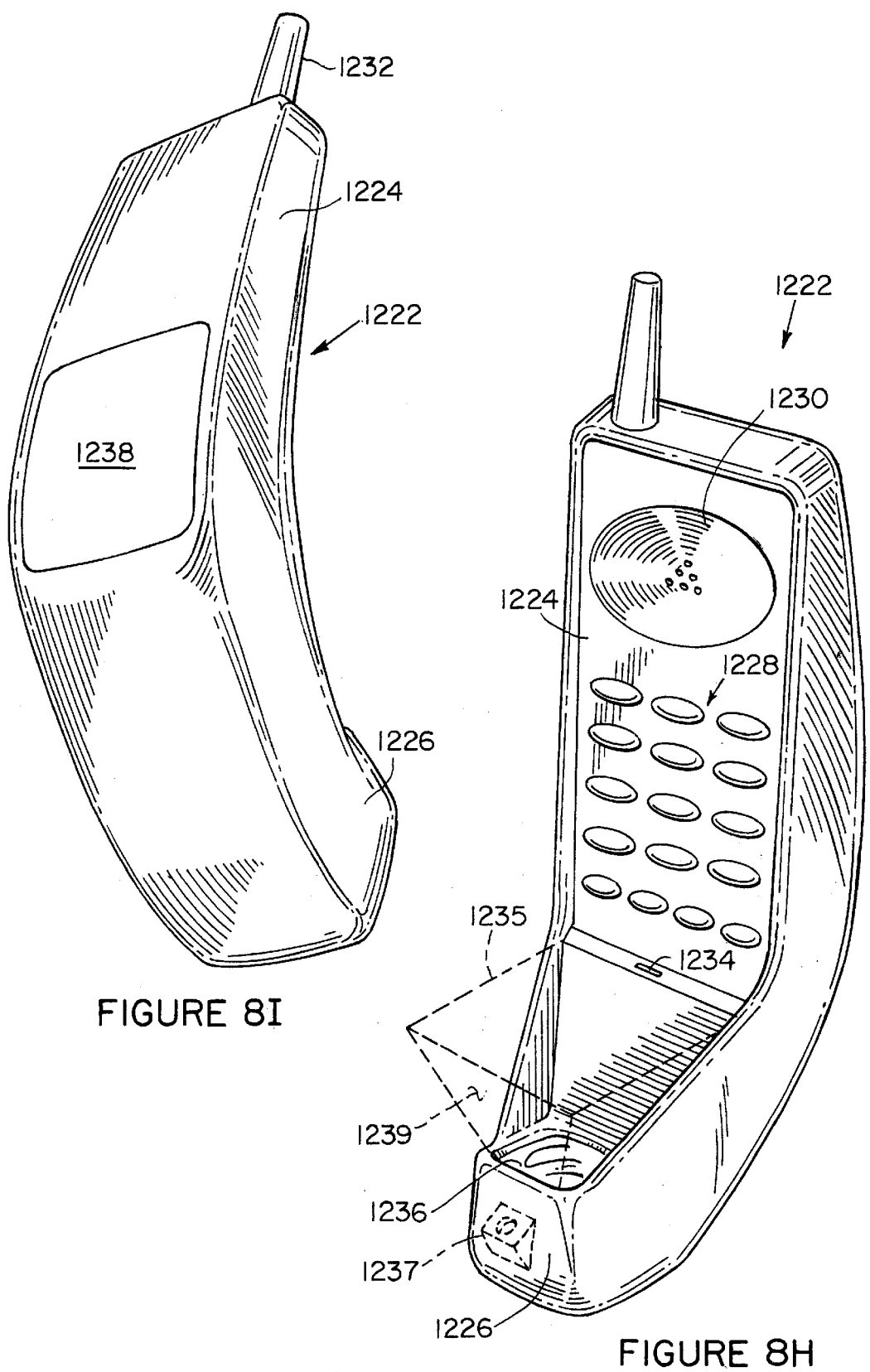
FIGS. 8H–8I illustrate an alternative embodiment of a mobile telephone having a display device in accordance with the invention.

Referring to FIGS. 8H and 8I, an alternative embodiment of a cellular, cordless or standard telephone handset 1222 having a magnified microdisplay in accordance with the invention is shown. The telephone 1222 has a base portion 1224 and a display portion 1226 formed as an integral piece. The base portion 1224 can include a keypad 1228 or virtual keypad, a speaker 1230, and can include an antenna 1232. The base portion 1224 can include an alphanumeric display for seeing the telephone number as it is being entered. An alternative to the alphanumeric display is for the microdisplay to change resolution as described above or overlay enlarged numerical information on images being displayed.

The display portion 1226 of the telephone 1222 projects from the base portion 1224. The display portion 1226 includes the microdisplay with a lens 1236 that can extend substantially orthogonal to the plane of the base portion 1224. A microphone, located behind an opening 1234, can be generally located where the display portion 1226 and the base portion 1224 merge. The telephone 1222 can have a battery 1238 which is accessible from a palm receiving portion of the base 1224, as seen in FIG. 8I.

This embodiment and other personal communication devices described in connection with other embodiments can utilize a high gain rear projection screen 1235 that can be positioned relative to the lens 1236 such that several people can observe the displayed image at one time. This option can include a high brightness switch for the backlight which can be manually actuated to draw more power to improve clarity of the image. The screen 1235 can be 1 and 4 inches in diameter depending upon the application and the brightness level generated by the backlight. The screen 1235 can be folded out from the telephone housing, or can be a detachable accessory including sidewalls 1239.

A camera 1237 can be incorporated adjacent the display section 1226 to provide an image of the user or some other object of interest for transmission.

Alternatively, the display can be formed in a modular component that snaps onto the base portion of a standard telephone and couples to a display circuit port in the base section of the telephone. This is illustrated in the preferred embodiments of FIGS. 9A–9J.

Figures 9C, 9D:
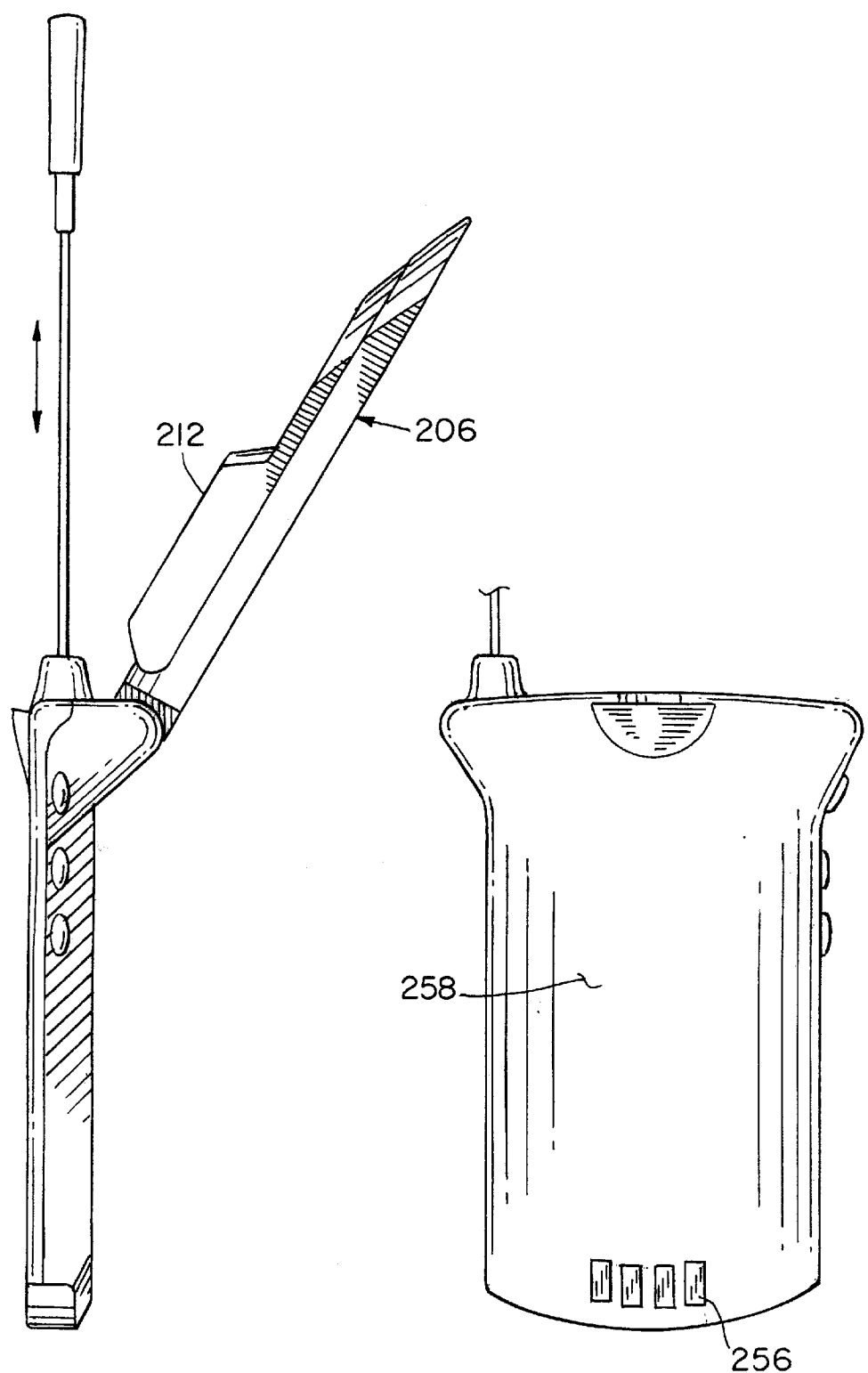

FIG. 9A shows a telephone 250 having standard features such as a display 252 and a port 254 for external communications. The modular display unit 260 shown in FIG. 9B is configured to dock with the telephone 250 wherein the connector 268 is inserted into port 254 and latch 264 connects to the top of the base section of telephone 250 thereby connecting the microdisplay within display subhousing 262 to the receiver within the telephone 250. The subhousing 262 pivots relative to main housing 270 to allow viewing of the display through lens 267 during use of the telephone 250. In this embodiment, telescoping camera 215 can extend from subhousing 262. Base 270 includes a second battery, drive electronics for the LED backlight LCD display on activation switch 266. FIG. 9C is a sideview of telephone 250 showing the battery housing 250 on the opposite side from the speaker 206. Back panel 258 is shown in the rear view of FIG. 9D along with second battery contacts 256 exposed thereon. When the telephone 250 is docked in unit 260, the surface 258 abuts surface 265 and connectors 264 are positioned against contacts 256 such that the telephone can be powered by the second battery in housing 270.

Figure 9H:
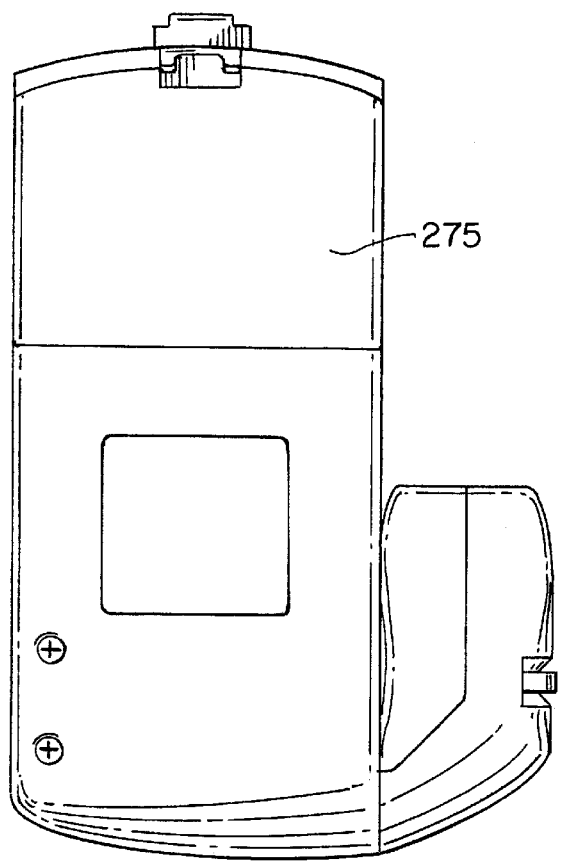
Figure 9I:
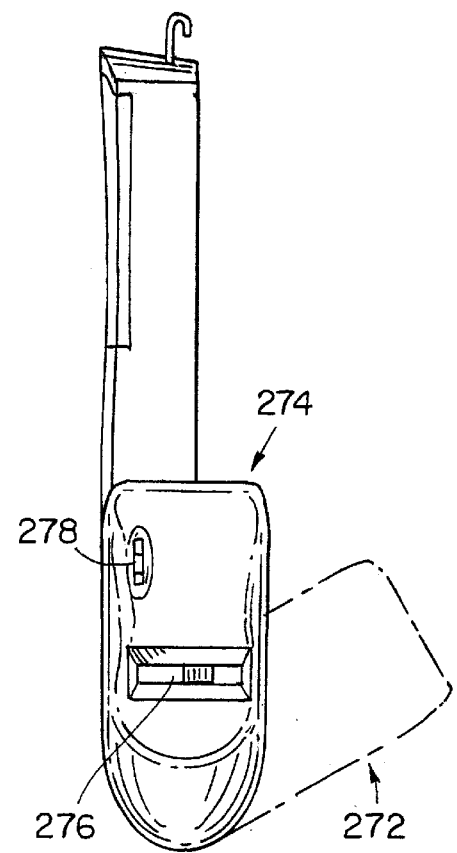

FIGS. 9E, 9F and 9G illustrate top front and side views of unit 260 where the subhousing is shown in both its storage position 274 and its viewing position 272. FIGS. 9H and 9I show back and second side views of unit 260 and illustrate battery access panel 275, focus know 276 and control buttons 278 that are exposed on the side of housing 270 when the sub-housing 262 is rotated to the viewing position 272.

Figure 9J:
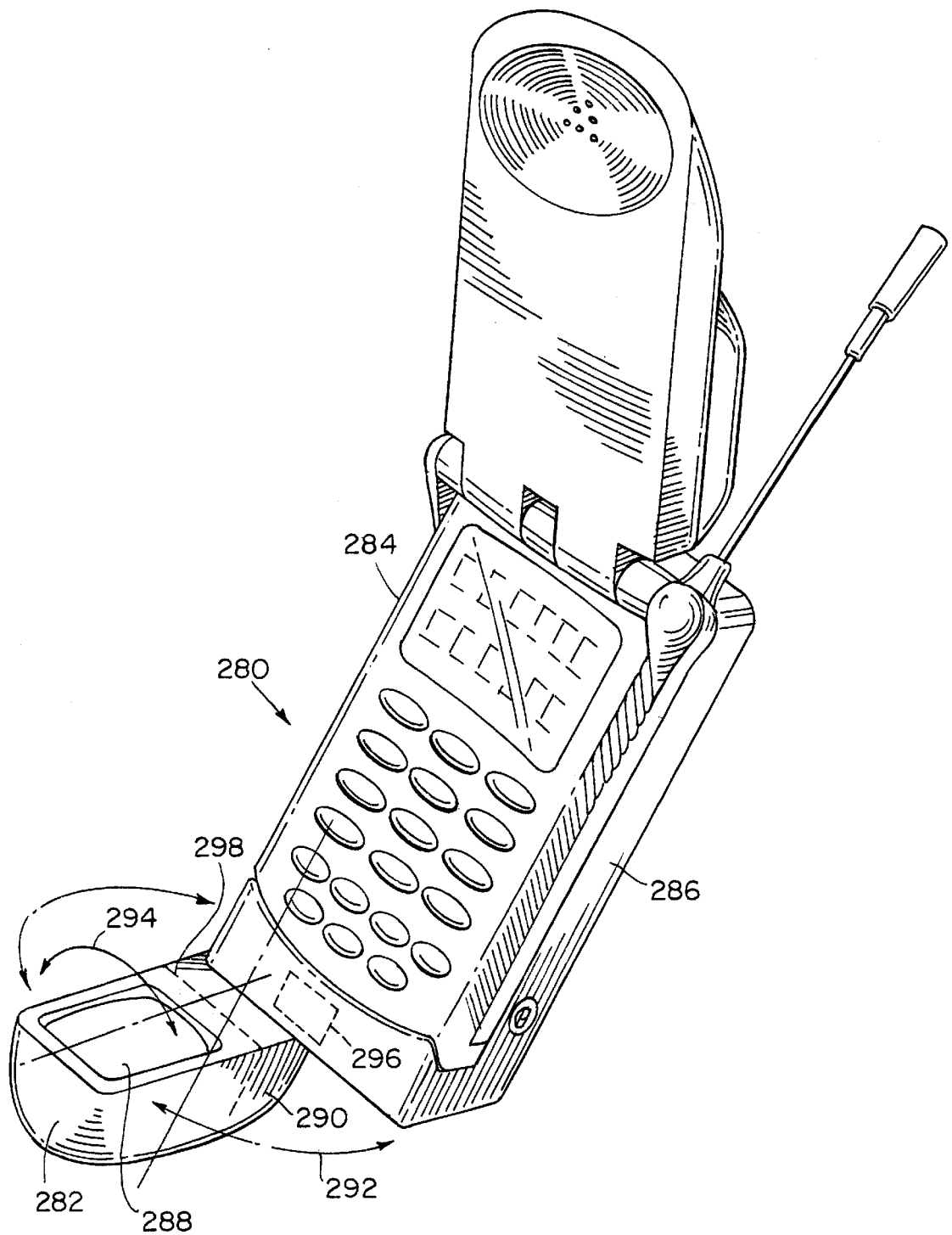

In the embodiment 280 shown in FIG. 9J the telephone 284 is shown docked with housing 286. However in this embodiment, the display is mounted within a pivoting unit 282. The user can swing unit 282 along arc 292 to expose viewing lens 288. The user can also swing the display around a second orthogonal axis 294 at joint 298 so that the display rotates into a variety of viewing positions relative to hinge section 290.

FIGS. 10A and 10B illustrate another docking system for a portable telephone. The element 286 of system 300 includes mouse controls 303 that can be positioned on the front or rear of the element. The telephone, which can incorporate a touchpad 301, nests within the docking element 286 and is electrically connected to the element through a connecting port as described previously. Part of the base section houses a display module 306 having a display window 309 and can optionally also include a CCD or CMOS camera 310 in module 305. The modules 305, 306 can be manually or electrically actuated to move between a cavity within the base element and an operating position outside of the base section. Each module 305, 306 can rotate around axis 308 when in the operating position for easy repositioning by the use. The display can be used as a view finder for the camera. The base section can optionally rotate around the longitudinal axis of the base section for left or right handed use.

The docking element 286 can also include a PCMCIA card slot 302 and a touchpad on the rear panel adjacent the docking element battery. Slot can receive an image data card on which data can be stored or retrieved. The slot and associated circuitry can thus receive a smart card that can be used to charge or pay for phone calls or information on the card can be shown on the display or transmitted. Slot 302 as described herein can also be included in a wireless telephone with an integrated display as shown in FIG. 8.

Figure 11:
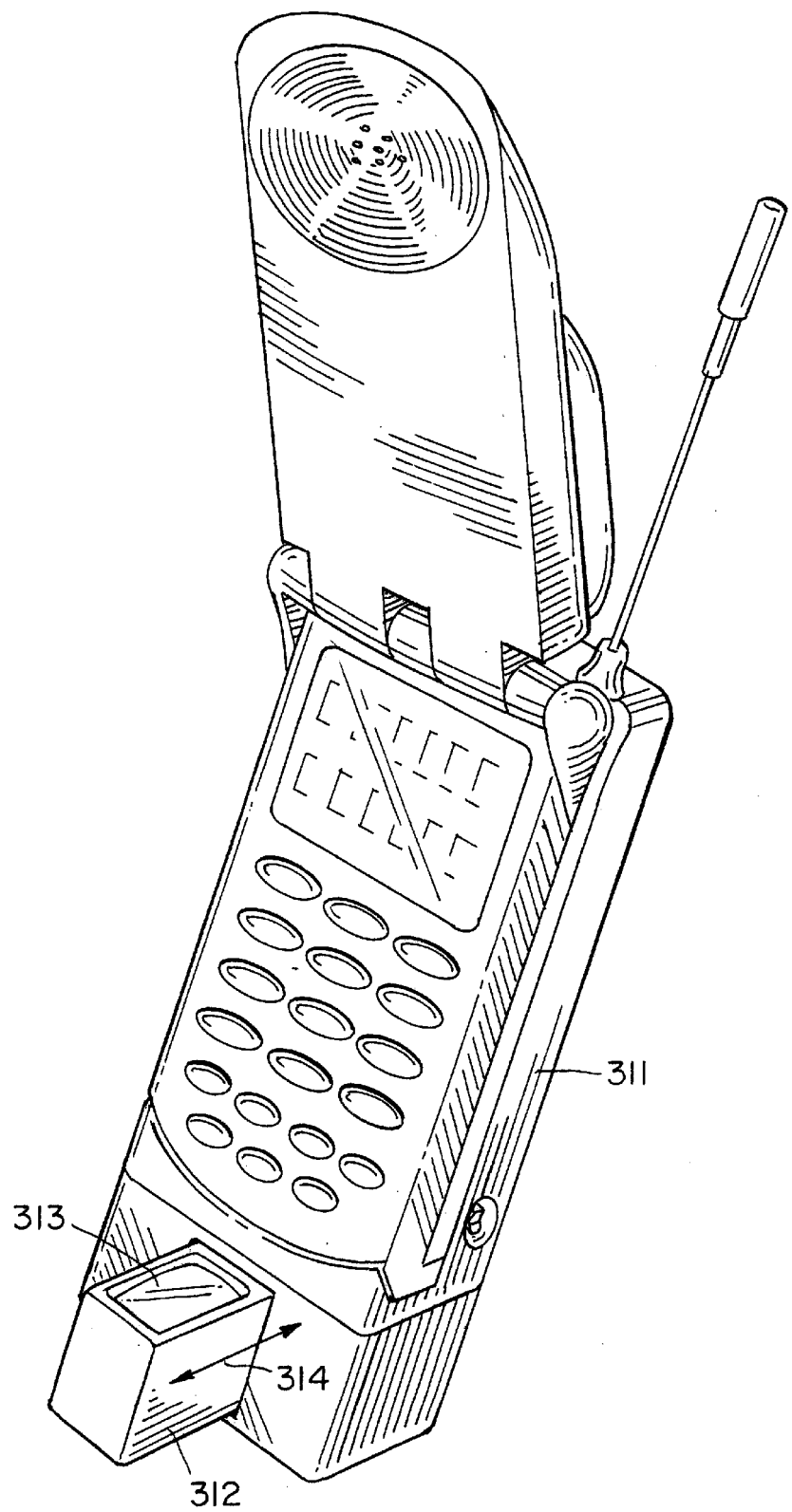
FIG. 11 illustrates another preferred embodiment of a telephone microdisplay system in accordance with the invention.

FIG. 11 illustrates another preferred embodiment of a docking element 311 in which the display module 312 can be moved along axis 314 between a position within the base section to an operating position outside the docking element housing. The image viewed through lens 313 can be inverted for left or right handed use.

Figure 12B:
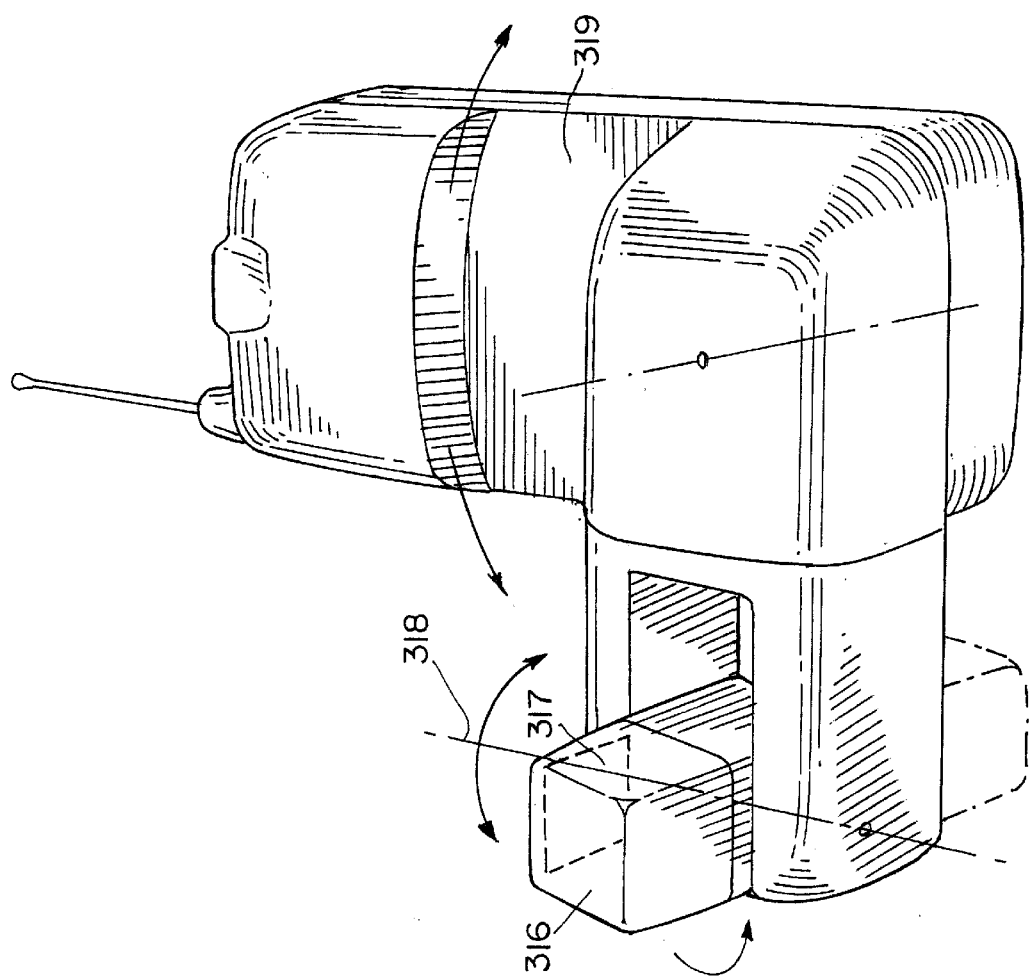
FIGS. 12A and 12B illustrate rear views of another preferred embodiment of a telephone microdisplay.
Figure 12A:
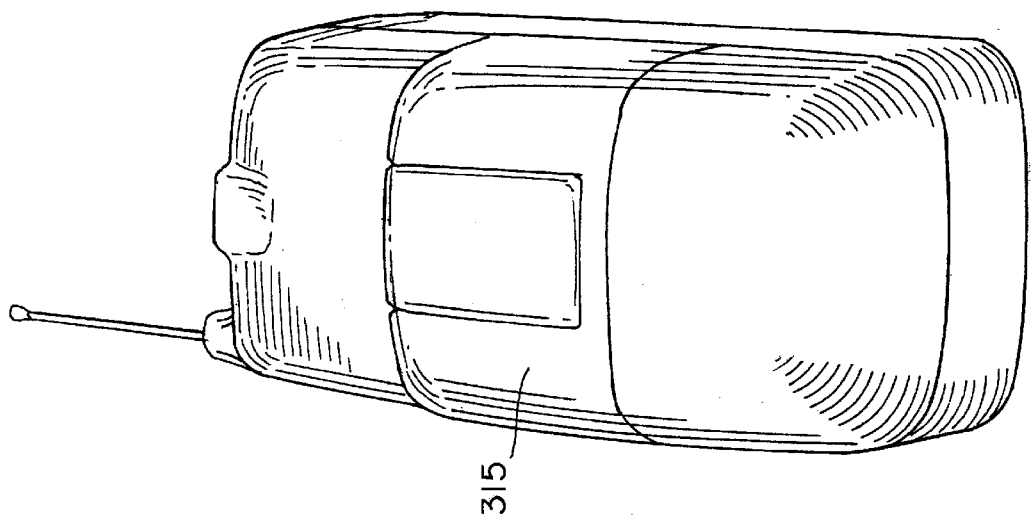

Another preferred embodiment of the docking element is illustrated in FIGS. 12A and 12B. The element 315 has a rotating portion on the back of the telephone and includes a display module 316 which rotates around a second axis 318 to expose the viewing port 317. The module 316 can rotate around a third axis for positioning by the user.

Another preferred embodiment of the docking element is illustrated in connection with FIGS. 13A–13F. In this embodiment a cellular phone 552 docks with a docking element 550. Docking system 550 has a two display module ports 554 and 556. Either port 554 or 556 can receive the display module 580 that is illustrated in FIG. 13F. FIG. 13A illustrates port 554 on a first side of system 550 and docking port connector access 571. FIG. 13B shows a second port 556 on a second side of the docking system as well as a joystick element 560, a mouse button 558 and an external mouse port 562.

FIGS. 13C and 13D show the docking element 550 without the phone 552. These illustrate the phone docking connector 566 and the phone retention clip slot 564.

FIG. 13E shows an exploded view with the housing 550 having top 551 and bottom 553. The housing contains the joystick 561, the phone port connector 565, circuit board 570, docking port connector 572 clip 563.

The display module housing 580 has a connector 586 that electrically connects the display circuit to the circuit board 570. A circular element 584 connects to each port 554, 556 and permits the housing 580 to rotate relative to system 550 so that the viewing window 582 can be positioned by the user.

Figure 13G:
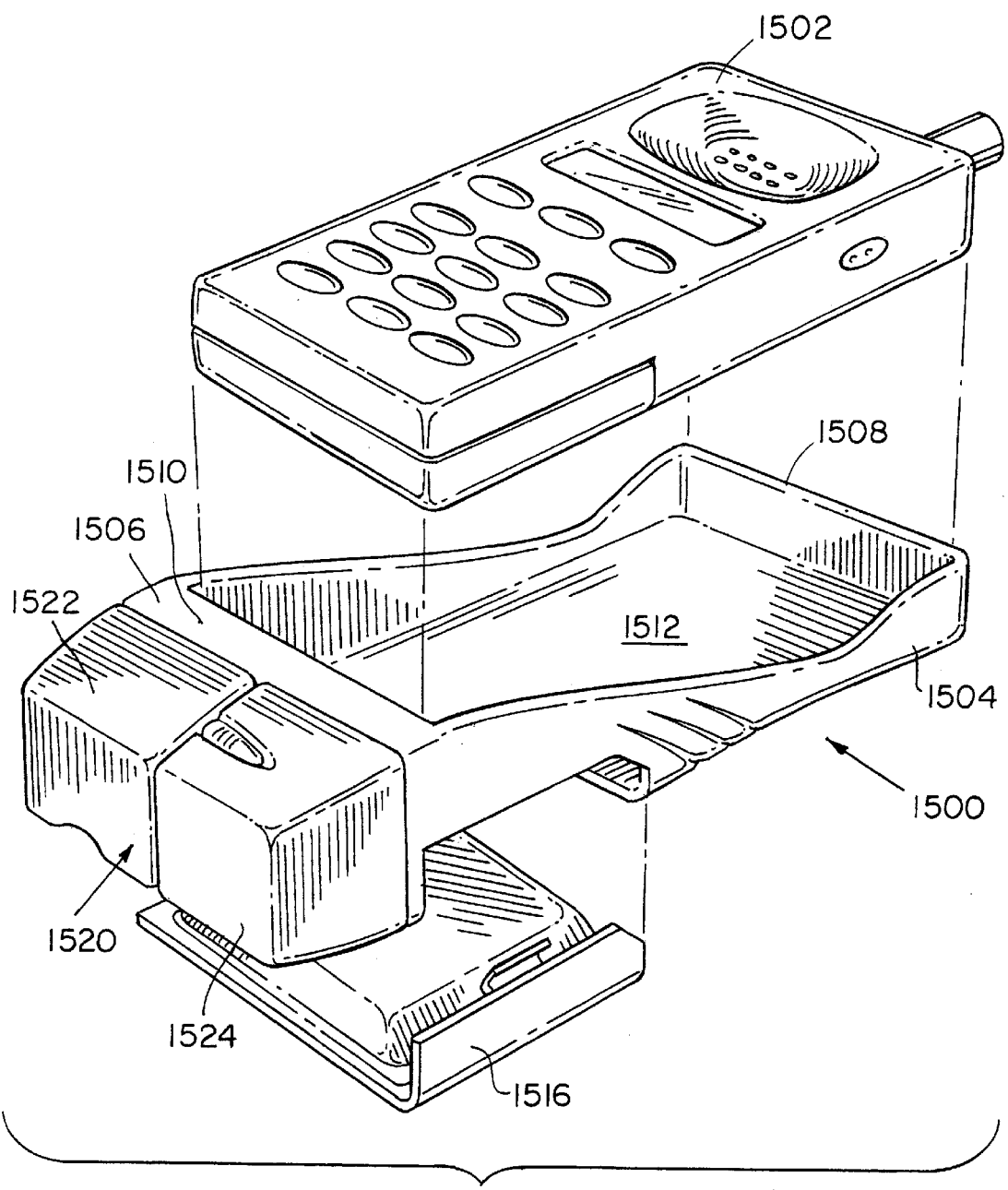
Figure 13H:
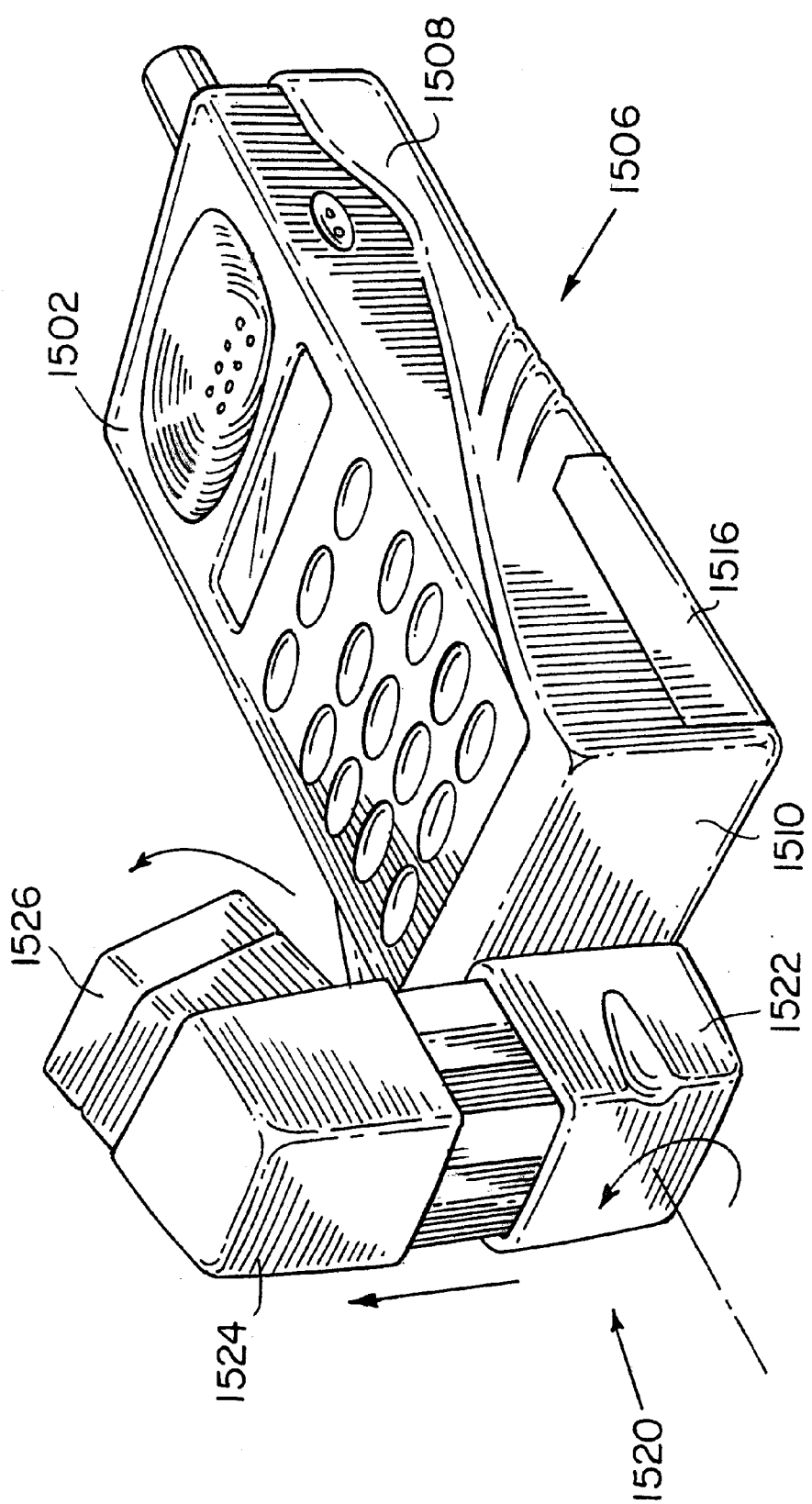
Figure 13I:
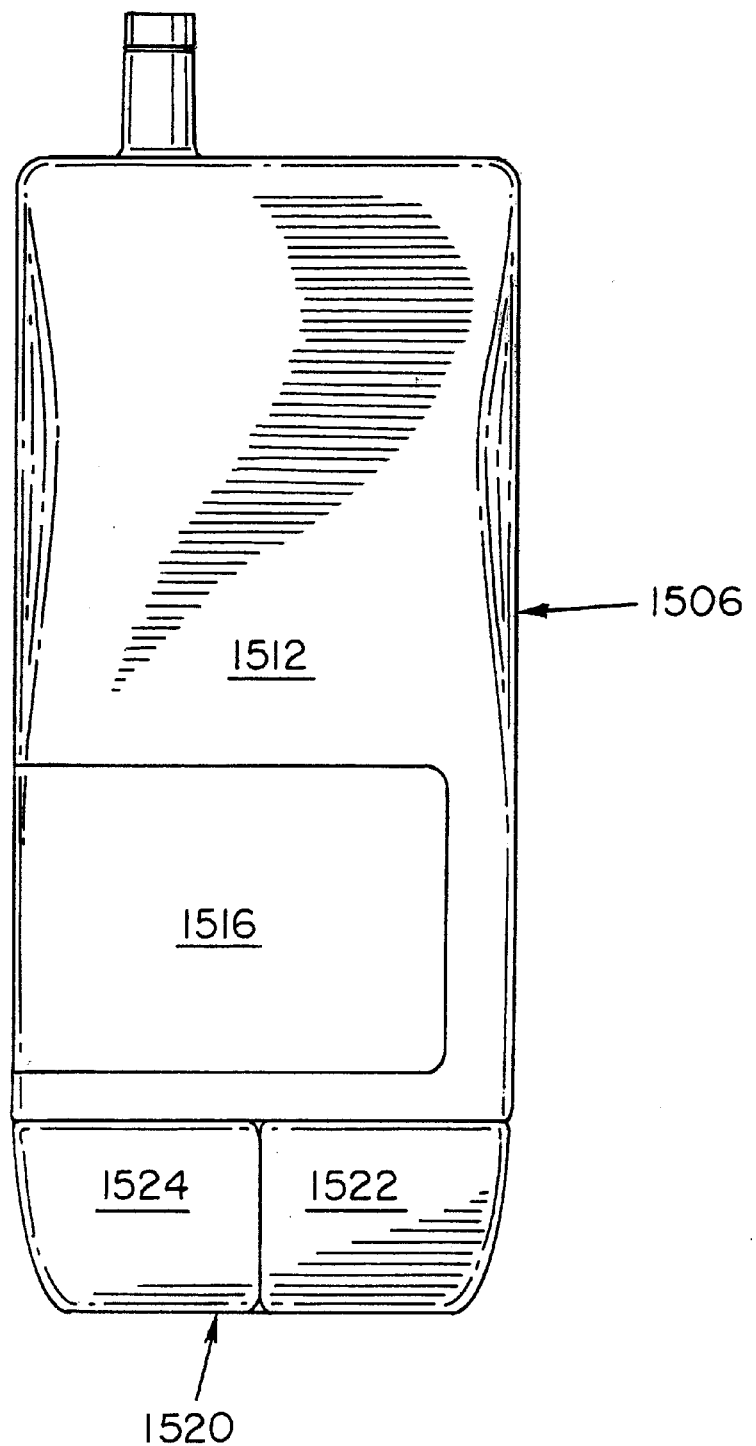

An alternative display docking system 1500 is shown if FIGS. 13G–13I. A cradle 1504 in a docking element or station 1506 receives the cellular phone 1502. The cradle 1504 is formed by a pair of side rails and a top rail 1504, in addition to the base 1510 and the bottom 1512. The docking station 1506 is adapted to receive a battery 1516 as best seen in FIGS. 13G and 13I. The battery 1516, which is received on the bottom of the docking station 1506 1552, is capable of powering both the docking station 1506 and the cellular phone 1502.

Still referring to FIGS. 13G–13I, the docking system 1500 has a display subhousing 1520 which pivots relative to the base 1510 of the docking station 1506. The display subhousing 1520 has a foot pivot portion 1522 that rotates relative to the base 1510 of the docking station 1506 and an arm 1524. The arm 1524 extends laterally from the foot pivot portion 1522 in the operating position, as seen in FIG. 13H. The arm 1524 has a viewing housing 1526 with a lens, which moves outward, therein spacing the lens from the microdisplay located in the arm 1524.

Figure 13J:
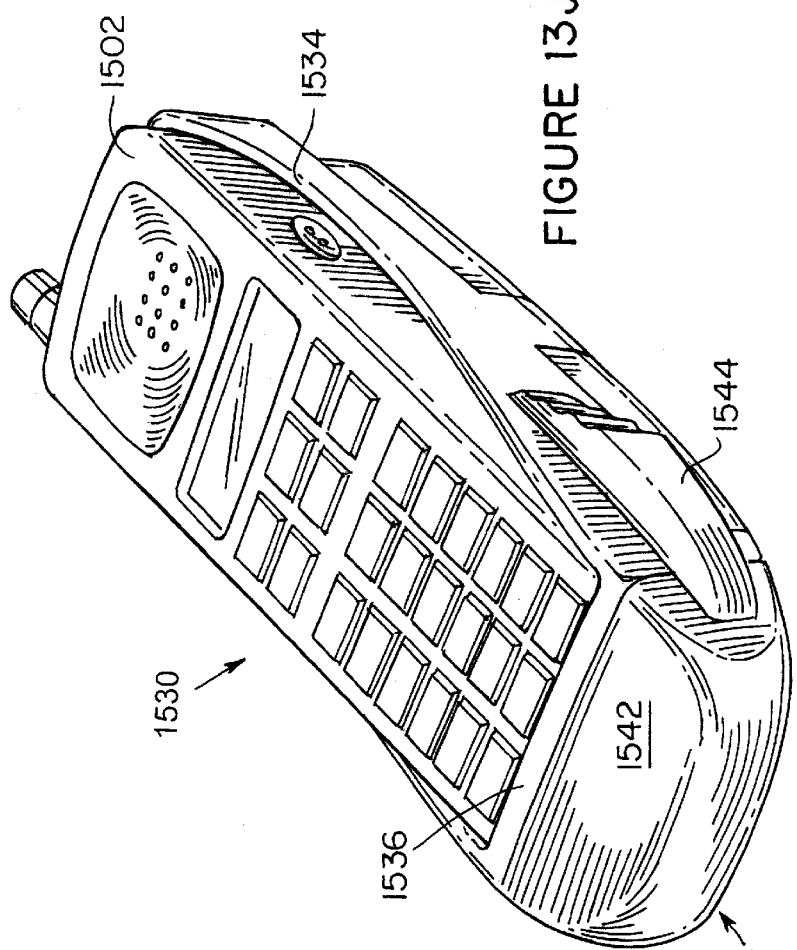
Figure 13K:
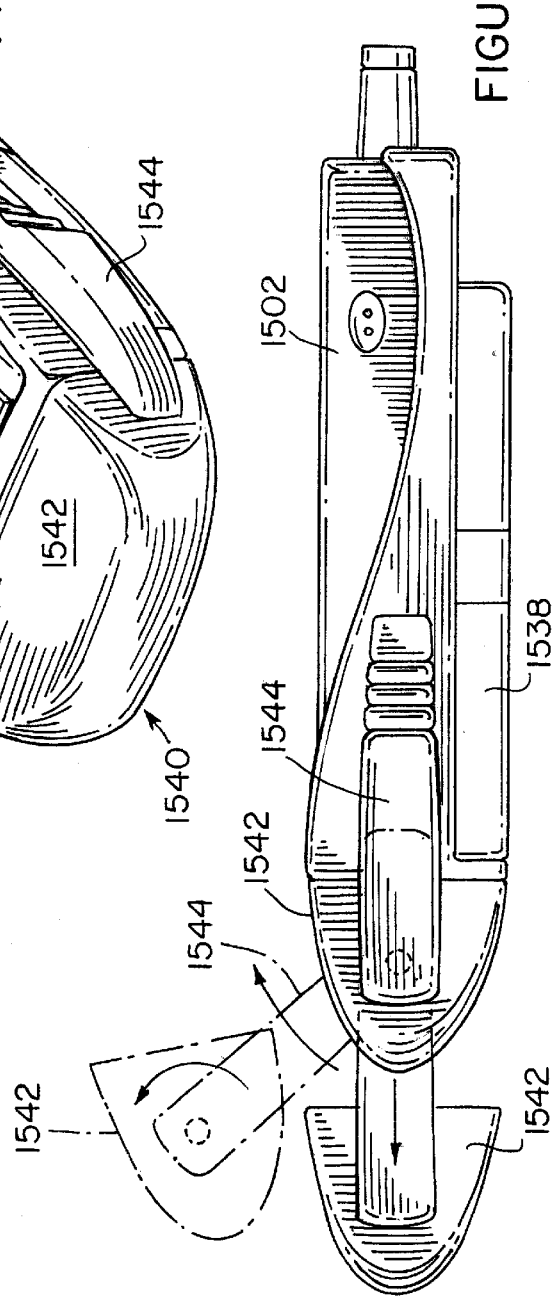

FIGS. 13J and 13K show another alternative display docking system 1530. The display docking system 1530 has a cradle 1534 on the docking station 1536 similar to the embodiment shown in FIGS. 13G–13I. The docking station 1536 likewise is adapted to receive a battery 1538 capable of powering both the docking station 1536 and the cellular phone 1502.

Still referring to FIGS. 13J and 13K, the docking system 1530 forms a handset and has a display subhousing 1540 which has a display pod 1542 and a pair of sliding arms 1544. The display subhousing 1540 moves relative to the docking station 1536 by the arms 1544 moving translation relative to the side rails of the station 1536 as represented in FIG. 13K. The arms 1544 then are capable of rotating relative to the docking station 1536 as illustrated in phantom in FIG. 13K. The display pod 1542, which houses the microdisplay and a lens, can rotate relative to the arms 1544 to position the microdisplay for viewing.

Figure 13L:
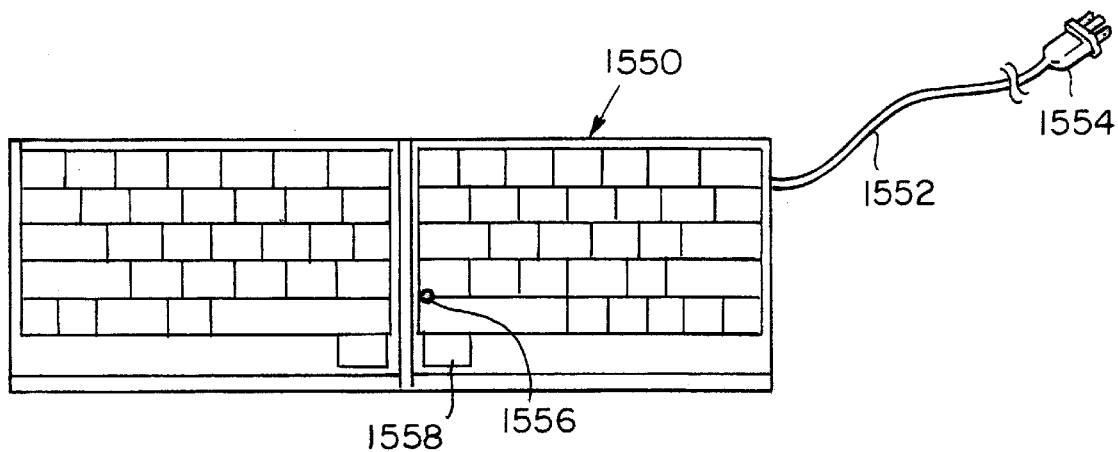
FIGS. 13L–13N illustrate a folding keyboard with a touchpad for uses with phone, display docking system, or pager.
Figure 13M:
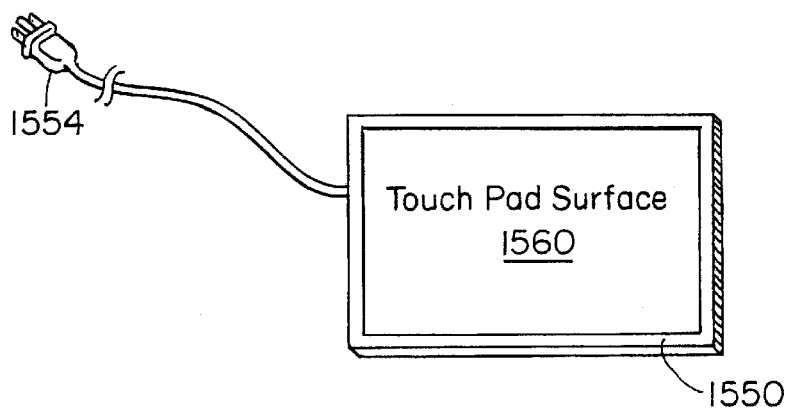
Figure 13N:
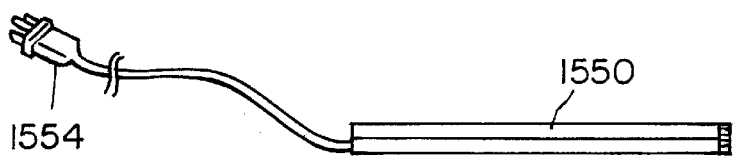

FIG. 13L illustrates a keyboard 1550 having a conventional key layout. The keyboard has a cord 1552 with a plug 1554 adapted to be received by a data transmission system, such as a docking station, a cellular telephone or a pager. The keyboard 1550 has a mouse track point joy stick 1556 and a pair of mouse buttons 1558. The keyboard 1550 is capable of folding such that its thickness is less than 15 millimeters as illustrated in FIG. 13N. The keyboard 1500 can have a touch pad 1560 on one side, such as shown in FIG. 13M, for taking notes or drawing inputs.

Figures 13O, 13P:
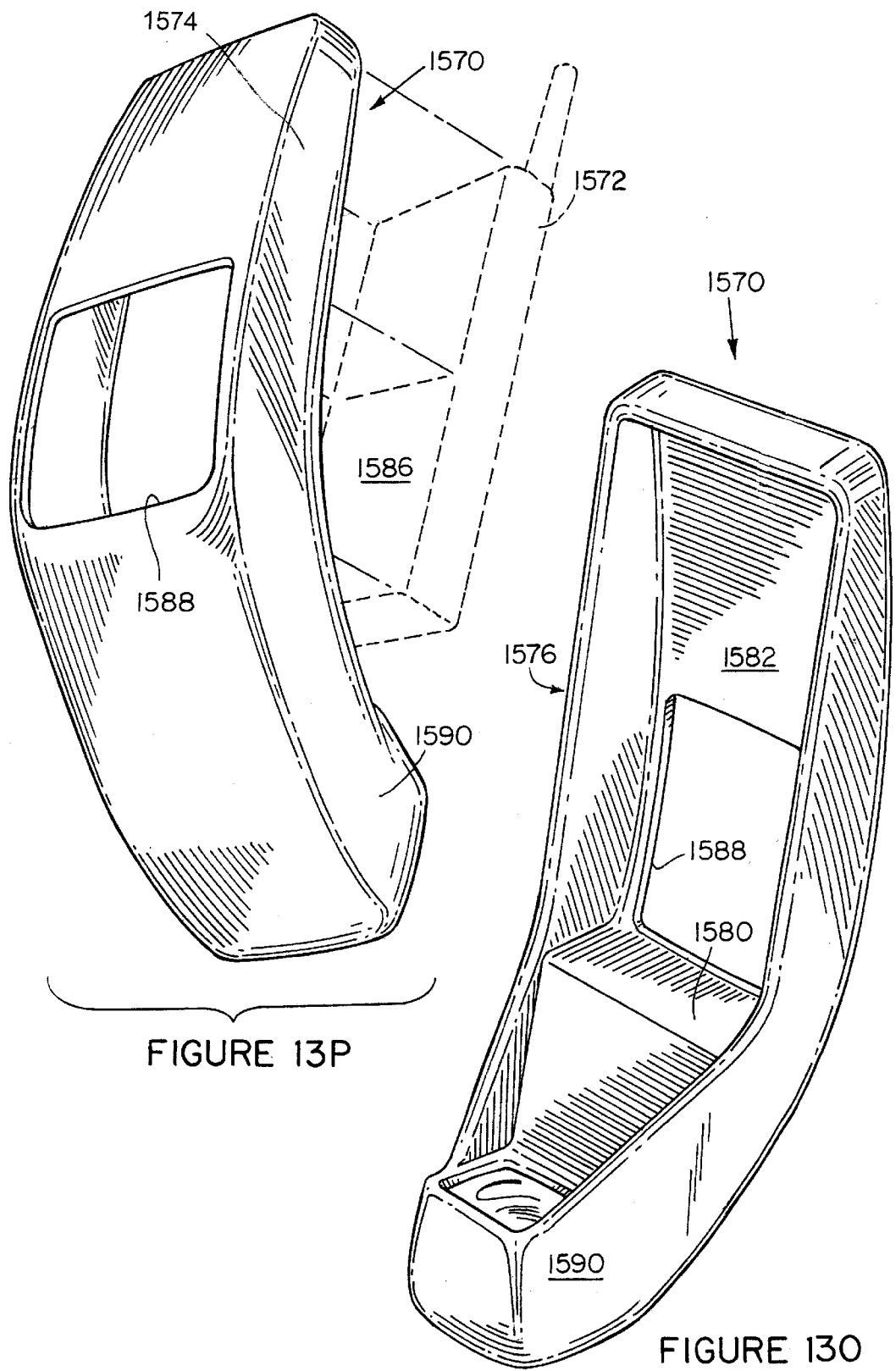
FIGS. 13O–13P illustrate other preferred embodiments of the invention including a display docking system for a cellular telephone.

An alternative display docking system 1570 is shown in FIGS. 13O–13P. A cradle 1574 in a cradle portion 1578 of a docking element or station 1576 receives a cellular phone 1572, shown in phantom in FIG. 13P, of the display docking system 1570. The cradle 1574 is formed by a pair of side rails and a top rail 1574, in addition to a base 1580 and a back 1582. The back 1582 of the cradle portion 1578 has a hole 1588 such that the a battery 1586, as shown in phantom in FIG. 13P, of the cellular phone 1592 can be accessed when the phone 1592 is in the cradle 1584.

Still referring to FIGS. 13O–13P, the docking system 1570 has a display subhousing or portion 1590 which projects downward and outward away from the base 1580 of the cradle 1574. The display portion 1590 includes the microdisplay with a lens 1594.

Illustrated in FIGS. 14A–14C is another preferred embodiment of a telephone system 600 incorporating the microdisplay of the present invention. In this desktop system a handset 602 is connected by cable or wireless connection to a base containing by cable or wireless connection to a base containing a standard telephone keypad 604. The display operates in a rear projection configuration within housing 610. The housing can pivot 620 or swivel 612 and includes a camera 608 so that a user viewing screen 606 can be seen by a person with a similar system. Further details regarding rear projection systems are described in U.S. Pat. No. 5,467,154, the contents of which is incorporated herein by reference.

Figure 15C:
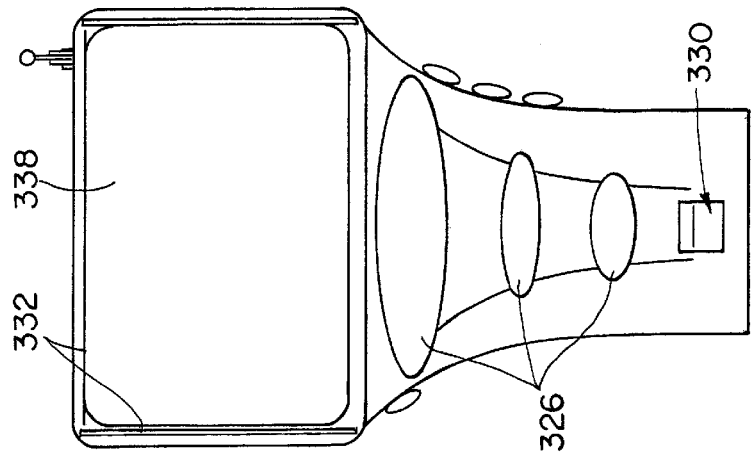
FIGS. 15A–C are side cross-sectional, front, and front cross-sectional views of a hand held rear projection display system in accordance with the invention.
Figure 15B:
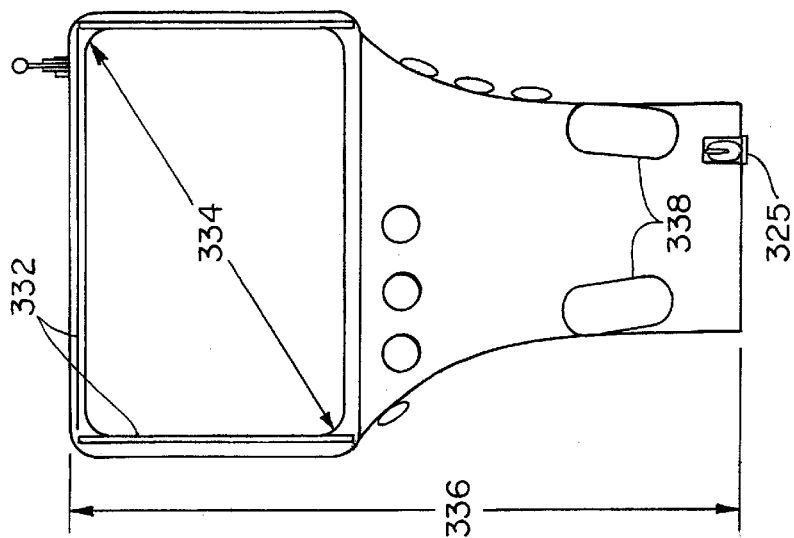
Figure 15A:
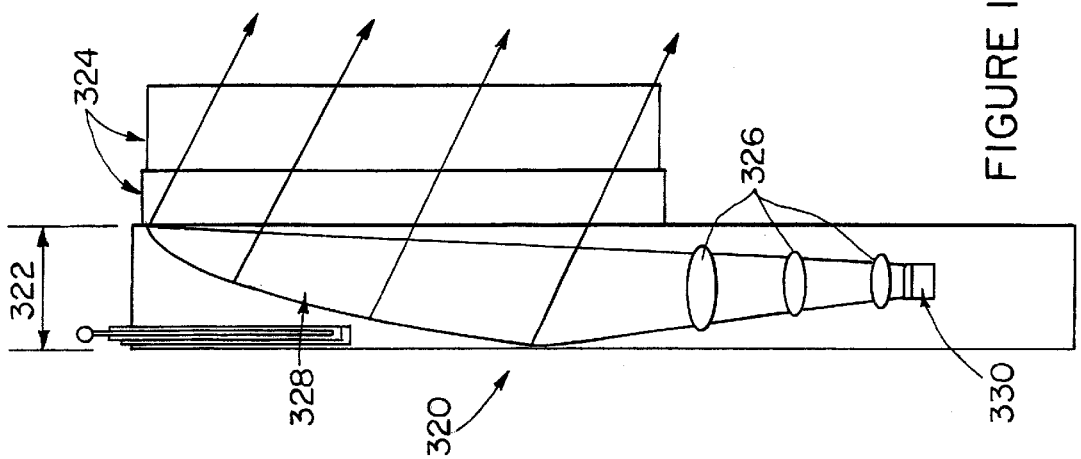

FIGS. 15A, 15B and 15C show side cross-sectional, front and front cross-sectional views of a hand-held rear projection system 320 using a microdisplay. The system 320 includes a microdisplay and back light assembly 330, a projection lens system 326, a reflective screen 328 and optional retractable sun screens 324. The device has a thickness 322 of less than 2 inches, preferably about 1 inch, a height 336 of less than 8 inches, preferably about 5–6 inches and a display diagonal 334 of 4 inches or less, preferably about 3 inches. This provides a system volume that is preferably less than about 40 inches. The rear reflective screen 328 is shown in the front view of FIG. 13C at 338 and are surrounded on 3 sides by retractable shades 332 (324). The handle portion can include speakers 338 and an earphone jack 325.

Figure 16B:
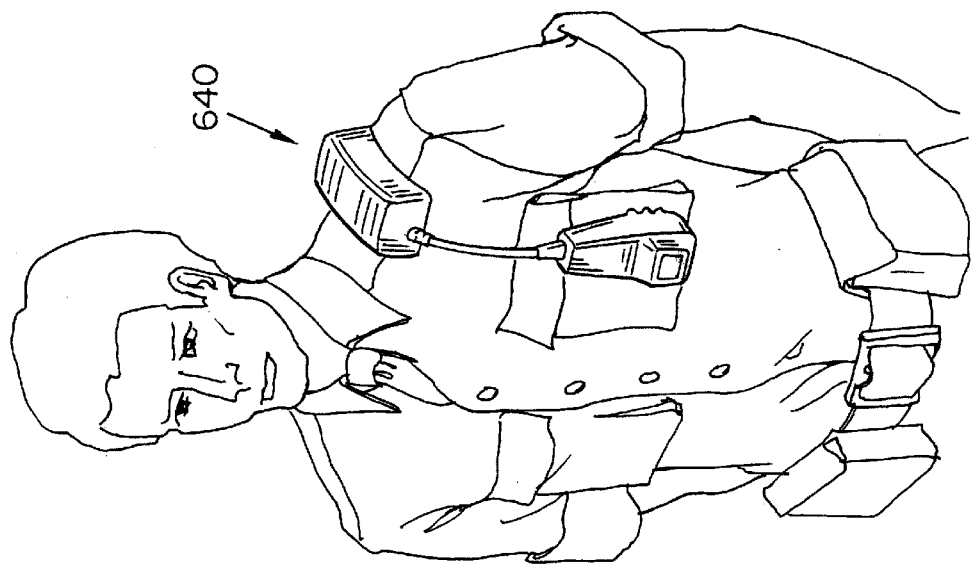
FIGS. 16A–16B illustrate a body worn, hand operated display system in accordance with the invention.
Figure 16A:
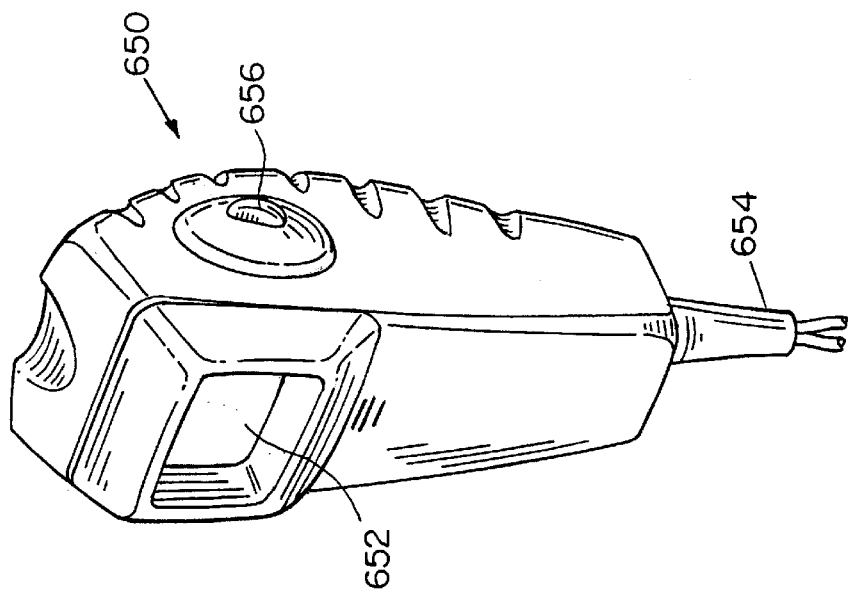
Figure 16C:
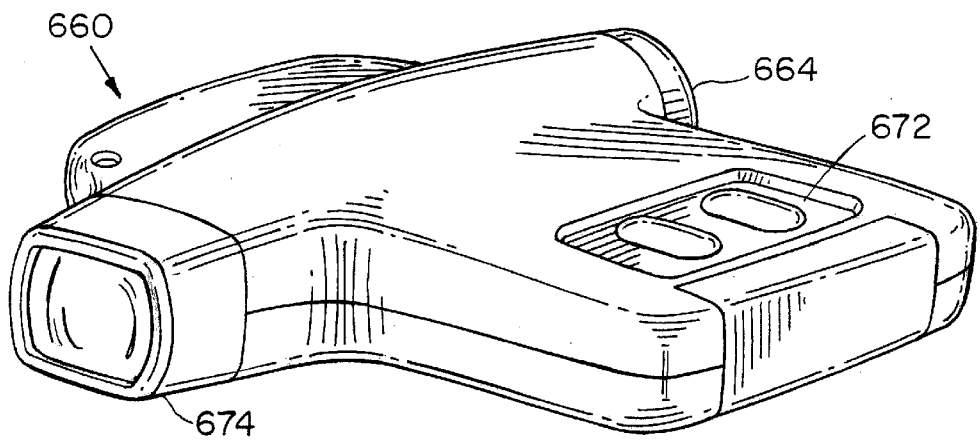
FIGS. 16C–16D illustrate the use of a microdisplay as a viewfinder for a camcorder in another preferred embodiment of the invention.
Figure 16D:
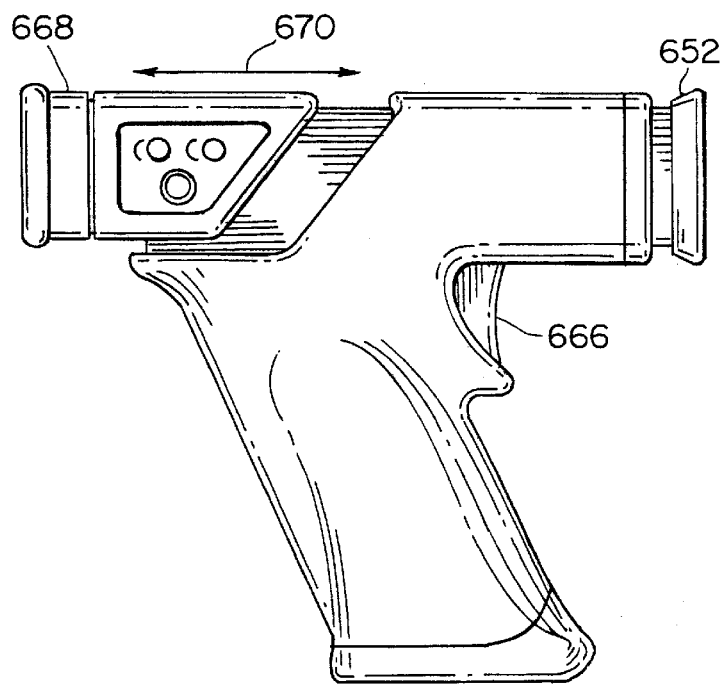

A body worn hand-held display system is shown in FIGS. 16A and 16B. The hand-held unit 350 includes a microdisplay viewed through port 352 that is controlled by control element 356 and connected by cable 354 to a body worn communications pod 340.

Another preferred embodiment of the invention relates to a card reader system. Such a system 700 is illustrated in connection with FIGS. 17A–17C and includes a housing 705 with a port or aperture 712 for insertion of a card 730, a display system 706 for presenting information to the user, a card reader 734, a control circuit 736, and a control panel 715 that controls reader operation. The display system 706 can include the color sequential display module as described previously herein.

The card 730 being read by the reader can be a so-called "Smart Card" or a PCMCIA card. Smart cards are commercially available and can include elements 738 such as a memory for storing data, a controller, a power source, and a coil antenna 732 to interface with the reader, all mounted on a piece of plastic. This type of card can be used to store personal financial information, personal medical history, insurance information, and/or many other types of data useful to the card user. More details regarding such cards can be found in U.S. Ser. No. 08/680,210 filed on Jul. 11, 1996, the entire contents of which is incorporated herein by reference. Alternatively, the card 730 can be a PCMCIA card such as a modem including a wireless receiver or data storage card.

Figures 17A, 17B, 17C:
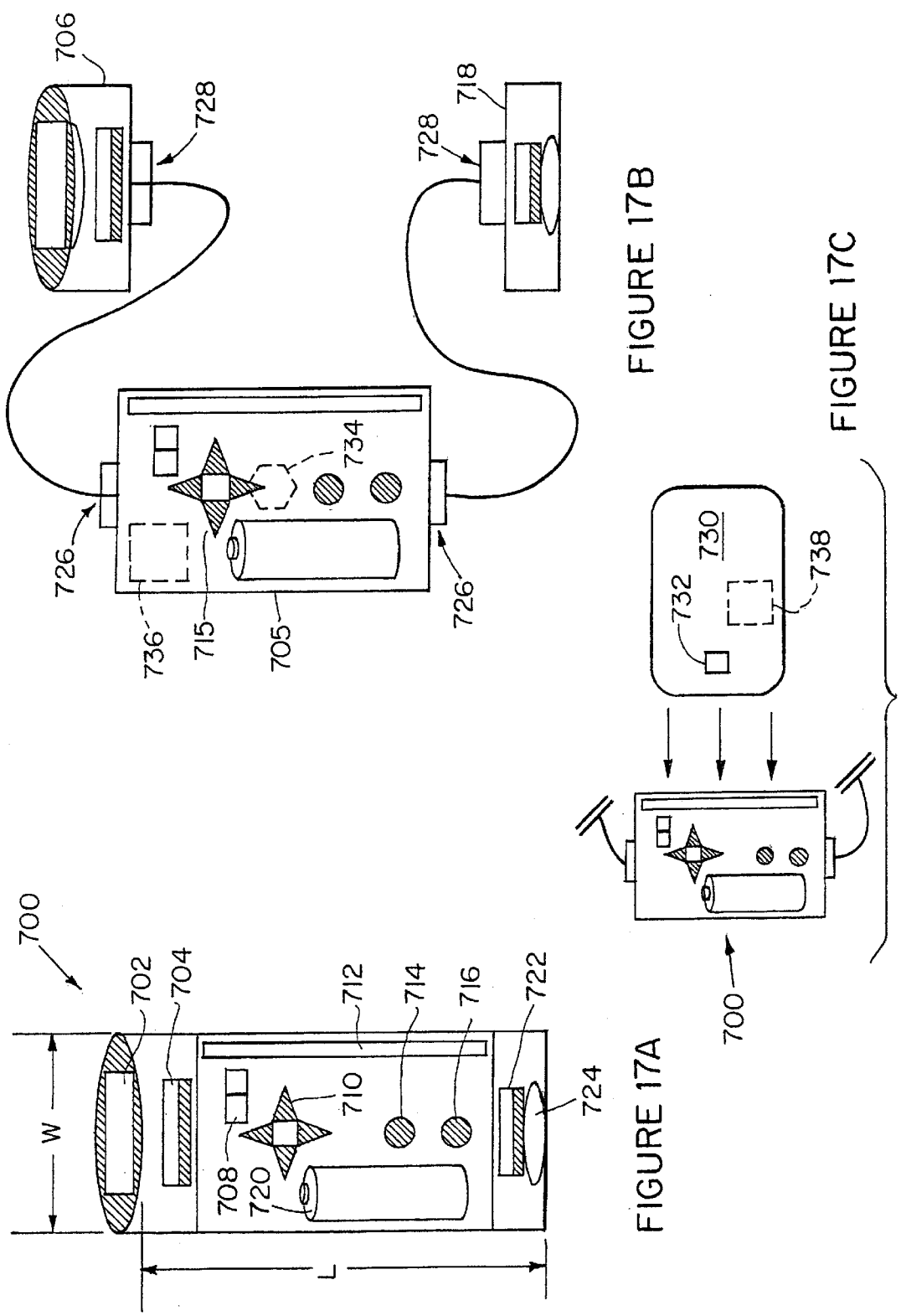
FIGS. 17A–17C illustrate the use of a microdisplay in a card reader system in accordance with another preferred embodiment of the invention.

The user is often interested in displaying information contained on the card and in controlling access to this information. The card reader of the present invention is used to provide access to this information by displaying selected information stored on the card. As shown in FIG. 17A, the reader housing 705 has a viewing window 702 and a slot or aperture 712 for insertion of at least that portion of the card containing the interface 732 to permit reading of information stored in card memory. The user manipulates control elements or buttons on a control panel 715 of the reader housing 705 to operate the system. The elements can include an on/off switch 708 and a four way element 710 to scroll the display up, down, left or right. An internal battery 720 provides power for all reader functions.

In an alternate embodiment of the invention, the reader 700 can also include an imaging device 718, including a CMOS or CCD imaging circuit 722 and imaging optics 724. Button 714 can operate the cameras 718 and select button 716 allows the user to select from a menu of reader 700 operations.

As shown in FIG. 17B, another preferred embodiment provides for detaching the display 706 and or the camera 718 from the housing 705. Either detachable element can be electrically connected to the housing 705 with a cable 726 from a socket 728 of either element 706, 718. The reader 734 is positioned in the housing 705 to be adjacent to the antenna 732 on the card 730 or can be any other suitable interface such as a magnetic strip reader.

Figure 18:
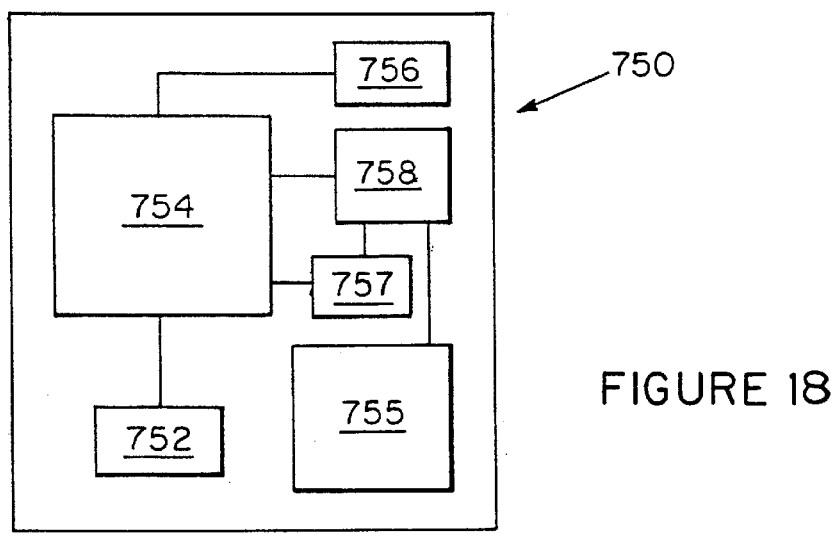
FIG. 18 is a schematic circuit diagram for a portable card reader system.

A schematic circuit diagram for a card reader system is illustrated in FIG. 18. The circuit includes an interface 752 that connects with the card being read, a controller 754 having a memory, a user control panel 756, a microdisplay circuit 758, as described previously herein, and a display 755. The interface 752 can be for cards with contacts or for contactless cards. A battery 757 provides power to the reader. The controller 754 and interface 752 and other physical characteristics of the card reader are preferably configured to comply with the guidelines set forth in the International Organization for Standardization (ISO) and the American National Standards Institute (ANSI) standards which are available from ANSI at 11 West 42nd Street, New York, NY 10036. These standards, including ISO/IEC 7816-1 through 7816-7, and the amendments thereof, are incorporated herein by reference in their entirety.

Figure 19:
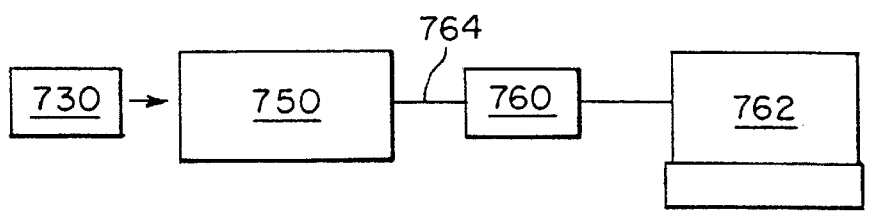
FIG. 19 illustrates another preferred embodiment of a card reader system.

As illustrated in FIG. 19, the card reader 750 can be connected by wireless modem, telephone or other cable link 764 to an interface 760 such as a personal computer (PC) card to a general purpose computer 762.

Figure 19A:
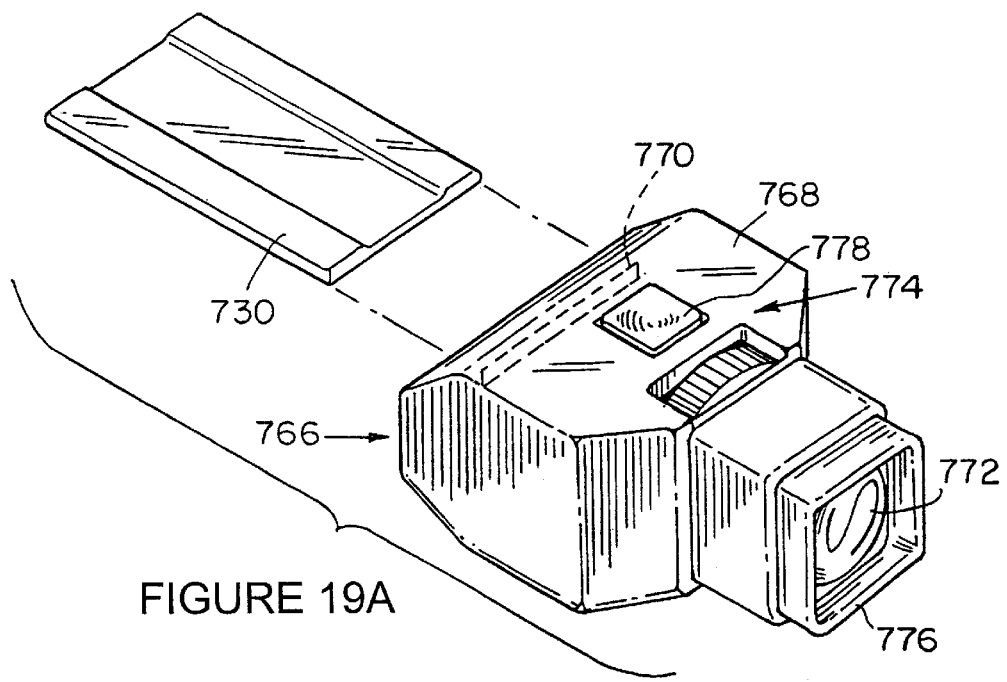
FIG. 19A shows another preferred embodiment of a card reader system.

Another embodiment of the card reader system 766 is illustrated in FIG. 19A. The system includes a housing 768 with a port or aperture 770, shown in hidden line, for insertion of the card 730, or at least that portion of the card that contains the interface, a display system 772 for presenting information to the user, and a control panel 774 that controls reader operation. Similar to the previous embodiment, the system 766 has a card reader, a control circuit, and a internal battery as described previously. The display system 772 can include the color sequential display module as described previously herein and is shown in actual size.

As shown in FIG. 19A, the reader housing 768 has a viewing window 776. The user manipulates control elements or buttons on a control panel 774 of the reader housing 768 to operate the system. The elements can include an on/off switch 778 and a four way element to scroll the display up, down, left or right.

The card reader system can be used to access or change the data stored on the card or select an option from choices provided through a PCMCIA modem. The user can change the data or make the selection using a four way element 710 and a select button 716, such as shown in FIG. 17A.

The display module shown in FIG. 19A can be equipped with an antenna and television receiver to provide a pocket size color television.

Head Mounted Display System

In yet another embodiment of the invention shown in FIG. 20A, the HDTV color active matrix display, as described in connection with FIG. 2A, is provided with suitable optics and incorporated into a housing 860 and pivotally attached to a headband frame 861 to provide a novel head mounted display system 864. In general, the system 864 is comprised of a unique headband frame 861 and adjustable strap 862 for attaching the system to the user's head, a side-mounted speaker system 866 connected by cable 868 to electronics console 870 attached to the front of the frame 862, a microphone 872 rotatably suspended from speaker frame 874, and the aforementioned display housing 860 dependent from console 870 and electronically connected thereto by cable 876.

Figure 20A:
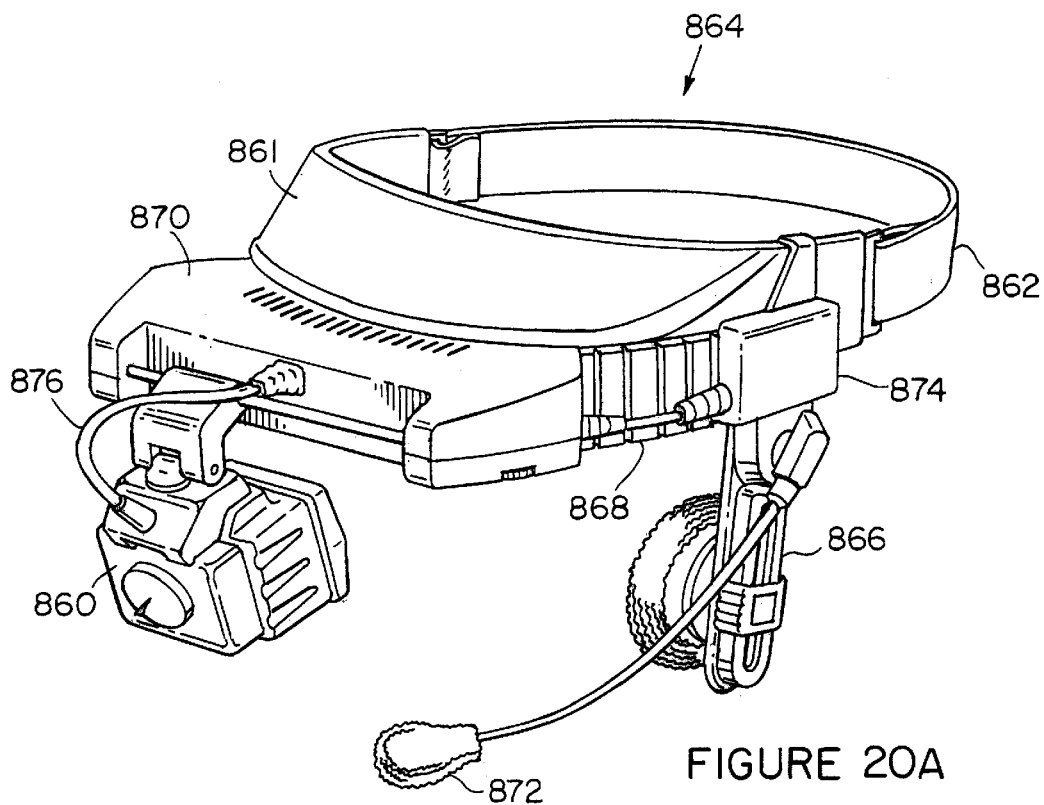
FIG. 20A is a perspective view of a head-mounted display system of the invention.
Figure 20B:
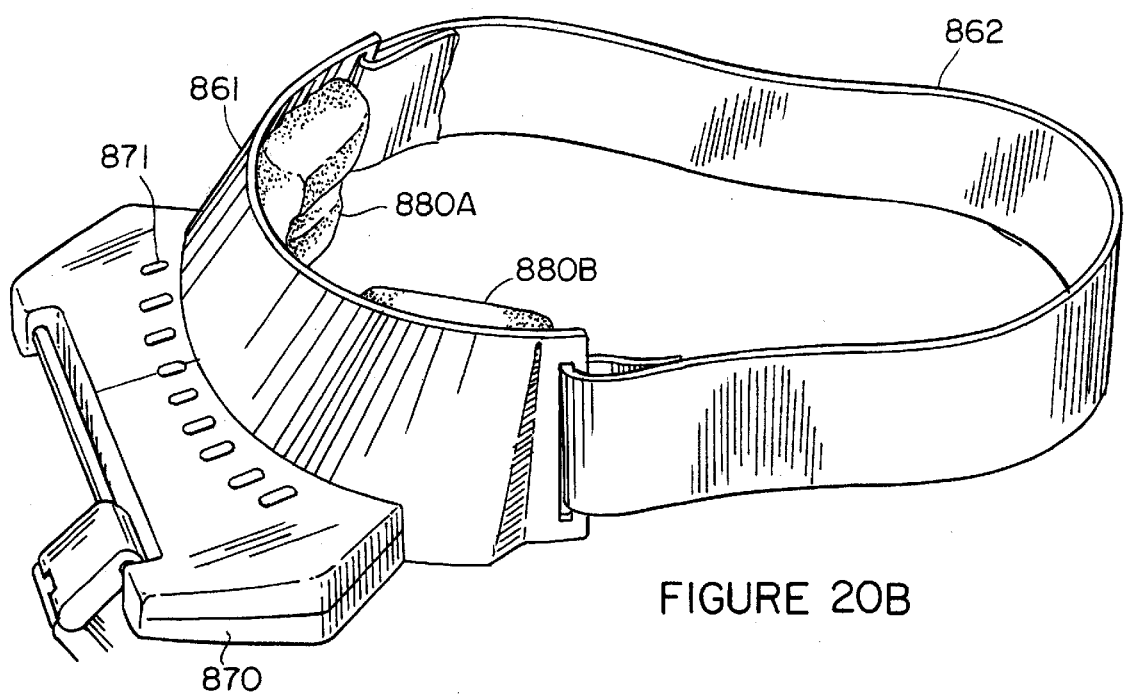
FIG. 20B is a partial schematic perspective view of the system of FIG. 20A emphasizing additional features of the invention.
Figure 20C:
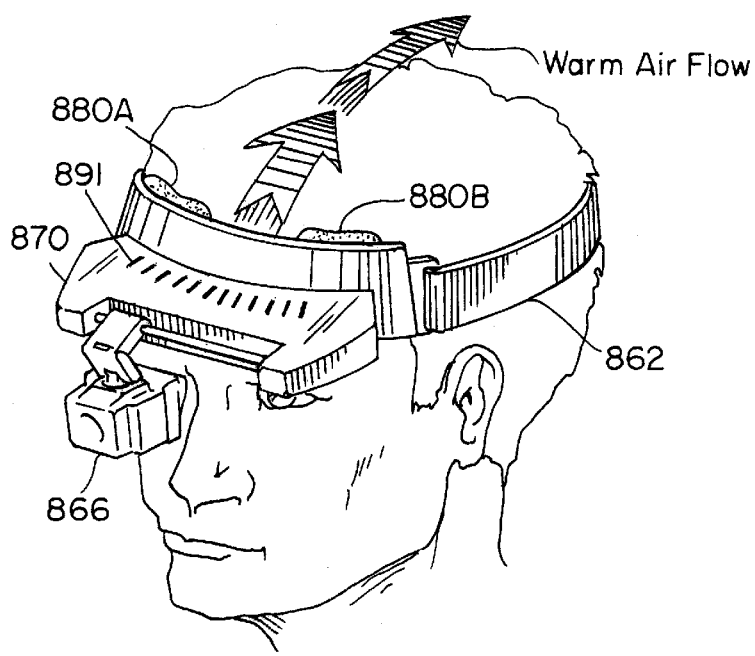
FIG. 20C is a schematic perspective view of the system of FIG. 20A which emphasizes certain aspects of the invention.
Figure 20D:
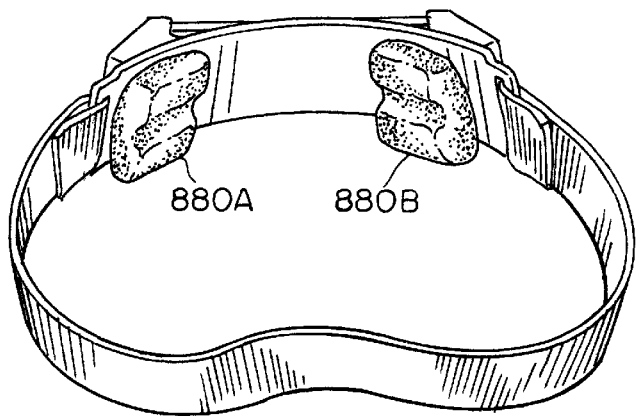
FIG. 20D is a schematic perspective view of the headband and pads of FIG. 20C.
Figure 20E:
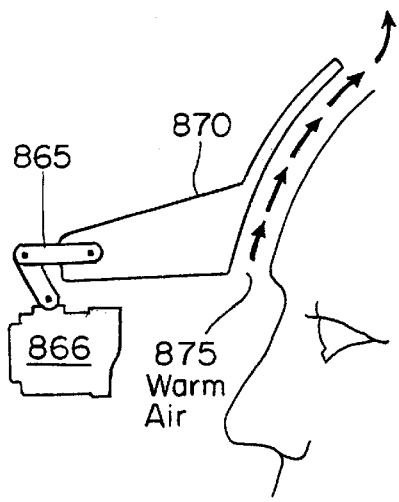
FIG. 20E is a partial schematic side view of the system of FIG. 20.

Not shown in FIG. 20A is a headband system comprised of two or more pads 180A, 180B, as shown in FIGS. 20B–20E.

To allow for the broadest range of head sizes, the headband frame 861 utilizes two contoured foam pads 880A and 880B, angled, and spaced apart such that both small and large forehead curvature are accommodated. Each foam pad also has two primary contact areas 881 and 883, that act in the same way. When combined with a strap 862 placed below the ball formed at the rear of the head, the net effect is that the headband frame 861 is securely located on the wearer's forehead 887 whether child or adult.

When the electronics are used, there is some heat being generated in the main housing or console 870. Prior art headbands used wide forehead pads which effectively trapped this heat at the wearer's brow. This proved to be quite uncomfortable after extended wear.

The foam pads 880A and 880B displace the headband frame 861 from the user's forehead 887 leaving a gap there between which serves as a warm air vent 875 to dissipate warm air generated by the electronics in console 870.

This new embodiment provides a "chimney-like effect" that effectively vents the warm air away from the wearer's face. The foam pads are removably attached, as by Velcro® type fasteners, and covered with terrycloth 861 for improved comfort. Optional additional vents 871 are provided in the console 870.

Equivalents

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An active matrix display comprising:
   an active matrix circuit having an array of transistor circuits formed in a first plane, each transistor circuit being connected to a pixel electrode in an array of pixel electrodes of at least 75,000 pixels having an active area of less than 160 mm$^2$;
   a counterelectrode panel extending in a second plane that is parallel to the first plane, such that the counterelectrode panel receives an applied voltage;
   a switching circuit connected to the counterelectrode panel that switches the applied voltage to the counterelectrode;
   a light transmitting material positioned over each pixel electrode such that actuation of a transistor circuit in the array alters an optical transmission property of the light transmitting material;
   a light source that sequentially flashes to illuminate the optical transmission material; and
   a circuit that times actuation of the pixel electrodes to write an image, flashing of the light source to illuminate the image and switching of the applied voltage to the counterelectrode to destroy the image.

2. The active matrix display of claim 1 wherein the active matrix circuit is attached to a substrate.

3. The active matrix display of claim 2 further comprising a temperature sensor positioned between the substrate and the counterelectrode that measures a temperature of the active matrix region.

4. The active matrix display of claim 2 further comprising a heating element.

5. The active matrix display of claim 4 wherein the heating element is between the substrate and the counterelectrode.

6. The active matrix display of claim 1 further comprising a heating element having a plurality of lines connecting transistor circuits of the pixel electrodes.

7. The active matrix display of claim 1 wherein the pixel electrodes comprise polycrystalline silicon formed over a silicon-on-insulator (SOI) structure.

8. A method of driving an active matrix display comprising the following steps:
providing an active matrix circuit having an array of transistor circuits formed in a first plane, each transistor circuit, being connected to a pixel electrode in an array of pixel electrodes;
actuating of the transistor circuits in the array to alter an optical transmission property of a light transmitting material positioned over each pixel electrode;
flashing an LED light source after scanning of an image frame to illuminate the image;
switching an applied voltage across a counter electrode panel to destroy the image, the counterelectrode panel extending in a second plane that is parallel to the first plane; and
inverting image data after an image frame has been scanned onto the display the timing of the steps of flashing switching and inverting are interelated and controlled by a timing circuit.

9. The method of claim 8 further comprising the step of waiting a period after the scanning of the frame prior to the flashing of the LED backlight.

10. The method of claim 9 wherein the time period of the waiting period after the scanning of the frame is dependent for a first color to be flashed and a second color to be flashed.

11. The method of claim 9 wherein the time period of the waiting period after the scanning of the frame prior to the flash of the LED backlight is adjusted in relation to the wavelength of the light to be flashed.

12. A method of heating an active matrix display comprising the following steps:
providing an active matrix display having an array of transistor circuits formed in a first plane, each transistor circuit being connected to a pixel electrode in an array of pixel electrodes, the active matrix circuit being positioned between a substrate and a cover layer;
heating the display with a heating element having a plurality of lines connecting the transistor circuits of the pixel electrodes, and the heating element located between the substrate and the cover layer.

13. The method of claim 12 wherein the step of heating occurs prior to scanning an image frame onto the display and flashing a backlight.

14. The method claim 12 further comprising the step of sensing a temperature of the display.

15. A display control circuit comprising:
a processor for receiving image data;
an active matrix display for displaying the image data, the display having an array of at least 320×240 pixel electrodes and a diagonal of less than 0.5 inches;
a timing control circuit connected to the processor and the display to control the circuit;
a switch adapted to select a high or low common voltage for sending to the display;
a second switch adapted to select a video or inverted video signal to be transmitted to the display;
a light source that sequentially flashes to illuminate the active matrix display; and
a timing circuit that times actuation of the pixel electrodes to write an image, flashing of the light source to illuminate the image, and switching of the applied voltage to the counterelectrode to destroy the image.

16. The display of claim 15 further comprising a temperature sensor on the display and temperature feedback line extending from the sensor to the timing control circuit.

17. The display of claim 15 further comprising a heating element.

18. An active matrix display comprising:
an active matrix circuit having an array of transistor circuits formed in a first plane, each transistor circuit being connected to a pixel electrode in an array of pixel electrodes of at least 75,000 pixels having an active area of less than 160 mm$^2$;
a liquid crystal layer, the liquid crystal positioned over each pixel electrode;
a counterelectrode panel extending in a second plane that is parallel to the first plane, the liquid crystal layer interposed between the counterelectrode panel and the first plane, and the counterelectrode panel receives an applied voltage;
a drive circuit for setting each of the pixel electrodes to a specific voltage for altering an optical transmission property of the light crystal material;
a switching circuit connected to the counterelectrode panel that switches the applied voltage to the counterelectrode;
an LED light source that sequentially flashes to illuminate the liquid crystal display, and
a timing circuit timing driving of the pixel electrodes to a specific voltage, flashing of the light source, and switching of the applied voltage to the counterelectrode.

19. The active matrix display of claim 21 further comprising a temperature sensor positioned between the substrate and the counterelectrode that measures a temperature of the active matrix region.

20. The active matrix display of claim 22 further comprising a heating element.

21. The active matrix display of claim 23 wherein the heating element is between the substrate and the counterelectrode.

22. The active matrix display of claim 24 wherein the heating element is the plurality of lines connecting transistor circuits of the pixel electrodes.

* * * * *

UNITED STATES PATENT AND TRADEMARK OFFICE
CERTIFICATE OF CORRECTION

PATENT NO. : 6,232,937 B1
DATED : May 15, 2001
INVENTOR(S) : Jeffrey Jacobsen, et al.

It is certified that error appears in the above-identified patent and that said Letters Patent is hereby corrected as shown below:

<u>Column 26, claim 19,</u>
Line 48 reads: "of claim 21"
It should read: -- of claim 18 --.

<u>Column 26, claim 20,</u>
Line 52 reads: "of claim 22"
It should read: -- of claim 19 --.

<u>Column 26, claim 22,</u>
Line 54 reads: "of claim 23"
It should read: -- of claim 20 --.

<u>Column 26, claim 22,</u>
Line 57 reads: "of claim 24"
It should read: -- of claim 21 --.

Signed and Sealed this

Sixth Day of November, 2001

Attest:

*Nicholas P. Godici*

*Attesting Officer*

NICHOLAS P. GODICI
*Acting Director of the United States Patent and Trademark Office*